(12) United States Patent
McKinnon, III et al.

(10) Patent No.: US 7,856,497 B2
(45) Date of Patent: Dec. 21, 2010

(54) METHOD FOR DETERMINING AN APPROPRIATE ALGORITHM TO APPLY FOR FORECASTING NETWORK ACCESS USAGE

(76) Inventors: Martin W. McKinnon, III, 5864 Farmlake Ct. SE., Mableton, GA (US) 30126; Mani M. Subramanian, D1/85 Bonn Avenue, Indian Institute of Technology Campus, Chennai (IN) 600036; Timothy Sean Sotack, 3491 Buckhead Loop, Apt. 901, Atlanta, GA (US) 30326; John Joseph Ehrley, 3236 Berea Rd., Cleveland, OH (US) 44111; James E. Harrell, Jr., 3979 Caminito Amparo, San Diego, CA (US) 92122; Oleg M. Kolesnikov, 277/33 Russkaya Str., Chernivtsi (UA) 58023

( * ) Notice: Subject to any disclaimer, the term of this patent is extended or adjusted under 35 U.S.C. 154(b) by 1153 days.

(21) Appl. No.: 10/276,654

(22) PCT Filed: Mar. 7, 2001

(86) PCT No.: PCT/US01/07209

§ 371 (c)(1),
(2), (4) Date: Aug. 11, 2006

(87) PCT Pub. No.: WO01/90957

PCT Pub. Date: Nov. 29, 2001

(65) Prior Publication Data

US 2009/0070454 A1 Mar. 12, 2009

(51) Int. Cl.
*G06F 15/173* (2006.01)

(52) U.S. Cl. .................................................. 709/224

(58) Field of Classification Search ................. 709/220, 709/201, 219, 217, 218, 249, 238, 232, 224, 709/226, 203, 245; 707/501, 505, 506, 530, 707/513; 715/215, 735, 736, 740; 370/230, 370/231, 232, 352, 389, 229, 254, 360
See application file for complete search history.

(56) References Cited

U.S. PATENT DOCUMENTS 5,343,465 A 8/1994 Khalil ......................... 370/232

(Continued)

FOREIGN PATENT DOCUMENTS

EP 0 613 316 8/1994

(Continued)

OTHER PUBLICATIONS

Sally Floyd et al., "Link-Sharing and Resource Management Models for Packet Networks," IEEE/ACM Transactions on Networking, vol. 3, No. 4, Aug. 1995, pp. 365-386.

(Continued)

*Primary Examiner*—Nathan Flynn
*Assistant Examiner*—Mark O Afolabi
(74) *Attorney, Agent, or Firm*—Merchant & Gould

(57) ABSTRACT

A method of providing network access across a shared communications medium between competing users (86) includes the step of allocating network access for each user for a future time interval (102). Features include forecasting network access (1100) of the users in a future time interval, and prioritizing the users for allocating network access to the users. The network access allocations represent network access allowances available to the users during the future time interval, and further may represent network access usage. Classes of users can be allocated network access first (1114), and then each user allocated network access from the class allocation.

17 Claims, 30 Drawing Sheets

U.S. PATENT DOCUMENTS

| | | | |
|---|---|---|---|
| 5,491,531 A | 2/1996 | Adams et al. | |
| 5,491,694 A | 2/1996 | Oliver et al. | |
| 5,537,446 A | 7/1996 | Lakshman et al. | 375/371 |
| 5,570,355 A | 10/1996 | Dail et al. | 370/352 |
| 5,581,555 A | 12/1996 | Dubberly et al. | |
| 5,594,726 A | 1/1997 | Thompson et al. | |
| 5,659,787 A | 8/1997 | Schieltz | 709/226 |
| 5,678,041 A | 10/1997 | Baker et al. | 707/9 |
| 5,717,861 A | 2/1998 | Rabii | 709/232 |
| 5,719,872 A | 2/1998 | Dubberly et al. | |
| 5,732,078 A | 3/1998 | Arango | 370/355 |
| 5,757,801 A | 5/1998 | Arimilli | |
| 5,790,546 A | 8/1998 | Dobbins et al. | |
| 5,796,724 A | 8/1998 | Rajamani et al. | 370/263 |
| 5,857,193 A | 1/1999 | Sutcliffe et al. | |
| 5,867,764 A | 2/1999 | Williams | 725/125 |
| 5,881,231 A | 3/1999 | Takagi et al. | 709/212 |
| 5,884,037 A * | 3/1999 | Aras et al. | 709/226 |
| 5,935,218 A | 8/1999 | Beyda et al. | |
| 5,946,322 A | 8/1999 | Moura et al. | 370/468 |
| 5,953,344 A | 9/1999 | Dail et al. | 370/443 |
| 5,956,342 A | 9/1999 | Manning et al. | |
| 5,963,557 A | 10/1999 | Eng | |
| 5,963,963 A | 10/1999 | Schmuck et al. | |
| 5,995,805 A | 11/1999 | Ogasawara et al. | 707/9 |
| 6,028,860 A | 2/2000 | Laubach et al. | 370/395.64 |
| 6,046,980 A | 4/2000 | Packer | |
| 6,084,855 A | 7/2000 | Soirinsuo et al. | 370/235 |
| 6,104,700 A | 8/2000 | Haddock et al. | 370/235 |
| 6,115,390 A | 9/2000 | Chuah | 370/443 |
| 6,125,105 A | 9/2000 | Edwards et al. | 370/230 |
| 6,151,582 A | 11/2000 | Huang et al. | 705/8 |
| 6,175,554 B1 * | 1/2001 | Jang et al. | 370/229 |
| 6,208,640 B1 | 3/2001 | Spell et al. | 370/358 |
| 6,222,856 B1 | 4/2001 | Krishnan et al. | 370/468 |
| 6,223,042 B1 | 4/2001 | Raffel | 455/455 |
| 6,243,755 B1 | 6/2001 | Takagi et al. | 709/229 |
| 6,253,203 B1 | 6/2001 | O'Flaherty et al. | 707/9 |
| 6,272,110 B1 * | 8/2001 | Tunnicliffe et al. | 370/232 |
| 6,275,824 B1 | 8/2001 | O'Flaherty et al. | 707/9 |
| 6,324,184 B1 | 11/2001 | Hou et al. | 370/468 |
| 6,343,085 B1 | 1/2002 | Krishnan et al. | |
| 6,363,445 B1 * | 3/2002 | Jeddeloh | 710/113 |
| 6,408,336 B1 | 6/2002 | Schneider et al. | 709/229 |
| 6,438,141 B1 | 8/2002 | Hanko et al. | 370/477 |
| 6,442,158 B1 | 8/2002 | Beser | 370/352 |
| 6,473,794 B1 | 10/2002 | Guheen et al. | 709/223 |
| 6,477,144 B1 | 11/2002 | Morris et al. | 370/230.1 |
| 6,483,839 B1 | 11/2002 | Gemar et al. | 370/395.42 |
| 6,490,347 B2 | 12/2002 | DeCaluwe et al. | 379/211.01 |
| 6,510,162 B1 | 1/2003 | Fijolek et al. | 370/432 |
| 6,516,348 B1 | 2/2003 | MacFarlane et al. | 709/224 |
| 6,529,486 B1 | 3/2003 | Barnes et al. | 370/327 |
| 6,539,427 B1 | 3/2003 | Natarajan et al. | 709/224 |
| 6,542,463 B1 | 4/2003 | Heeke | 370/230 |
| 6,542,500 B1 | 4/2003 | Gerszberg et al. | 370/354 |
| 6,542,593 B1 * | 4/2003 | Bowman-Amuah | 379/201.03 |
| 6,546,017 B1 | 4/2003 | Khaunte | 370/412 |
| 6,553,568 B1 | 4/2003 | Fijolek et al. | 725/111 |
| 6,560,243 B1 | 5/2003 | Mogul | 370/468 |
| 6,563,829 B1 | 5/2003 | Lyles et al. | 370/395.21 |
| 6,567,418 B1 | 5/2003 | Farah | 370/437 |
| 6,577,597 B1 | 6/2003 | Natarajan et al. | 370/232 |
| 6,577,642 B1 | 6/2003 | Fijolek et al. | 370/465 |
| 6,580,723 B1 | 6/2003 | Chapman | 370/442 |
| 6,598,057 B1 | 7/2003 | Synnestvedt | 707/200 |
| 6,611,726 B1 | 8/2003 | Crosswhite | 700/99 |
| 6,615,166 B1 | 9/2003 | Guheen et al. | 703/27 |
| 6,636,482 B2 | 10/2003 | Cloonan et al. | 370/230 |
| 6,643,290 B1 | 11/2003 | Glade | 370/395.4 |
| 6,654,957 B1 | 11/2003 | Moore et al. | 725/111 |
| 6,658,010 B1 | 12/2003 | Enns et al. | 370/401 |
| 6,665,271 B1 | 12/2003 | Thomas et al. | 370/252 |
| 6,667,956 B2 | 12/2003 | Beshai et al. | 370/238 |
| 6,671,724 B1 * | 12/2003 | Pandya et al. | 709/226 |
| 6,671,818 B1 | 12/2003 | Mikurak | 714/4 |
| 6,680,922 B1 * | 1/2004 | Jorgensen | 370/328 |
| 6,701,342 B1 | 3/2004 | Bartz et al. | 709/200 |
| 6,715,075 B1 | 3/2004 | Loukianov | 713/176 |
| 6,754,177 B1 | 6/2004 | Gersht et al. | 370/233 |
| 6,754,228 B1 | 6/2004 | Ludwig | 370/468 |
| 6,763,000 B1 | 7/2004 | Walsh | 370/252 |
| 6,823,385 B2 | 11/2004 | McKinnon | |
| 6,845,106 B2 | 1/2005 | McKinnon | |
| 6,848,004 B1 | 1/2005 | Chang et al. | 709/232 |
| 6,850,764 B1 | 2/2005 | Patel | |
| 6,859,926 B1 * | 2/2005 | Brenner et al. | 718/100 |
| 6,865,170 B1 | 3/2005 | Zendle | |
| 6,882,623 B1 | 4/2005 | Goren et al. | |
| 6,912,232 B1 | 6/2005 | Duffield et al. | 370/468 |
| 6,917,614 B1 | 7/2005 | Laubach et al. | 370/392 |
| 6,917,622 B2 | 7/2005 | McKinnon | |
| 6,917,628 B2 | 7/2005 | McKinnin | |
| 6,993,044 B2 | 1/2006 | McKinnon | |
| 7,009,992 B2 | 3/2006 | McKinnon | |
| 7,065,779 B1 | 6/2006 | Crocker | |
| 7,068,597 B1 | 6/2006 | Fijolek et al. | 370/230 |
| 7,113,484 B1 | 9/2006 | Chapman | |
| 7,145,887 B1 | 12/2006 | Akgun et al. | 370/321 |
| 7,184,398 B2 | 2/2007 | McKinnon | |
| 7,274,667 B2 | 9/2007 | McKinnon | |
| 7,299,284 B2 | 11/2007 | McKinnon | |
| 7,333,495 B2 | 2/2008 | Sala et al. | 370/395.21 |
| 7,499,453 B2 | 3/2009 | Carlson et al. | 370/395.2 |
| 2001/0011247 A1 | 8/2001 | O'Flaherty et al. | 705/39 |
| 2002/0118645 A1 | 8/2002 | Narayana et al. | 370/231 |
| 2002/0154655 A1 | 10/2002 | Gummalla et al. | 370/468 |
| 2002/0173316 A1 | 11/2002 | Jang et al. | 455/453 |
| 2004/0184472 A1 | 9/2004 | Carroll | 370/442 |
| 2005/0254419 A1 | 11/2005 | Barker et al. | 370/229 |
| 2006/0114926 A1 | 6/2006 | McKinnon et al. | 370/443 |
| 2006/0120282 A1 | 6/2006 | Carlson et al. | 370/229 |
| 2007/0058545 A1 | 3/2007 | Nookala et al. | 370/230 |
| 2007/0133409 A1 | 6/2007 | McKinnon et al. | 370/230 |
| 2008/0037578 A1 | 2/2008 | Carlson et al. | 370/463 |
| 2008/0112429 A1 | 5/2008 | McKinnon et al. | 370/442 |
| 2008/0144660 A1 | 6/2008 | Godlewski | 370/468 |
| 2009/0028176 A1 | 1/2009 | Godlewski et al. | 370/458 |
| 2009/0207731 A1 | 8/2009 | Carlson et al. | 370/232 |
| 2009/0213871 A1 | 8/2009 | Carlson et al. | 370/462 |

FOREIGN PATENT DOCUMENTS

| | | |
|---|---|---|
| EP | 0 742 658 | 11/1996 |
| WO | WO 99/27686 | 6/1999 |
| WO | WO 00/56021 A | 9/2000 |

OTHER PUBLICATIONS

X. Wang et al., "A predictive bandwidth management scheme and network architecture for real-time VBR traffic," Microprocessors and Microsystems, vol. 22, No. 10, May 1999, pp. 597-604.

Anurag Kumar et al., "Nonintrusive TCP Connection Admission Control for Bandwidth Management of an Internet Access Link," IEEE Communications Magazine, vol. 38, No. 5, May 2000, pp. 160-167.

Bhumip Khasnabish et al., "Bandwidth Management/Policing in ATM Networks for Serving Multi-Category Traffic using a Simple Learning Algorithm and a Bucket Bank," Global Telecommunications Conference, 1993, pp. 1149-1153.

IBM Technical Disclosure Bulletin #NB9203470.

Beauregard, Brian Conrad, "Overview of the Cable Modem," WPI Department of Electrical and Computer Engineering [online] Technologies Course Homepage, Mar. 23, 1996 [Retrieved on Dec. 18, 2000]. Retrieved from the Internet at <URL:http://www.ece.wpl.edu. courses/ee535/hwk96/hwk4cd/bcbeau/nodel.html>.

White, Gerry, "Additions to Cable Spec Enable QoS," [online] Article in Network World Fusion, Jun. 19, 2000 {Retrieved on Dec. 19, 2000]. Retrieved from the Internet at <URL:http://www.nwfusion.com/cgl-bin.mailto/x.cgi>.

RiverDelta Networks, RiverDelta Networks Executive to Discuss Advanced Quality of Service Techniques at Cable-Tec Expo 2000 [online] Press Release, May 31, 2000 [Retrieved Dec. 19, 2000]. Retrieved from the Internet at <URL:http://www.riverdelta.com/pr053100.html>.

RiverDelta Networks, RiverDelta Raises $10 Million to Bring Enhanced Broadband Services to Next-Generation Cable Providers [online] Press Release, Dec. 19, 1999 [Retrieved Dec. 19, 2000]. Retrieved from the Internet at <URL:http://www.riverdelta.com/pr121399.html>.

RiverDelta Networks, QoS: One HFC Network, Multiple Revenue Streams [online] White Papers, [Retrieved on Dec. 19, 2000]. Retrieved from the Internet at <URL:http://www.cabledatacomnews.com/whitepapers/paper08.html>.

Telecommunications Online, RiverDelta Networks (www.riverdelta.com)—A One-Box MSA Solution [online] Newsletter article, Jul. 2000 [Retrieved on Dec. 10, 2000]. Retrieved from the Internet at <URL:http://www.telecommagazine.com/products/200007/20000701.html>.

White, Gerry, QoS: Enabling Multiple Services on Cable Networks, [online] Telecommunications Online Newsletter Article, Oct. 2000, [Retrieved on Dec. 19, 2000]. Retrieved from the Internet at <URL:http://www.telecoms.mag.com/issues.200010/tcs/qos.sub.--enabling.-html>.

International Engineering Consortium, How Cable Modems Work [online] Web ProForum Tutorial Course, Aug. 2, 2000 [Retrieved on Dec. 18, 2000]. Retrieved from the Internet at <URL:http://www.iec/org/tutorials/cable.sub.-mod/topic01.html?Nest.x=-34XNext.y=20>.

International Engineering Consortium, Cable Data System Features [online] Web ProForum Tutorial Course, Aug. 3, 2000 [Retrieved on Dec. 18, 2000]. Retrieved from the Internet at <URL:http://www.iec/org/tutorials/cable/sub.--mod/topic02.html>.

International Engineering Consortium, Cable Data Network Architecture [online] Web ProForum Tutorial Course, Aug. 2, 2000 [Retrieved on Dec. 18, 2000]. Retrieved from the Internet at <URL:http://www.iec/org/tutorials/cable.sub.--mod/topic03.html>.

International Engineering Consortium, Cable Data Network Standards [online] Web ProForum Tutorial Course, Aug. 3, 2000 [Retrieved on Dec. 18, 2000]. Retrieved from the Internet at <URL:http://www.iec/org/tutorials/cable.sub.--mod/topic04.html?Next.x=-40&Next.y=18>.

Ostergaard, Rolf B., Cable Modems.Org: Your Cable Modem Reference Guide, [online] Tutorial 1998-2000 [Retrieved on Dec. 18, 2000]. Retrieved from Internet at <URL:http://www.cable-modems.org/tutorial>.

Time Warner Cable, Road Runner Subscription Agreement, Jan. 1999, pp. 1-4.

White, Gerry, Eliminating Open Access Technology Barriers [online] Telecommunications Online Newsletter Article, Jul. 2000 [Retrieved on Dec. 10, 2000]. Retrieved from the Internet at <URL:http://telecommagazine.com/issues/20007/tcs/elimin.html>.

Green, Tim, DSL Has a Secret [online] Network World Fusion Article, Mar. 2, 1999 [Retrieved on Dec. 22, 2000]. Retrieved from the Internet at <URL:http://cnn.com/TECH/computing/9903/02/dslsecretlidg/>.

Cable Television Laboratores, Inc., Cable Data Modem Performance Evaluation: A Primer for Non-Technical Readers, Nov. 15, 1996, pp. 1-8.

RiverDelta Networks, Inc., QoS: The Key to Maximizing Revenue: A Technical Guide for Cable Operators [online] PDF Document, Publication Date Unknown [Retrieved on Dec. 18, 2000]. Retrieved from Internet at <URL:http://www.riverdelta.com>, pp. 1-8.

Cable Television Laboratories, Inc., Cable Data Modem Performance Evaluation: A Primer for Non-Technical Readers, Apr. 1996, pp. 1-3.

Ddri Diversified Data Resources, Inc., ACE-SNMP Web Based SNMP Network Management System an Introductory Overview of SNMP, 1999, <URL:http://www.ddri.com>, pp. 1-32.

Data-Over-Cable Service Interface Specifications, Radio Frequency Interface Specification, SP-RFv1.-104-00047 Interim Specification; 2000 Cable Television Laboratories, Inc., 1999, pp. 229-231, 263, 121-141, 157-217, and 277-283.

U.S. Office Action dated Jul. 6, 2004 cited in U.S. Appl. No. 09/800,861.

U.S. Office Action dated Sep. 16, 2004 cited in U.S. Appl. No. 09/800,735.

U.S. Office Action dated Dec. 2, 2004 cited in U.S. Appl. No. 09/801,155.

U.S. Office Action dated Dec. 15, 2004 cited in U.S. Appl. No. 09/800,717.

U.S. Office Action dated Dec. 16, 2004 cited in U.S. Appl. No. 09/800,608.

U.S. Office Action dated Apr. 11, 2005 cited in U.S. Appl. No. 09/801,155.

U.S. Office Action dated May 4, 2005 cited in U.S. Appl. No. 09/800,608.

U.S. Office Action dated May 19, 2005 cited in U.S. Appl. No. 09/800,735.

U.S. Office Action dated May 27, 2005 cited in U.S. Appl. No. 09/935,514.

U.S. Office Action dated Jun. 13, 2005 cited in U.S. Appl. No. 09/800,717.

U.S. Final Office Action dated Oct. 31, 2005 cited in U.S. Appl. No. 09/800,608.

U.S. Office Action dated Nov. 16, 2005 cited in U.S. Appl. No. 09/935,514.

U.S. Office Action dated Dec. 14, 2005 cited in U.S. Appl. No. 09/800,717.

U.S. Office Action dated Jan. 5, 2006 cited in U.S. Appl. No. 09/935,514.

U.S. Office Action dated Apr. 20, 2006 cited in U.S. Appl. No. 09/800,608.

U.S. Office Action dated May 30, 2006 cited in U.S. Appl. No. 09/800,717.

U.S. Office Action dated Jun. 30, 2006 cited in U.S. Appl. No. 09/935,514.

U.S. Final Office Action dated Oct. 4, 2006 cited in U.S. Appl. No. 09/800,608.

U.S. Final Office Action dated Nov. 16, 2006 cited in U.S. Appl. No. 09/800,717.

U.S. Office Action dated Jan. 29, 2007 cited in U.S. Appl. No. 09/800,608.

U.S. Office Action dated Jul. 24, 2007 cited in U.S. Appl. No. 10/410,878.

U.S. Office Action dated Apr. 16, 2008 cited in U.S. Appl. No. 10/410,878.

U.S. Office Action dated Dec. 22, 2008 cited in U.S. Appl. No. 11/275,208.

U.S. Office Action dated Apr. 15, 2009 cited in U.S. Appl. No. 11/676,318.

U.S. Office Action dated Apr. 17, 2009 cited in U.S. Appl. No. 11/612,524.

U.S. Office Action dated May 12, 2009 cited in U.S. Appl. No. 11/856,761.

U.S. Final Office Action dated May 13, 2009 cited in U.S. Appl. No. 11/275,208.

U.S. Office Action dated Jun. 16, 2009 cited in U.S. Appl. No. 11/875,369.

U.S. Office Action dated Jul. 30, 2009 cited in U.S. Appl. No. 11/829,209.

International Search Report dated May 27, 2008 cited in PCT/US2007/086945.

International Search Report dated Aug. 28, 2008 cited in PCT/US2008/070847.

European Official Communication dated Jun. 4, 2009 cited in Application No. 01914723.0.

U.S. Final Office Action dated Nov. 24, 2009 cited in U.S. Appl. No. 11/676,318.

U.S. Office Action dated Nov. 24, 2009 cited in U.S. Appl. No. 11/856,761.

U.S. Final Office Action dated Nov. 25, 2009 cited in U.S. Appl. No. 10/276,654.

U.S. Office Action dated Jan. 5, 2010 cited in U.S. Appl. No. 11/829,209.

European Examination Report dated Nov. 18, 2009 cited in Appln No. 01 914 723.0-2416.

U.S. Final Office Action dated Oct. 6, 2009 cited in U.S. Appl. No. 11/612,524.

U.S. Office Action dated Apr. 29, 2010 cited in U.S. Appl. No. 12/388,659.

U.S. Office Action dated May 10, 2010 cited in U.S. Appl. No. 12/388,663.

U.S. Office Action dated May 24, 2010 cited in U.S. Appl. No. 11/856,761.

Canadian Office Action dated Oct. 14, 2009 cited in Appln No. 2,409,904.

European Official Communication dated Jun. 9, 2010 cited in Application No. 07 865 457.1.

U.S. Office Action dated Jul. 16, 2010 cited in U.S. Appl. No. 11/829,209.

U.S. Office Action dated Aug. 3, 2010 cited in U.S. Appl. No. 11/275,208.

U.S. Office Action dated Sep. 17, 2010 cited in U.S. Appl. No. 12/388,659.

U.S. Office Action dated Sep. 23, 2010 cited in U.S. Appl. No. 12/388,663.

* cited by examiner

METHOD FOR DETERMINING AN APPROPRIATE ALGORITHM TO APPLY FOR FORECASTING NETWORK ACCESS USAGE

CROSS-REFERENCE TO RELATED APPLICATIONS

This national stage filing of international patent application serial no. PCT/US01/07209 is related to each of the following eight currently pending U.S. patent applications to McKinnon et al.: U.S. patent application Ser. No. 09/800,155 ("Computerized Method For Allocating Access Across A Shared Communications Medium" filed); U.S. patent application Ser. No. 09/800,608 ("Solicitations for Allocations of Access Across A Shared Communications Medium"); U.S. patent application Ser. No. 09/800,674 ("Allocating Access Across A Shared Communications Medium"); U.S. patent application Ser. No. 09/800,717 ("Monitoring and Allocating Access Across A Shared Communications Medium"); U.S. patent application Ser. No. 09/800,735 ("Methods of Allocating Access Across A Shared Communications Medium"); U.S. patent application Ser. No. 09/800,803 ("Allocating Access Across A Shared Communications Medium of a DOCSIS 1.0 Compliant Cable Network"); U.S. patent application Ser. No. 09/800,861 ("Allocating Access Across A Shared Communications Medium in a Carrier Network"); and U.S. patent application Ser. No. 09/800,981 ("Allocating Access Across A Shared Communications Medium To User Classes"). These eight U.S. patent applications and the PCT application were all filed on May 7, 2001. This national stage filing is also related to McKinnon et al. U.S. patent application Ser. No. 09/935,514 ("Allocating Access Across Shared Communications Medium To User Classes"), which was filed on Aug. 23, 20014 as a continuation of the PCT application.

FIELD OF THE PRESENT INVENTION

The present invention generally relates to allocating access across a shared communications medium and, in particular, to allocating bandwidth used to convey data of competing users across a shared communications medium of a Carrier Network.

BACKGROUND OF THE PRESENT INVENTION

As used herein, a "Carrier Network" generally refers to a computer network through which users (such as homes and businesses) communicate with various service providers. The Carrier Network extends from the location of each user to an intermediate switched/routed network (hereinafter "Intermediate Network"). The service providers, in turn, are connected to the Intermediate Network, either directly or indirectly via the Internet, for communications with the users. The Carrier Network is maintained by a "Carrier," which also may serve as a service provider for certain services. For example, a Carrier or a related entity may serve as an Internet service provider (ISP).

Two prevalent types of Carrier Networks include a "Shared Access Carrier Network," in which data of multiple users are conveyed together over a shared communications medium between the users and the Intermediate Network, and a "Dedicated Connection Carrier Network," in which data of each user are conveyed alone between the user and the Intermediate Network and are not combined with data of other users. One of the most prevalent Shared Access Carrier Networks today is found in the Data-Over-Cable (DOC) Network, which includes the traditional network constructed from coaxial cable and the hybrid fiber coaxial (HFC) network constructed with both fiber optical cabling and coaxial cable. Other Shared Access Carrier Networks include wireless and digital subscriber line (XDSL) networks (the xDSL lines typically being aggregated onto an oversubscribed backhaul trunk into the Intermediate Network, with the trunk defining the shared communications medium).

For example, with regard to DOC Networks, and with reference to FIG. 1 wherein a conventional DOC Network 40 is illustrated, data packets are transmitted in a downstream direction from a cable modem termination system (CMTS) 30, which is located in a headend 36 (or distribution hub) of a Carrier, over a coaxial cable 32 to respective cable modems (CMs) 34 of users. All of the CMs 34 are attached by the coaxial cable 32 to the CMTS 30 in an inverted tree configuration, and each CM 34 connected to the coaxial cable 32 listens to all broadcasts from the CMTS 30 transmitted through the coaxial cable 32 for data packets addressed to it, and ignores all other data packets addressed to other CMs 34. Theoretically, a CM 34 is capable of receiving data in the downstream direction over a 6 MHz channel with a maximum connection speed of 30-40 Mbps. Data packets also are transmitted in the upstream direction over a 2 MHz channel by the CMs 34 to the CMTS 30 typically using time division multiplexing (TDM) and at a maximum connection speed of 1.5-10 Mbps.

The headend 36 in the DOC Network 40 includes a plurality of CMTSs, with each CMTS supporting multiple groups of CMs each connected together by a respective coaxial cable. Each such group of CMs connected to a CMTS defines a Shared Access Carrier Network, with the coaxial cable in each representing the shared communications medium. This arrangement of a group of CMs connected to a CMTS by a coaxial cable is referred to herein as a "Cable Network." Accordingly, the DOC Network 40 includes a plurality of Cable Networks 38 originating from CMTSs at the headend 36 of the Carrier, with a particular Cable Network 38 being illustrated in an expanded view in FIG. 1. The DOC Network 40 also includes multiple headends 36,64,66.

In contrast to the Shared Access Carrier Network, a user in the Dedicated Connection Carrier Network establishes a dedicated connection directly with the Intermediate Network for the transfer of data directly therebetween, and no data of other users travel over the dedicated connection. Examples of a dedicated connection are shown for comparison in FIG. 1 and include a connection established by a telephony modem 74 and a connection established by an ISDN modem 76. Both downstream and upstream connection speeds in a Dedicated Connection Carrier Network range from a maximum of 53 kbps in a telephony modem connection to a maximum of 128 kbps in a basic rate interface ISDN connection.

Connection speeds and, more importantly, throughput rate—the amount of data actually transmitted successfully in a given time interval—are important in minimizing downtime that users spend waiting for HTML documents to download from the Web. A Shared Access Carrier Network is considered superior to a comparable Dedicated Connection Carrier Network because the maximum instantaneous connection speed offered by the Shared Access Carrier Network is greater. A Shared Access Carrier Network is considered "comparable" to a Dedicated Connection Carrier Network where the entire bandwidth over a shared communications medium of the Shared Access Carrier Network equals an aggregate bandwidth that is divided between and dedicated to users in a Dedicated Connection Carrier Network. Accordingly, Shared Access Carrier Networks are able to offer significantly faster downloads of web documents, emails, and file transfers that are not considered available in Dedicated Connection Carrier Networks.

Furthermore, new multimedia applications and Internet services, such as voice and video communications via the Internet, now are offered which require even greater throughput rates for acceptable levels of service than that of the traditional Internet services, i.e., throughput rates greater than that required for acceptable text-based Web browsing, file transferring, and email communication. It is believed that these new multimedia applications and Internet services cannot adequately be provided for over Dedicated Connection Carrier Networks and that, consequently, Shared Access Carrier Networks ultimately will prevail as the predominant type of Carrier Network for Internet access by users.

Of course, the actual throughput rates experienced by a particular user rarely, if ever, will equate to the maximum connection speeds of which the Shared Access Carrier Network is capable because of the shared nature of the communications medium. For example, in a Cable Network the total bandwidths available over the shared cable in the downstream and upstream directions, which determine the respective maximum connection speeds, must be shared among all of the users communicating at a given time. Thus, rarely will a single user have available for use a large portion of the entire bandwidth in a particular direction. Further, as a Carrier adds users to the Cable Network, the actual downstream and upstream bandwidths available to the user—and thus throughput rates of the user—generally will decrease. A Carrier therefore must be careful to draw a balance between the number of users connected to a Cable Network and the performance users experience communicating over the network.

Unfortunately, Shared Access Carrier Networks that have been established were designed to provide the traditional Internet services, and not the new multimedia applications and Internet services that require higher throughput rates for acceptable levels of service. Consequently, each balance previously struck by Carriers in establishing Shared Access Carrier Networks was based on considerations of the throughput rates required for the traditional Internet services, and user throughput rates currently experienced by users in such networks are believed to fall short of acceptable quality of service (QoS) standards believed required in a Carrier Network for the new multimedia applications and Internet services.

Additionally, with regard to new Shared Access Carrier Networks that are being established, considerations of the new multimedia applications and Internet services tend to reduce the number of users that a Carrier now can reasonably expect to connect to the shared communications medium before degrading the performance levels of the new multimedia applications and Internet services. The balance is being shifted towards less users per shared access medium in exchange for higher throughput rates and, thus, higher QoS standards.

In an attempt to avoid reducing the number of users, it has been proposed, at least in DOC Networks, to discriminate between the traditional Internet services and the new multimedia applications and Internet services with regard to priority of data packet transmissions. In particular, the generally accepted standard in the United States governing communication protocols over cable is DOCSIS version 1.0, which was ratified by the International Telecommunication Union in March of 1998. DOCSIS stands for "Data Over Cable Service Interface Specifications." When DOCSIS 1.0 was developed, it was generally believed that, in view of the "fast" connection speeds of Cable Networks, the provision of bandwidth on a best effort basis would be sufficient to meet all user requirements.

Accordingly, each user subscribed to receive network access pursuant to a service level agreement (SLA) which provided for network access (or bandwidth in Cable Networks) only on a best effort basis. Now, in an effort to address the foreseen ever-increasing demand for higher throughput rates, DOCISIS version 1.1 has been proposed, in accordance with which each data packet transmitted over a DOC Network now must include a classification designation for prioritization purposes by network equipment. Subsequently, data packets representing voice or video, for example, now can be identified and given priority transmission over data packets representing email, file transfers, and text-based Web documents. A benefit of such flow classification is that, while overall bandwidth generally available to a user may otherwise remain unchanged, throughput rates of data for voice and video now may be provided at a higher rate than throughput rates of data for the traditional Internet services, thereby increasing the performance of voice and video applications and services while at least maintaining the traditional number of users connected to a Cable Network.

A disadvantage of the revisions to DOCSIS 1.1 is that the revisions do not enhance established Cable Networks constructed with only DOCSIS 1.0 compliant equipment, as such equipment does not support the added functionality of DOCSIS 1.1 so as to distinguish between data packets.

More broadly, another disadvantage of the classification of data packets into Internet Protocol (IP) flows based on the services represented by the data packets is that such classification discriminates against users who do not utilize multimedia applications and services receiving the prioritized transmissions. At least for some extensive users of the traditional Internet services, some degradation in performance may be noticed by lower classification of their data packets, particularly if the user engages in, for example, web hosting. While the transmissions of data packets for documents, files, and emails are not as time-sensitive as data packets for voice and video, increased data packet latency for documents, files, and emails, even if incrementally small, nevertheless will result in service degradation for large or numerous documents, files, and emails.

Accordingly, a need exists for a method and apparatus that will accommodate differing demands for network access by users competing for such access across a shared communications medium of a Shared Access Carrier Network, whether new or established, and irrespective of data packet classifications.

Furthermore, as Shared Access Carrier Networks emerge as the favored type of network, it is believed that open access to such networks by different competing service providers will become an important commercial and legislative issue. Moreover, as more and more service providers seek to provide users with services over Shared Access Carrier Networks, it is believed that users of such service providers will receive inadequate bandwidth over the Shared Access Carrier Networks to meet minimum standards of quality, especially in Cable Networks where bandwidth is provided on a best efforts basis.

Accordingly, it is believed that an additional need exists for a method by which a service provider competing for users of a shared communications medium can seek protection against bandwidth starvation of the users of the shared communications medium that are its customers. Conversely, it is also believed that a need exists for a method that will accommodate differing demands for network access by users competing for such access across the shared communications medium.

SUMMARY OF THE PRESENT INVENTION

Briefly summarized, the present invention relates to a method of providing network access across a shared communications medium between competing users, and include eight different aspects.

First Aspect of the Present Invention

In the first aspect of the present invention, the method broadly includes the steps of: (a) prior to first and second time intervals, respectively determining for each user first and second network access allowances; (b) during the first time interval, providing network access to each user such that the respective first network access allowance is not exceeded; and (c) during the second time interval, providing network access to each user such that the respective second network access allowance for each user is not exceeded.

In accordance with the present invention, the "network access allowance" represents a respective maximum level of network access that can be made available to the user during a particular time interval, and does not represent necessarily the level of network access that will be utilized by the user during such time interval. Furthermore, at least one respective second network access allowance for a user differs from such user's respective first network access allowance.

The first network access allowances for the users preferably are determined by allocating network access to each user on a per user basis for the first time interval in accordance with a first allocation policy. The first network access allowance for each respective user then is equated to the network access allocated to that user under the first allocation policy. Likewise, the second network access allowances for the users are determined by allocating network access to each user on a per user basis for the second time interval in accordance with a second allocation policy that may or may not differ from the first allocation policy. Again, the second network access allowance for each respective user then is equated to the network access allocated to that user under the second allocation policy.

In additional features of the present invention, the method includes the steps of monitoring network access usage by the users, and forecasting network access usage of each user in a future time interval. Another additional feature of the present invention includes the step of prioritizing the users for the allocation of network access.

One of many preferred embodiments of the present invention includes the monitoring of bandwidth consumption of each user across the shared communications medium of a Cable Network; based on the monitored bandwidth consumption, the forecasting of bandwidth consumption of each user in a future time interval; the prioritization of users; and the subsequent allocation of bandwidth to each user in decreasing priority for determining bandwidth allowances during the future time interval. Users are prioritized based on one or more various prioritization policies, including the prioritization of users based upon fairness considerations, such as user throughput during a particular time interval, user data loss for a particular time interval, bandwidth consumption for a particular time-of-day, an established minimum quality of service (QoS) standard, or combination thereof. Other prioritization policies include the prioritization of users based upon provisions found in each user's respective service level agreement (SLA), and the prioritization of users based upon each user's forecasted bandwidth consumption for the future time interval. In alternative embodiments, the bandwidth that is requested, rather than the bandwidth that is consumed, is monitored and forecasted. With regard to at least two users, the favored user allocations, and thus the user allowances, differ as between future time intervals.

Second Aspect of the Present Invention

In the second aspect of the present invention, the method broadly includes the steps of monitoring network access usage of each user for a past time interval and, based on the monitored network access usage, allocating network access to each user for a future time interval. In a feature of the present invention, the network access that is monitored and allocated is in the downstream direction towards the users. In a separate and independent feature of the present invention, network access usage of each user is forecast for a future time interval based on the monitoring, and allocations are made based on the forecasting. Another additional feature of the present invention includes the prioritizing of the users for allocating network access.

One of many preferred embodiments of the present invention includes the monitoring of bandwidth consumption of each user across the shared communications medium of a Cable Network; based on the monitored bandwidth consumption, the forecasting of bandwidth consumption of each user in a future time interval; the prioritization of users; and the subsequent allocation of bandwidth to each user in decreasing priority for the future time interval. Users are prioritized based on one or more various prioritization policies, including the prioritization of users based upon fairness considerations, such as user throughput during a particular time interval, user data loss for a particular time interval, bandwidth consumption for a particular time-of-day, an established minimum quality of service (QoS) standard, or combination thereof. Other prioritization policies include the prioritization of users based upon provisions found in each user's respective service level agreement (SLA), and the prioritization of users based upon each user's forecasted bandwidth consumption for the future time interval. In alternative embodiments, the bandwidth that is requested, rather than the bandwidth that is consumed, is monitored and forecasted.

Third Aspect of the Present Invention

In the third aspect of the present invention, the method broadly includes the steps of monitoring network access usage by each user for a past time interval and, based on the monitored network access usage, allocating network access for each user for a future time interval. In a feature of the present invention, network access usage of each user is forecast for a future time interval based on the monitoring, and allocations are made based on the forecasting. Another feature of the present invention includes the prioritizing of the users for allocating network access.

A preferred method of providing network access to the users includes the steps of: (a) monitoring network access usage by each user during a time interval; (b) based on the monitoring, forecasting network access usage by each user over a future time interval; (c) prioritizing users based on each user's forecasted network access usage in increasing order, whereby a user with a lesser forecasted network access usage receives a higher priority than a user with a greater forecasted network access usage; and (d) allocating network access available to each user during the future time interval in decreasing order of user priority, with each user's allocation of network access being equal to each user's forecasted network access usage subject to a respective, predetermined maximum value and subject to availability.

Another preferred method of providing network access to the users includes the steps of: (a) monitoring network access usage by each user during a time interval; (b) based on the monitoring, forecasting network access usage by each user over a future time interval; and (c) allocating network access available to each user during the future time interval, with each user's allocation of network access being equal to each user's forecasted network access usage multiplied by a ratio of the total network access available for allocation to the total forecasted network access usage of all users, and subject to a respective, predetermined maximum value and subject to availability.

A third preferred method of providing network access to the users includes the steps of: (a) charging each user a respective fee for network access usage; (b) monitoring network access usage by each user during a time interval; (c) based on the monitoring, forecasting network access usage by each user over a future time interval; (d) prioritizing users based on each user's fee in decreasing order, whereby a user having a greater fee receives a higher priority than a user having a lesser fee; and (e) allocating network access available to each user during the future time interval in decreasing order of user priority, with each user's allocation of network access being equal to each user's forecasted network access usage subject to a respective, predetermined maximum value and subject to availability.

Yet a fourth preferred method of providing network access to the users includes the steps of: (a) applying respective credits to users for network access shortfalls below respective levels of network access specified to the users; (b) monitoring network access usage by each user during a past time interval; (c) based on the monitoring, forecasting network access usage by each user over a future time interval; (d) prioritizing users based on each user's respective credit in decreasing order, whereby a user having a greater credit receives a higher priority than a user having a lesser credit; and (e) allocating network access available to each user during the future time interval in decreasing order of user priority, with each user's allocation of network access being equal to each user's forecasted network access usage subject to a respective, predetermined maximum guaranteed value and subject to availability.

Fourth Aspect of the Present Invention

In the fourth aspect of the present invention, the method includes providing network access across a shared communications medium between competing users pursuant to service level agreements (SLAs) of the users. The method broadly includes the steps of: (a) monitoring network access usage by each user during a time interval; (b) comparing the monitored network access usage by each user with a predetermined threshold value; and (c) soliciting a user to modify the user's SLA if the user's monitored network access usage varies from the predetermined value by a predetermined tolerance.

Features of the present invention include the additional steps of allocating network access to each user for a future time interval, and forecasting network access usage by users in the future time interval. Another additional feature of the present invention includes the step of prioritizing the users for allocating network access to the users.

The network access usage includes the user throughput rate, bandwidth consumption, and/or bandwidth requested for a predetermined period of time. The threshold value preferably represents a respective maximum level of network access (whether maximum allowed or maximum guaranteed) for each user or a respective maximum burstable level of network access with target probability for each user. The solicitation is conducted via email, instant messaging, redirection of a web browser of the user to a solicitation web page, generation and mailing of literature, telephonic communication, or other communication means. The solicited modification of the user's SLA includes guaranteeing a level of network access to the user on a permanent or on a temporary basis. A charge preferably is applied to the user for the modification.

A preferred method of the present invention includes the identification of a recurrent period of high network access usage by a user based on the monitoring, and in response thereto, the solicitation of the user to modify the user's SLA in order to guarantee a minimum level of network access during an anticipated future recurrent period of high network access usage.

Fifth Aspect of the Present Invention

In the fifth aspect of the present invention, the method includes incorporating allocations of network access into a DOCSIS 1.0 compliant cable network wherein users compete for bandwidth. A preferred method includes the steps of: (a) generating cable modem configuration files, each of which limits bandwidth consumption by a cable modem of a user to a value representative of that user's allowance of bandwidth; (b) sending the configuration files to a Trivial File Transfer Protocol (TFTP) Server of the DOC Network; and (c) sending a command either to each user's cable modem, or to a cable modem termination system to which each user's cable modem is connected, to cause the cable modem to acquire its new respective configuration file. Features of the present invention include the additional steps of prioritizing users for allocation of bandwidth, and forecasting bandwidth of each user in a future time interval.

Sixth Aspect of the Present Invention

In the sixth aspect of the present invention, a Carrier Network provides communications between multiple users and Service Providers. The Carrier Network includes computer network equipment defining a Cable Network and an Intermediate Network which, combined, extends between the users and the Service Providers. The Cable Network includes a shared communications medium joining the users with the Intermediate Network, and users compete for network access across the shared communications medium in conveying data. The Carrier Network also includes software that manages the network access of the users.

In accordance with the present invention, the software includes computer-executable instructions performing the steps of monitoring network access usage by each user for a time interval and, based thereon, allocating network access to the users for a future time interval. In additional features of the present invention, the software includes computer-executable instructions performing the additional steps of forecasting network access usage by each user during the future time interval, and prioritizing the users for allocation of network access In additional features of the present invention, the software is distributed within network equipment of the Carrier Network or, alternatively, is stored in hardware physically located at a remote location from the Carrier Network but linked with the Carrier Network for communications therebetween. The hardware remotely located is directly linked with the Carrier Network or is linked indirectly through the Internet.

One of many preferred embodiments of the present invention includes prioritization of users based on one or more various prioritization policies, including the prioritization of users based upon fairness considerations, such as user throughput during a particular time interval, user data loss for a particular time interval, network access usage for a particular time-of-day, an established minimum quality of service (QoS) standard, or combination thereof. Other prioritization policies include the prioritization of users based upon provisions found in each user's respective service level agreement (SLA), and the prioritization of users based upon each user's forecasted network access usage for a future time interval.

Seventh Aspect of the Present Invention

In the seventh aspect of the present invention, the present invention relates to a method of (and to a computer-readable medium with computer-executable instructions for performing the method of) providing network access across a shared communications medium between competing users. The method broadly includes the steps of receiving data representative of past bandwidth of each user during a time interval; forecasting future bandwidth of each user over a future time interval based on the data representative of the past bandwidth; and setting each user's allocation of bandwidth for the future time interval. A feature of the present invention includes the step of prioritizing the users for allocating bandwidth to the users. Preferably, each user's bandwidth allocation represents that user's limit on bandwidth consumption for the future time interval ("bandwidth allowance"), and does not necessarily represent that user's bandwidth consumption during the future time interval.

In a first preferred method, the users are prioritized based on each user's forecasted future bandwidth in increasing order, whereby a user with a lesser forecasted bandwidth receives a higher priority than a user with a greater forecasted bandwidth. The users are then allocated sequentially in decreasing order of user priority, with each user's allocation being set to equal the user's forecasted bandwidth subject to a respective, predetermined maximum value and subject to bandwidth availability.

Another preferred method includes allocating bandwidth that is to be made available to each user during the future time interval, with each user's allocation of bandwidth being set to equal each user's forecasted bandwidth multiplied by a ratio of the total bandwidth available for allocation to the total forecasted bandwidth of all users, and subject to a respective, predetermined maximum value and subject to availability.

A third preferred method includes receiving data representative of a respective fee that is charged to each user for bandwidth, prioritizing users based on each user's fee in decreasing order, whereby a user having a greater fee receives a higher priority than a user having a lesser fee, and setting in decreasing user priority each user's allocation of bandwidth equal to each user's forecasted bandwidth subject to a respective, predetermined maximum value and subject to availability.

Yet a fourth preferred method includes receiving data representative of a respective credit that is applied to each user's account for bandwidth shortfalls below a specified bandwidth value, prioritizing users based on each user's credit in decreasing order, whereby a user having a greater credit receives a higher priority than a user having a lesser credit, and setting in decreasing user priority each user's allocation of bandwidth equal to each user's forecasted bandwidth subject to a respective, predetermined maximum value and subject to availability.

The bandwidth monitored and forecast includes bandwidth that is consumed or, alternatively, bandwidth that is requested for consumption.

Eighth Aspect of the Present Invention

Finally, in the eighth aspect of the present invention, the present invention relates to a method of providing network access across a shared communications medium between competing users. In particular, the present invention includes the steps of allocating network access to at least two "user classes" for a first future time interval and, for each user class, allocating network access to each user within the class for the first time interval. The present invention further includes the additional step of allocating network access to each user class for a second future time interval succeeding the first time interval and, for each user class, allocating network access to each user for the second time interval. Each user receives a first determined allowance of network access for utilization during the first time interval equal to that user's allocation for the first time interval, and a second determined allowance of network access for utilization during the second time interval equal to that user's allocation for the second time interval. The user allocations—and hence the user allowances—preferably differ as between the first and second time intervals.

As used herein, a "bandwidth allowance" represents a respective maximum level of network access that will be made available to a user class or to a user during a particular time interval, and does not necessarily represent the level of network access that will be utilized by the user class or user during such time interval.

As used herein, a "user class" is intended to refer to a grouping of users who compete for access across a shared communications medium and who have some characteristic in common. The characteristic may, for example, be that the users are customers who receive Internet service over the shared communications medium from the same service provider. The characteristic also may, for example, be that the users each subscribe to receive a particular level of network access across the shared communications medium, or that the users receive the same level of a particular service that is provided across the shared communications medium. Furthermore, a user class is a grouping of users to which, collectively, a determined amount of bandwidth is allocated as opposed to other user classes. In this regard, users that are not classified are considered to be part of a default user class having in common that fact that no other classification applies to them. Accordingly, all users of a shared communications network can be classified.

In features of the present invention, the method includes the steps of monitoring network access usage by the users, and forecasting network access usage of each user in a future time interval. Another feature includes the step of prioritizing the users for the allocation of network access.

One of many preferred embodiments of the present invention includes the monitoring of bandwidth consumption of each user across the shared communications medium of a Cable Network and tracking the collective bandwidth consumption of each user class; based on the monitored bandwidth consumptions, the forecasting of bandwidth consumption of each user in a future time interval and the calculation based thereon of the collective bandwidth consumption of each user class; the prioritization of users and the prioritization of user classes; and the subsequent allocation of bandwidth to each user class, and then to each user, in decreasing order of priority for determining bandwidth allowances during the future time interval. Users and user classes are prioritized based on one or more various prioritization policies, including fairness considerations such as individual or collective user throughput during a particular time interval, individual or collective user data loss for a particular time interval, individual or collective user bandwidth consumption for a particular time-of-day, an established minimum quality of service (QoS) standard, or combination thereof. Other prioritization policies include the prioritization of users and user classes based upon provisions found in each user's respective service level agreement (SLA) or provisions found in each class' service level agreement (CSLA), and the prioritization of users based upon each user's forecasted bandwidth consumption for the future time interval and the prioritization of user classes based upon each class' collective forecasted bandwidth consumption. In alternative embodiments, the bandwidth that is requested, rather than the bandwidth that is consumed, is monitored and forecasted.

BRIEF DESCRIPTION OF THE DRAWINGS

Further features and benefits of the present invention will be apparent from a detailed description of preferred embodiments thereof taken in conjunction with the following drawings, wherein like elements are referred to with like reference numbers, and wherein.

DETAILED DESCRIPTION OF PREFERRED EMBODIMENTS

In the following detailed description, numerous specific details are set forth with regard to preferred embodiments of the present invention in order to provide a thorough understanding of the present invention; however, it will be apparent to ordinary artisans that the present invention may be practiced without all of these specific details. Well-known structures and devices also are shown in block diagram form, the specific details of which are not considered a necessary part of the present invention. Furthermore, as will become apparent to ordinary artisans, the present invention may be embodied in or performed by hardware, firmware, or software, or various combinations thereof.

Figure 1:
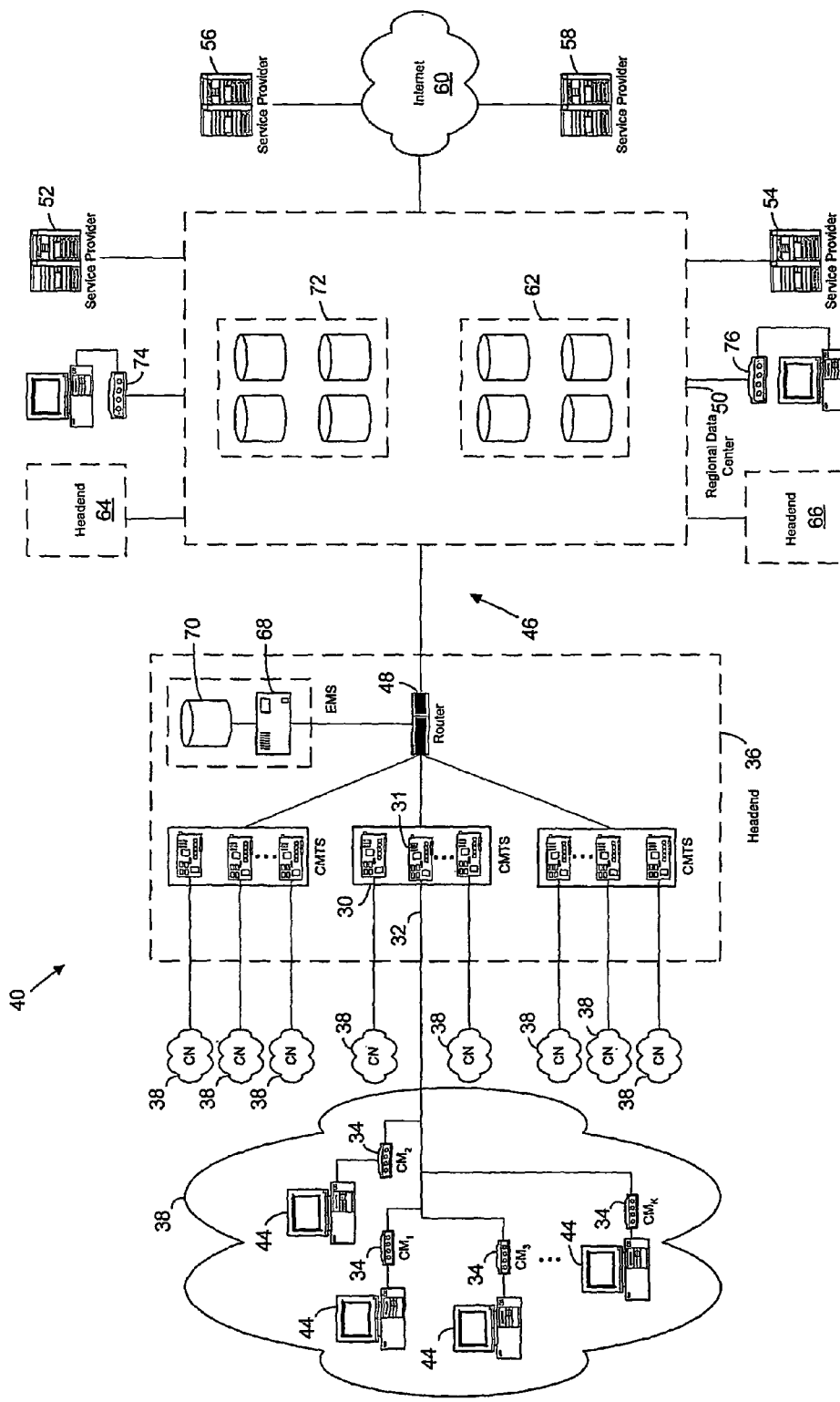
FIG. 1 illustrates a conventional DOC Network.

As described above, a conventional DOC Network 40 is shown in FIG. 1 and includes a plurality of Cable Networks 38, with a particular Cable Network 38 being illustrated in an expanded view and comprising a group of CMs 34, each connected to a computer 44 representing a user. Additionally, as used herein, "user" includes not only a person who interacts with a computer 44, but any additional persons who also interact with the same computer 44, as well as any group of persons all of whom interact with computers attached either to the same CM 34 or to the same computer 44 which, itself, is attached to a CM 34. While not shown, such additional arrangements are well known in the art.

The CMs 34 are connected by a coaxial cable 32 with a CMTS 30 and, specifically, to a card 31 mounted within the CMTS 30. Each of the CMTSs of the DOC Network 40 preferably includes a plurality of cards, with each card supporting a group of CMs connected thereto in an inverted tree configuration to define a Cable Network 38. Furthermore, each CMTS conventionally supports up to 1,500 users, although recent CMTSs have been introduced that support up to 15,000 users.

Each Cable Network 38 defines a Shared Access Carrier Network, wherein data of respective users in each are conveyed together through a shared coaxial cable. For instance, data packets (or frames) addressed to at least one of the computers 44 are transmitted by the CMTS 30 downstream over the coaxial cable 32 to all of the CMs 34 within a 6 MHz data channel. Conversely, data packets intended for delivery to the CMTS 30 and beyond are transmitted by a CM 34 upstream to the CMTS 30 over the coaxial cable 32 within a 2 MHz channel.

The Cable Network 38 shown in expanded view in FIG. 1 is a traditional all coaxial cable network. The other Cable Networks 38 collectively include both traditional all coaxial cable networks as well as HFC networks.

The CMTS 30 transmits and receives data packets between the Cable Networks 38 and an Intermediate Network 46, which begins with a router 48 in the headend 36, and includes switched and routed network equipment at a Regional Data Center 50 that provides connectivity to service providers 52,54,56,58, either directly or through the Internet 60. In this regard, during user communications the router 48 conveys data packets from the CMTS 30 to the Regional Data Center 50 of the DOC Network 40 and, conversely, routes data packets received from the Regional Data Center 50 to the appropriate CMTS for delivery to a particular user. Data packets that are conveyed to the Regional Data Center 50, in turn, are directed on to an appropriate service provider 52,54 directly connected to the Regional Data Center 50, or to an appropriate service provider 56,58 indirectly connected to the Regional Data Center 50 via the Internet 60. Alternatively, data packets from users are conveyed to a server of an application server group 62 of the Regional Data Center 50, which includes, for example, servers supporting Web hosting, news, chat, SMTP, POP3, Proxy, cache and content replication, and streaming media.

The Cable Networks 38 stemming from headend 36 are maintained by a Carrier which also may maintain the Regional Data Center 50 as well as serve as a service provider. Moreover, the Carrier may maintain the Cable Networks of additional headends 64,66, or of only one or more of the headends 64,66. In any event, the Cable Networks that are maintained by the Carrier are administered on a daily basis through an element management system (EMS) 68. The EMS 68 comprises an operations system designed specifically to configure and manage CMTSs and associated CMs, and includes a CM database 70. Operational tasks performed by the EMS 68 include provisioning, day-to-day administration, and testing of various components of each CMTS. The EMS 68 typically is located at a central network operations center of the Carrier, but may be collocated at the headend 36 of the Carrier as shown in FIG. 1.

The DOC Network 40 is managed through a control plane server group 72 typically located at the Regional Data Center 50. The control plane server group 72 includes the usual servers necessary to run the DOC Network 40, such as user authorization and accounting servers, log control servers (Syslog), IP address assignment and administration servers (DHCP, TFTP), domain name servers (DNS), and DOCSIS control servers.

For purposes of comparison, two dedicated connections also are shown in FIG. 1, wherein a telephony modem 74 and an ISDN modem 76 are connected directly to the Intermediate Network 46 at the Regional Data Center 50. As will be immediately apparent, data conveyed over each dedicated connection is between a single user and the Intermediate Network 46, and is not combined with data of other users over a shared communications medium as in each Cable Network 38.

As is common in conventional Cable Networks 38 such as those shown in the DOC Network 40 of FIG. 1, when a CM comes online the CM is assigned a configuration file which, inter alia, sets a constant limit on the bandwidth that can be utilized in the downstream direction by the CM during any particular interval of time, and sets a constant limit on the bandwidth that can be utilized in the upstream direction by the CM during any particular interval of time. The configuration file also includes other parameters, such as the IP address for the CM.

The configuration file for each CM conventionally is obtained by the CM when first brought online, or when the CM is reset. The upstream and downstream bandwidth limits are predetermined by the Carrier or other appropriate entity, the determination of which is based on the expected number of users to be serviced by the particular Cable Network 38 to which the CM belongs.

With particular regard to data transmissions in the downstream direction, when the bandwidth limit is reached in receiving data within a particular time interval, the CM transmits a signal to the router 48 to cease further data forwarding for the remainder of the time interval. Thereafter, whereas any data received by a CMTS is relayed on to the CM as the data is received, any additional data received by the router 48 during the remainder of this time interval is stored for later transmission in a buffer up to a threshold limit and, thereafter, any further data received within the time interval is dropped.

With regard to data transmissions in the upstream direction, when the CM registers with the CMTS following receipt by the CM of its configuration file, the CM informs the CMTS of the constant bandwidth limit to be applied to upstream transmissions from the CM. Then, actual requests for bandwidth (i.e., requests for timeslots) for transmission of data in the upstream direction are submitted regularly by each CM to the CMTS. In response to the submissions, the CMTS schedules timeslots in a particular time interval to the CMs for exclusive transmission of data within each timeslot by a respective CM. However, the CMTS does not grant an amount of bandwidth (by assigning too many timeslots) to a particular CM that would exceed the constant bandwidth limit for the particular CM.

The timeslots are assigned to requesting CMs based on an established assignment policy. For example, timeslots may be assigned by the CMTS on a first-in-first-out basis, or timeslots may be assigned equally to the CMs that request bandwidth within a particular window of time. The requesting CMs also may be prioritized by the CMTS for assignment of the timeslots.

Figure 2:
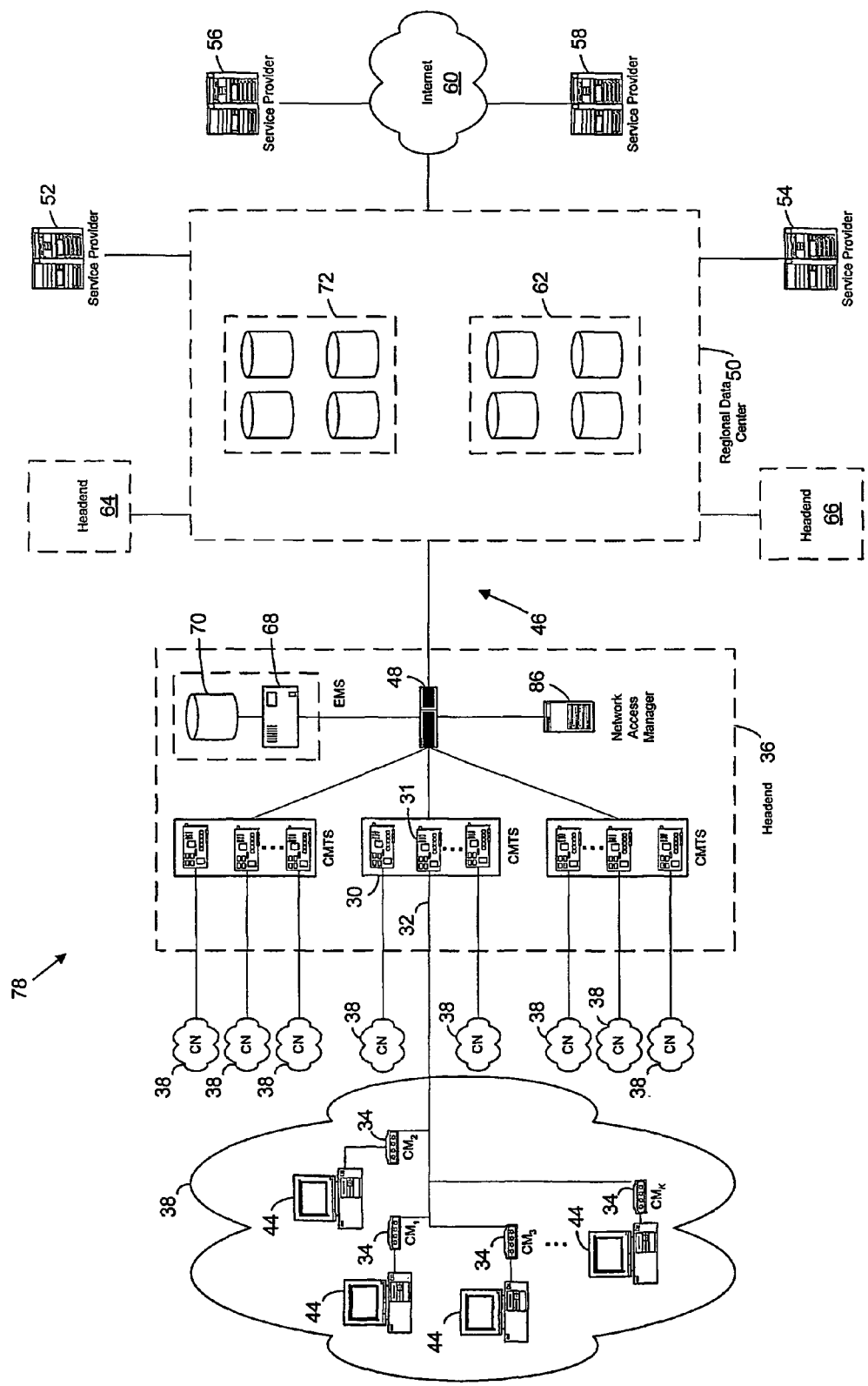
FIG. 2 illustrates a first DOC Network of the present invention.
Figure 3:
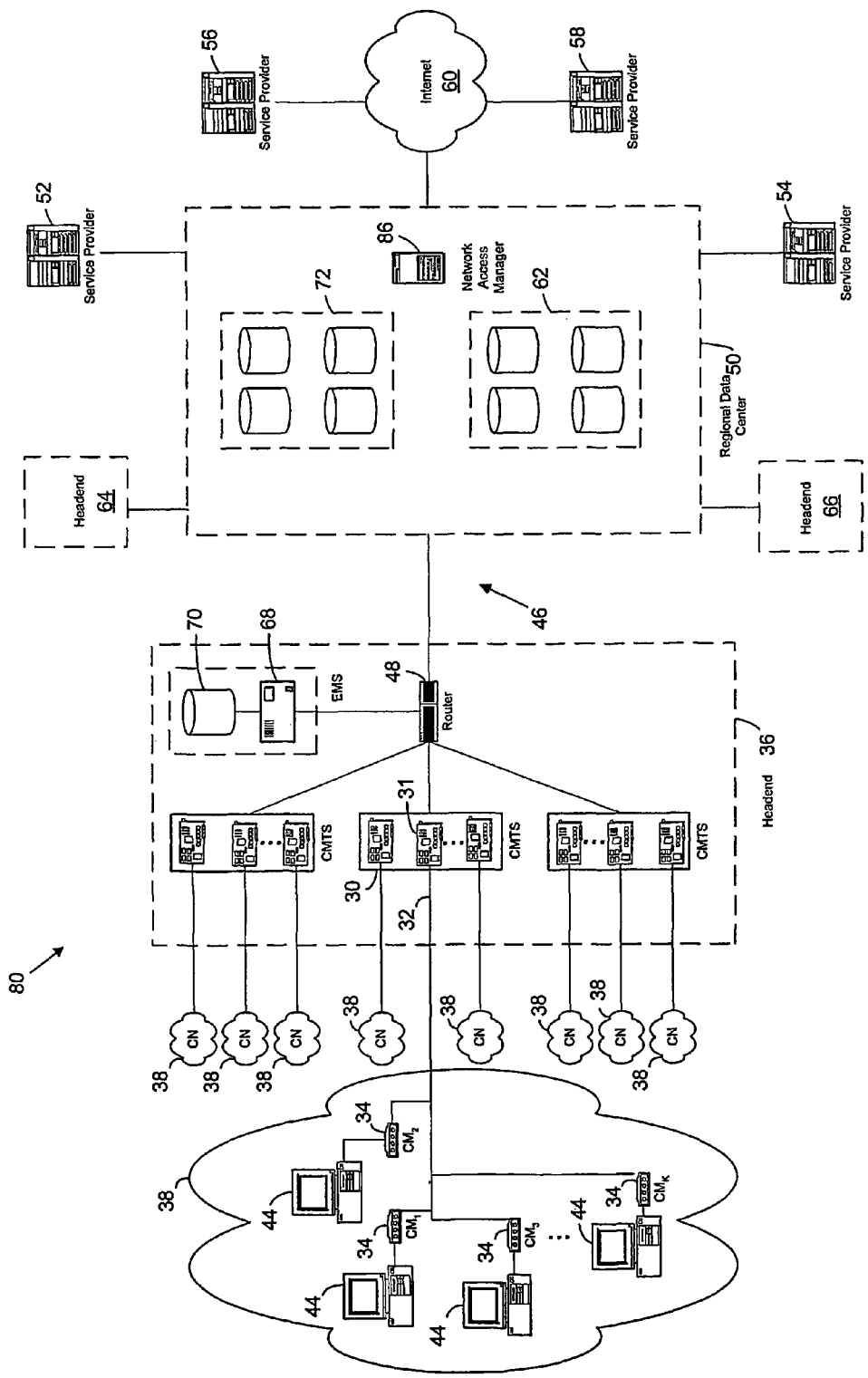
FIG. 3 illustrates a second DOC Network of the present invention.
Figure 4:
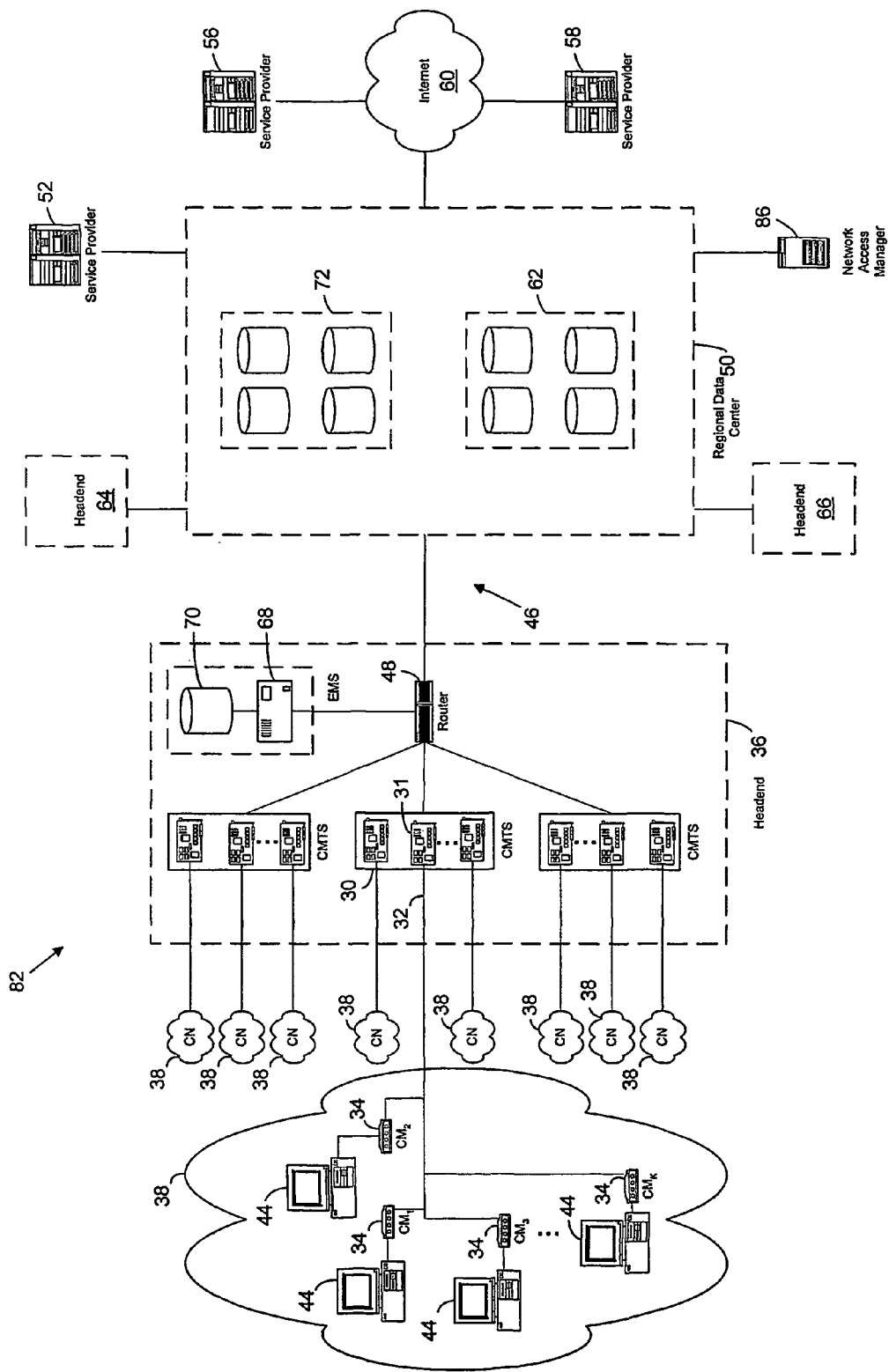
FIG. 4 illustrates a third DOC Network of the present invention.
Figure 5:
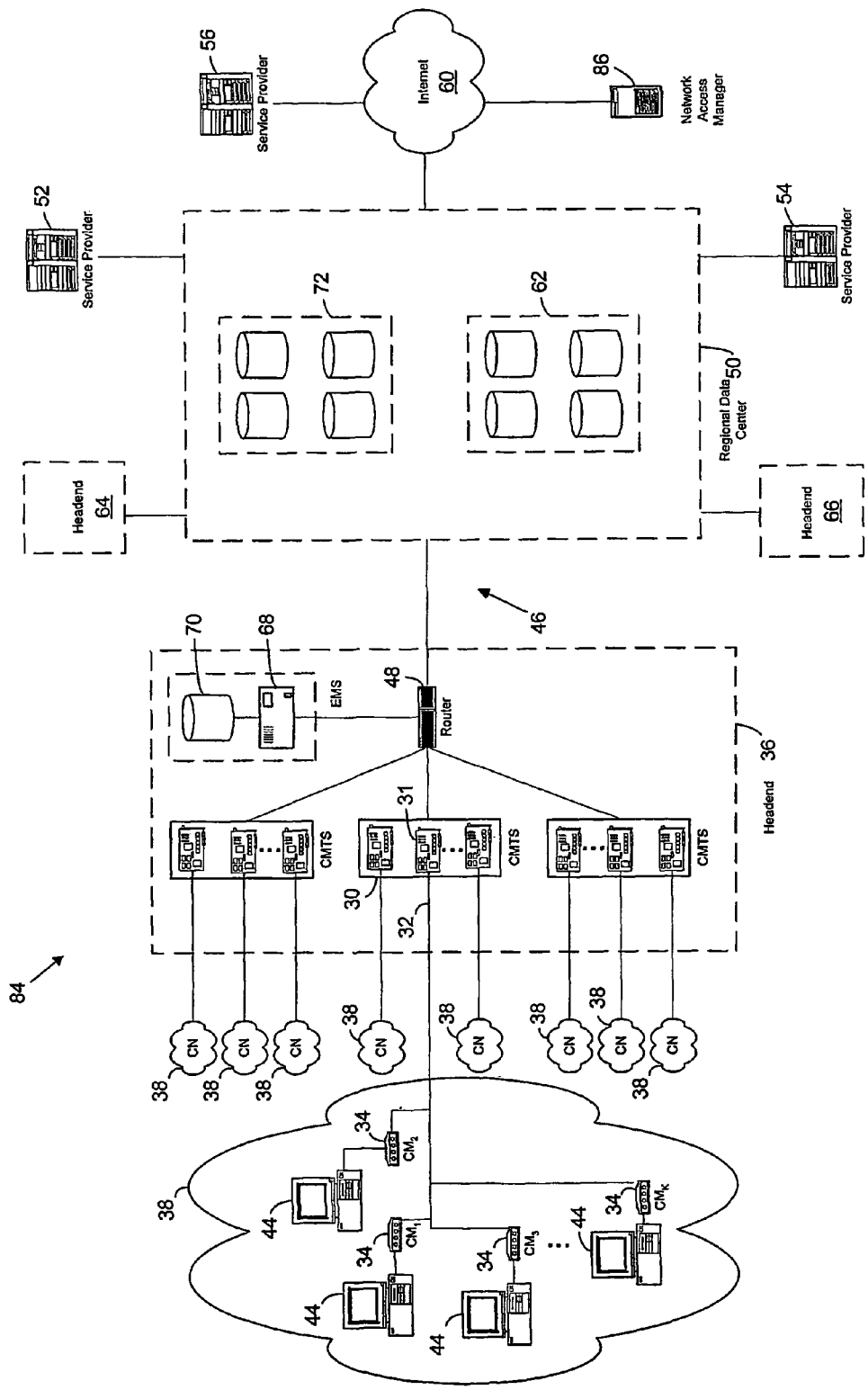
FIG. 5 illustrates a fourth DOC Network of the present invention.

Preferred embodiments 78,80,82,84 of a DOC Network in accordance with the present invention are shown, respectively, in FIGS. 2-5, wherein each includes a "network access manager" 86 in accordance with the present invention. In FIG. 2 the network access manager 86 is located in the headend 36 of the DOC Network 78, in FIG. 3 the network access manager 86 is located at the Regional Data Center 50 of the DOC Network 80, and in FIGS. 4-5 the network access manager 86 is remotely located, but is disposed for communication with the respective DOC Network 82,84, either directly as shown in the DOC Network 82 of FIG. 4, or indirectly via the Internet 60 as shown in the DOC Network 84 of FIG. 5.

The network access manager 86 preferably comprises a hardware component having software modules for performing methods in accordance with the present invention. For commercial purposes, especially in enhancing existing DOC Networks, preferably the network access manager 86 is self-contained and need only be connected in communication with the DOC Network to operate correctly. In a DOC Network that is being upgraded or established, preferably the software modules are distributed within the DOC Network itself and may or may not include any additional hardware components such as the network access manager 86. For example, the software modules may be incorporated into the EMS, CMTS, and control plane server group of a DOC Network, thereby avoiding the expense of additional computer hardware components.

Figure 6:
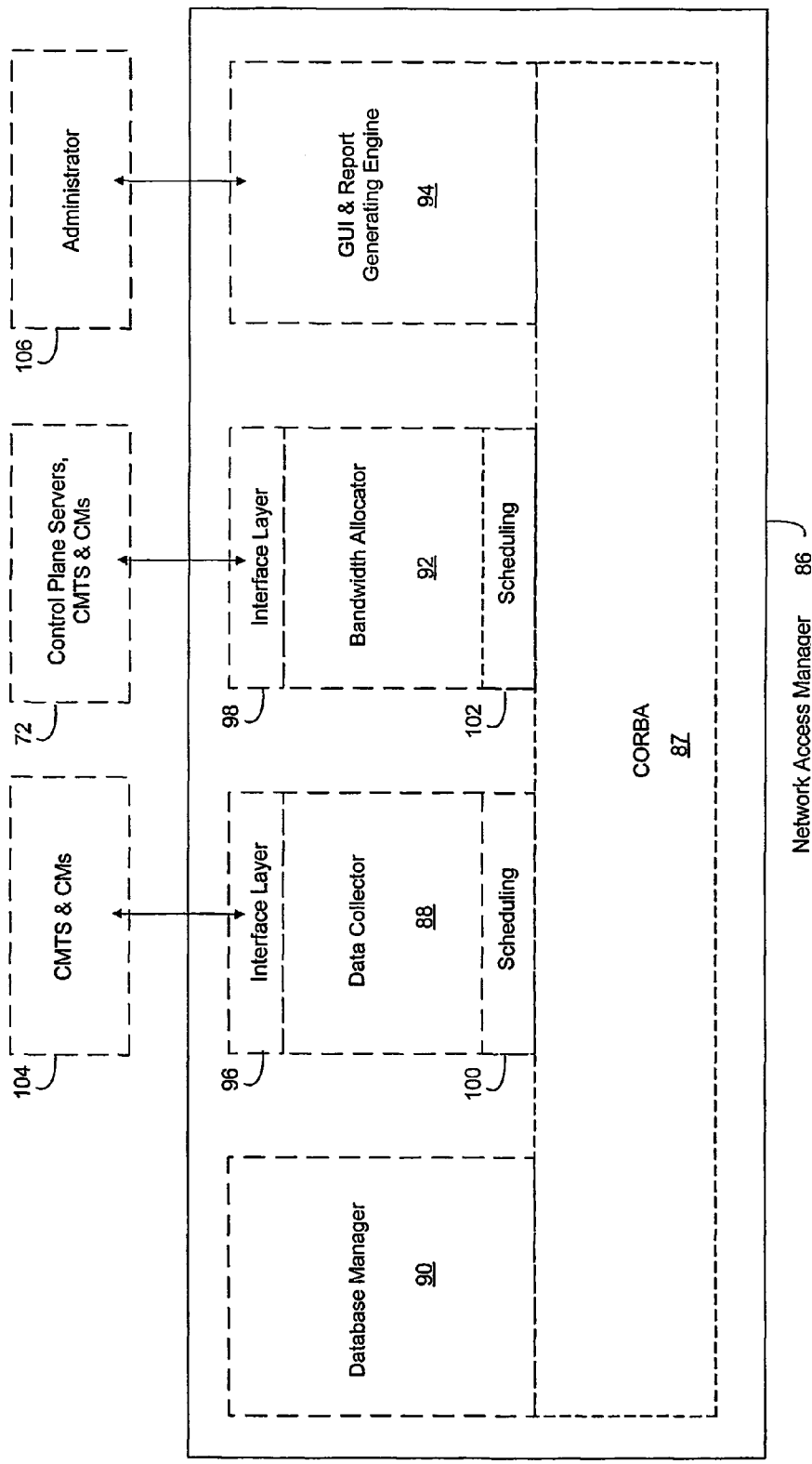
FIG. 6 illustrates a system architecture of software components that perform preferred methods of the present invention in the DOC Networks of FIGS. 2-5.

In order to accommodate deployment and implementation of the present invention, the software modules preferably are designed as peers within a messaging infrastructure and, in particular, within a CORBA infrastructure 87, the system architecture of which is shown in FIG. 6. Due to the interoperability of the peers to the CORBA infrastructure 87, the separate modules readily call upon each other as described in detail below without regard to differences in location between the modules. Nevertheless, for ease of deployment, the network access manager 86 is best suited for deployment and implementation of the present invention in established DOC Networks, whether situated within the Intermediate Network as in FIGS. 2-3, or remotely situated as in FIGS. 4-5.

The software modules include a Data Collector 88, a Database Manager 90, Bandwidth Allocator 92, and GUI & Report Generating Engine 94. The Data Collector 88 and Bandwidth Allocator 92 each includes an external system interface layer 96,98, respectively, that enables it to communicate with network equipment of a DOC Network. In the system architecture of preferred embodiments, the Data Collector 88 communicates with each CMTS and CMs of each Cable Network for which network access is managed by the network access manager 86, and the Bandwidth Allocator 92 communicates with the control plane server group 72 of the DOC Network as well as with the CMTS and CMs.

If a DOC Network is DOCSIS 1.0 compliant, then each external system interface layer 96,98 is a DOCSIS external system interface layer. If a DOC Network uses proprietary interface specifications, then each external system interface layer 96,98 is designed based on the proprietary interface specifications. In either case, however, the Data Collector 88 and Bandwidth Allocator 92 generally need not be modified; only the external systems interface layers 96,98 thereof need be changed based on the particularities of the DOC Network. Each of the Data Collector 88 and Bandwidth Allocator 92 also includes a scheduling element 100,102, respectively, that schedules the timing of actions and communications thereof with the network equipment of a DOC Network.

The GUI & Report Generating Engine 94 communicates with an Administrator 106 of the network access manager 86, preferably through a web server, whereby the Administrator 106 sets up and configures the network access manager 86 and accesses reports generated by the network access manager 86, such as graphs of bandwidth consumption and bandwidth requested per time interval for a user. The Administrator 106 may be the Carrier, a service provider, or some other entity, such as the entity managing the Regional Data Center 50 or a third-party responsible for maintenance of the network access manager 86.

The Database Manager 90 stores configuration and setup information received from the GUI & Report Generating Engine 94, as well as information processed by the Data Collector 88. The Database Manager 90 also provides information to the Bandwidth Allocator 92 and GUI & Report Generating Engine 94 as requested via the CORBA infrastructure 87.

Having now described in detail the structure of preferred DOC Networks 78,80,82,84, preferred methods of the present invention will be described with reference thereto.

In accordance with preferred methods of the present invention, network access usages of each user in the upstream and downstream directions are monitored through the Data Collector 88. Specifically, the Data Collector 88 issues queries to the CMTS and CM to which counter values of logical data units (LDUs) are returned for a user. Preferably, counter values are returned for the number of bytes and the number of data packets that are transmitted in both the upstream and downstream directions, the number of bytes and the number of data packets that are dropped in both the upstream and downstream directions, the number of bytes and the number of packets that are requested to be transmitted in the upstream direction, and the time for which the counter values are returned. Accordingly, as used herein the phrase "monitoring network access usage" is intended to refer to the collection of data representative of at least one of: (i) the number of LDUs that are transmitted in a particular direction across a shared communications medium; (ii) the number of LDUs that are dropped in transmitting in a particular direction across a shared communications medium; and (iii) the number of LDUs that are requested to be transmitted in a particular direction across a shared communications medium.

In a DOCSIS compliant DOC Network, the information is collected from the CMTS and CMs of a Cable Network via the simple network management protocol (SNMP). The counter values for bytes and data packets that are transmitted and that are dropped in the upstream direction from each CM, and the number of bytes and data packets that are requested to be transmitted in the upstream direction from each CM, are recorded by the CMTS in accordance with a management information base (MIB) of a DOCSIS compliant CMTS. Likewise, the counter values for bytes and data packets that are transmitted and that are dropped in the downstream direction from the CMTS to a CM are recorded by the CM in accordance with a MIB of a DOCSIS compliant CM. Both bytes and data packets are monitored since each data packet may vary in the number of bytes it contains.

The scheduling element 100 of the Data Collector 88 initiates the data collection from each CMTS and from the CMs connected thereto, preferably at different predetermined time intervals. For example, the data collection from a CMTS preferably occurs at five minute intervals and data collection from the CMs connected thereto preferably occurs at thirty minute intervals. The data collection from the CMs preferably is less often than the data collection from the CMTS in order to minimize consumption of bandwidth across the Cable Network that otherwise would be allocated to users.

When the counter values and time thereof are returned to the Data Collector 88, the Data Collector 88 calculates the change over time for each counter value to arrive at the average rates of bytes and data packets that are successfully transmitted, the average rates of bytes and data packets that are requested to be transmitted, and the average rates of bytes and data packets that are dropped. The respective rates and time intervals for the rates (as well as the counter values and time stamp data) are then communicated to the Database Manager 90, which stores the information in a user statistics table ("stats") for later use by the Bandwidth Allocator 92 and GUI & Report Generating Engine 94.

The Bandwidth Allocator 92 continually determines the network access—or bandwidth in a Cable Network—that may be utilized by each user class, and by each user within each class, over succeeding time intervals. Each allowance is determined by first allocating bandwidth to the user classes, and then allocating bandwidth to the users in each class, in accordance with one or more selected allocation policies. Furthermore, as set forth above, each allowance is an amount of bandwidth up to which a user class or user may consume, but is not necessarily the amount of bandwidth that a user class or user will consume; it is an upper limit on such amount.

Figure 24:
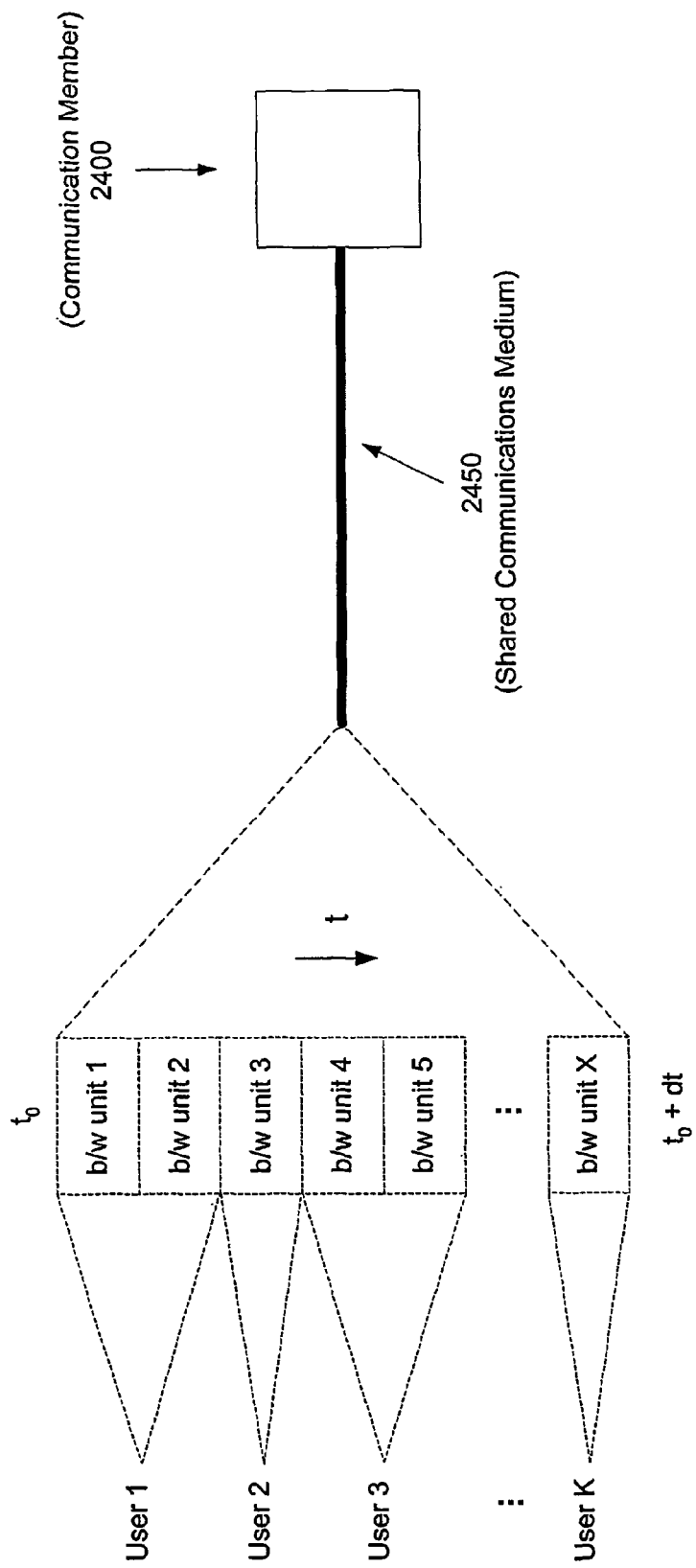
FIG. 24 illustrates the allocation of bandwidth to users within a class during a first time interval.
Figure 25:
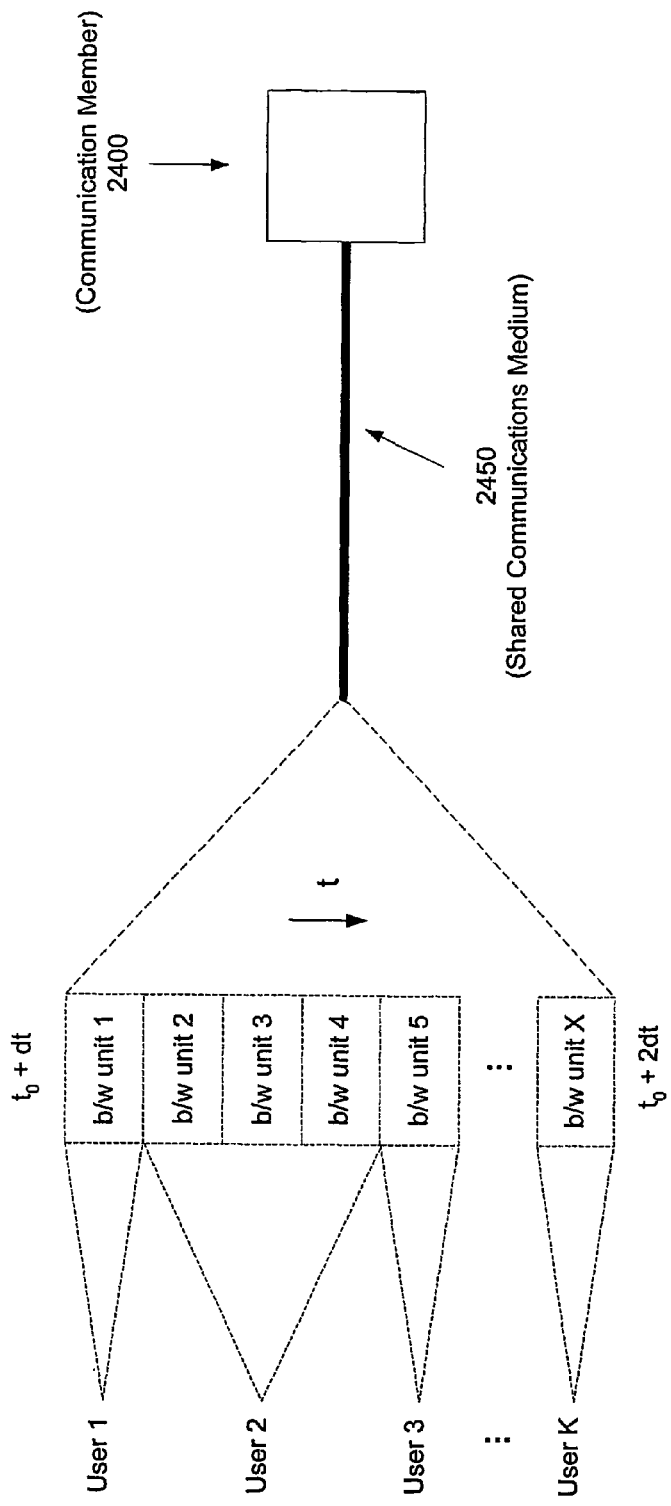
FIG. 25 illustrates the allocation of bandwidth to the users of FIG. 24 during a second time interval.

For example, with reference to FIG. 24, a selected allocation policy has resulted in the allocation of bandwidth to the users of the shared communications medium 2450 for a time interval extending from $t_0$ to $(t_0+dt)$, User 2 and User K each is allocated a single bandwidth unit (b/w unit 3 and b/w unit X, respectively), while User 1 and User 3 each is allocated two bandwidth units (b/w unit 1 and b/w unit 2 to User 1, and b/w unit 4 and b/w unit 5 to User 3). As shown in FIG. 25, in the next time interval extending from $(t_0+dt)$ to $(t_0+2dt)$, User 1, User 3, and User K each is allocated a single bandwidth unit (b/w unit 1, b/w unit 5, and b/w unit X, respectively), while User 2 is allocated three bandwidth units (b/w unit 2, b/w unit 3, and b/w unit 4). In this example, all users are grouped within the same class, and the bandwidth units in this example broadly represent network access to the communication member 2400 that is shared between the users across the shared communications medium 2450.

In accordance with the present invention, respective user bandwidth allowances for each time interval are equated with these user allocations of bandwidth, whereby no user receives more bandwidth in a time interval than that user's respective bandwidth allowance for that time interval. Furthermore, it is important to distinguish what a user actually may be "allocated" in the context of the bandwidth that is actually utilized or consumed by such user, as opposed to bandwidth allocations to a user in accordance with the present invention. The bandwidth allocation in accordance with the present invention represents a limit on the amount of bandwidth that can be allocated to a user for a time interval—and hence is equated with a bandwidth allowance; it does not represent per se the amount of bandwidth that the user actually will utilize in the time interval.

In determining network access allocations (and thus allowances) in the preferred embodiments herein described, the Bandwidth Allocator 92 preferably performs three routines, including: the prediction of bandwidth of each user class, and each user within each class, in a predetermined future interval of time ("First Routine"); the prioritization of user classes, and users within each class, for allocation of bandwidth ("Second Routine"); and the actual allocation of bandwidth for each user class, and each user within each class, for determining the bandwidth allowances for the future time interval ("Third Routine").

The First Routine preferably is performed utilizing statistical analysis of past bandwidth consumption of each user or, alternatively, past bandwidth requested for each user, and the forecasted bandwidth includes the bandwidth expected to be consumed by each user or, alternatively, the bandwidth expected to be requested by each user. Any function, method, or algorithm that generates an estimate of a future sample based on previously encountered samples may be used and many are well known in the art of statistical analysis as is evident from SPYROS MAKRIDAKIS ET AL., FORECASTING METHODS AND APPLICATIONS (3d. Ed. John Wiley & Sons 1998), which is hereby incorporated by reference. With regard to user classes, preferably a collective forecasted bandwidth for each class is determined by summing the forecasted bandwidth of all users within the class.

Figure 7:
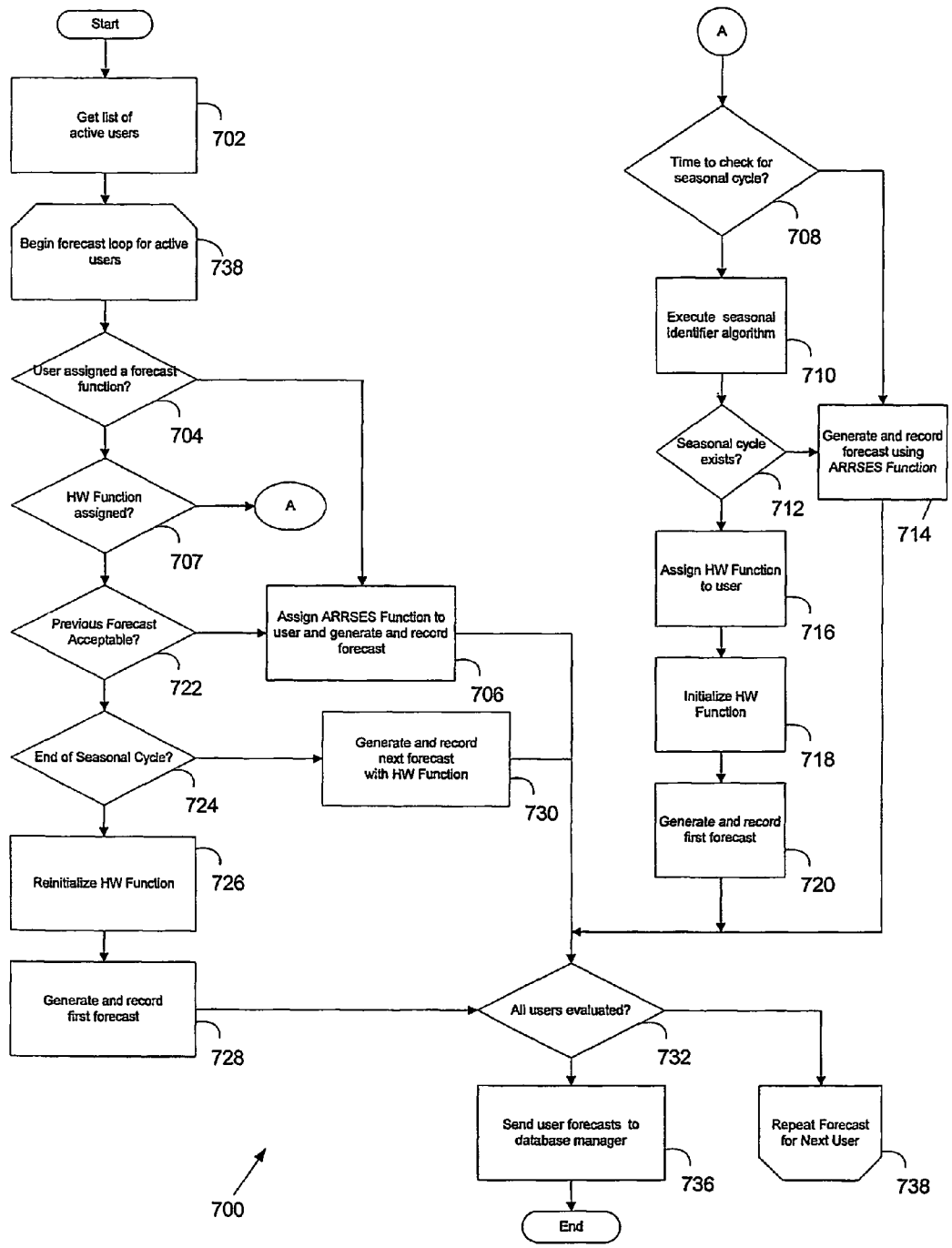
FIG. 7 illustrates a flowchart of the steps of a preferred routine for forecasting bandwidth of each user for a future time interval.

The preferred algorithm for predicting each user's forecasted bandwidth includes the combined use of an adaptive-response-rate single exponential smoothing function (ARRSES Function) and a Holt-Winters' seasonal exponential smoothing function (HW Function). These two functions are utilized according to the forecast generation flowchart of FIG. 7. The input includes a list of active users and the applicable time intervals for bandwidth allocation.

The First Routine 700 begins by identification (Step 702) of the users of the Cable Network to which bandwidth is to be allocated in the Third Routine. Then, for each user, bandwidth for a succeeding time interval is predicted according to either the ARRSES Function or HW Function by first determining (Step 704) whether the user previously has been assigned a forecast function. If not, then in Step 706 the ARRSES Function is assigned to the user and the ARRSES Function is used to generate and record the forecasted bandwidth for the succeeding time interval.

On the other hand, if it is determined in Step 704 that a forecast function is assigned, but it is determined in Step 707 that the forecast function is not the HW Function, then a determination is made (Step 708) whether to check for a seasonal cycle of the user. This determination in Step 708 is made by checking the elapsed time since the last seasonal check was made, with a seasonal check being made after a predetermined period of time elapses. If the determination in Step 708 is affirmative, then a seasonal identifier algorithm is executed (Step 710), in which an autocorrelation function and a seasonal identifier function are performed. The autocorrelation function is well known in the art of statistical analysis, and is used to identify elements in a time series which are influential on a current observation of that same series. Based on the output of the autocorrelation function, the seasonal identifier function identifies possible seasonal cycles of the time series by identifying local maxima of the results of the autocorrelation function.

Based on the results of the seasonal identifier function, a determination is made (Step 712) whether an actual seasonal pattern exists. If a seasonal pattern is not found, or if it is not yet time to check for a seasonal cycle, then a forecast is generated and recorded (Step 714) using the ARRSES Function. If a seasonal pattern is found, then the HW Function is assigned (Step 716) to the user, the HW Function is initialized (Step 718), and the first forecast is generated and recorded (Step 720) using the HW Function.

If it is determined in Step 707 that the current function assigned to the user already is the HW Function, then the determination is made (Step 722) whether the last forecasted bandwidth was acceptable. This determination is made by comparing whether the forecasted bandwidth was within 10% of the actual bandwidth consumed or requested. If this determination in Step 722 is negative, then the ARRSES Function is assigned to the user and the new forecast is generated and recorded in accordance with the ARRSES Function (Step 706). If the last forecast is determined (Step 722) to have been acceptable, then a determination is made (Step 724) whether the seasonal cycle has ended. If the seasonal cycle has ended, then the HW Function is reinitialized (Step 726), and the first forecast of the next seasonal cycle is generated and recorded (Step 728) via the HW Function. If the seasonal cycle has not expired, then the next forecast is generated and recorded (Step 730) in accordance with the HW Function.

Following each of Step 706, Step 714, Step 728, and Step 730, the Bandwidth Allocator 92 determines (Step 732) whether the forecasting has been completed for all users and, if not, then repeats (Step 738) a forecast loop for a remaining user. If it is determined in Step 732 that all users have been evaluated, then the forecasts are communicated (Step 736) to the Database Manager 90 and the forecasting routine ends.

A forecast of bandwidth for a user in a future time interval is generated in accordance with the ARRSES Function via the following formulas:

$$F_{N+1} = F_N + \alpha_N(B_N - F_N)$$

$$\alpha_{N+1} = |SE_N / SAE_N|$$

$$SE_{N+1} = SE_N + \beta(B_{N+1} - F_{N+1} - SE_N)$$

$$SAE_N = \beta|(B_N - F_N)| + (1-\beta)SAE_{N-1}$$

wherein,

F is the bandwidth that is expected to be consumed by a user for a time interval (or the bandwidth that is expected to be requested by a user);

B is the bandwidth that is actually consumed by a user for the time interval (or the bandwidth that is actually requested by a user);

N is the present time interval;

N−1 is the previous (immediate past) time interval;

N+1 is the next (immediate future) time interval; and

β is a selected parameter affecting the responsiveness to change of the ARRSES

Function when the bandwidth of a user changes between time intervals. Bandwidth is predicted both for the 6 MHz channel in the downstream direction as well as the 2 MHz channel in the upstream direction. Preferably each time interval is thirty minutes in length, but preferably may range from fifteen minutes to sixty minutes in length when bandwidth is forecast in the downstream direction. Preferably each time interval is five minutes in length, but preferably may range from one minute to fifteen minutes in length when bandwidth is forecast in the upstream direction.

Figure 8:
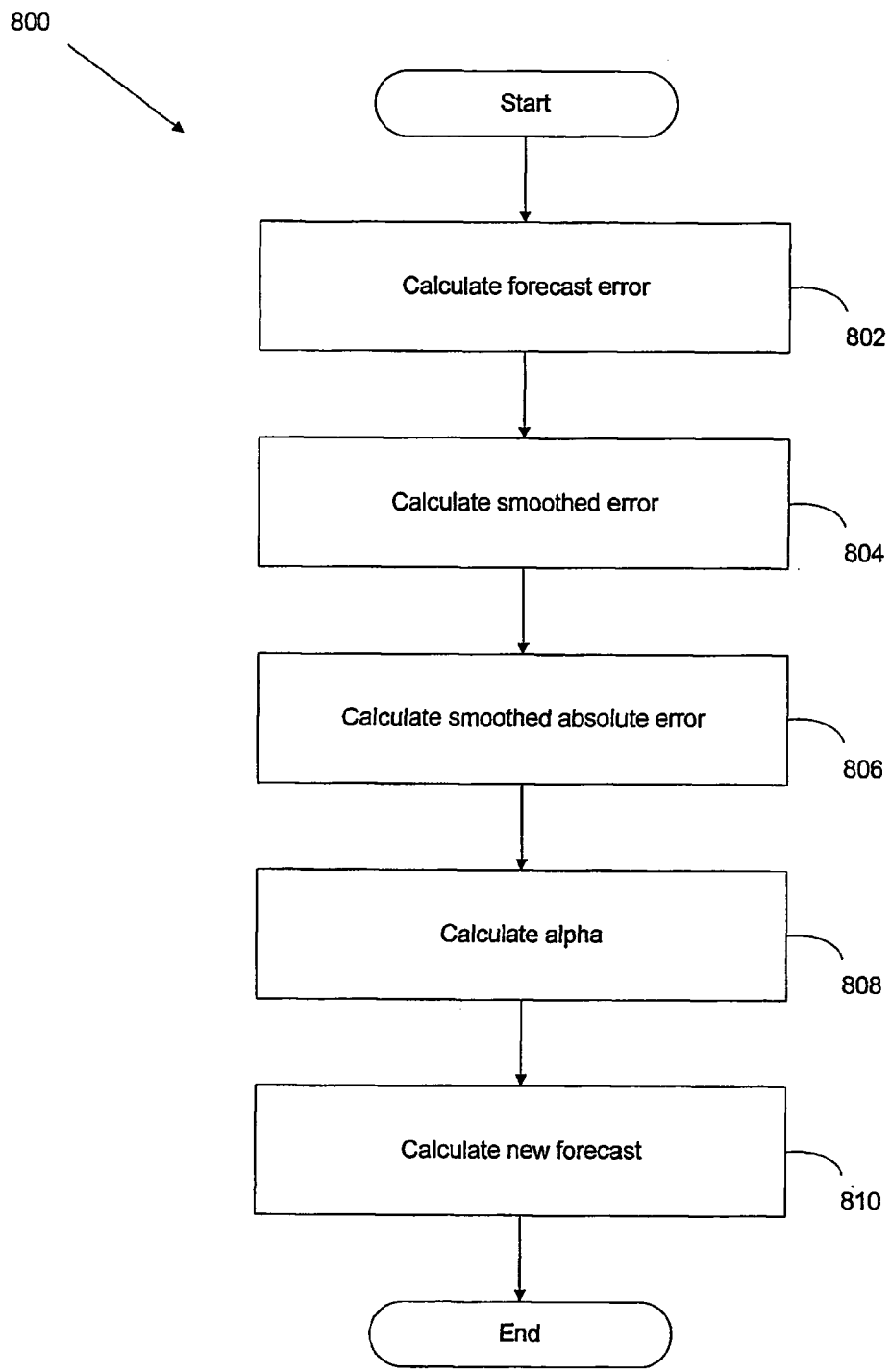
FIG. 8 illustrates a flowchart of the steps of generating a forecasted bandwidth for a user in accordance with the ARRSES Function of the preferred routine of FIG. 7.

The steps in generating a forecast in accordance with the ARRSES Function are set forth in FIG. 8, and include the calculation (Step 802) of a forecast error, the calculation (Step 804) of a smoothed error, the calculation (Step 806) of a smoothed absolute error, the calculation (Step 808) of alpha, and the calculation (Step 810) of the new forecast.

A forecast of bandwidth of a user for a future time interval is generated in accordance the HW Function via the following formulas:

$$L_s = 1/s(Y_1 + Y_2 + \ldots + Y_s)$$

$$b_s = 1/S[(Y_{s+1}-Y_1)/s + (Y_{s+2}-Y_2)/s + \ldots + (Y_{2s}-Y_s)/s]$$

$$S_1 = Y_1/L_s,\ S_2 = Y_2/L_s,\ \ldots\ S_s = Y_s/L_s$$

$$L_t = \alpha(Y_t/S_{t-s}) + (1-\alpha)(L_{t-1} + b_{t-1})$$

$$b_t = \beta(L_t - L_{t-1}) + (1-\beta)b_{t-1}$$

$$S_t = \gamma Y_t/L_t + (1-\gamma)S_{t-s}$$

$$F_{t+m} = (L_t + b_t m)S_{t-s+m}$$

wherein, $L_i$ = an average level of bandwidth after time interval i, $b_i$ = the trend after time interval i, $s_i$ = the seasonal influence at time interval i, s = length of seasonal cycle (in number of time intervals), $Y_i$ = monitored bandwidth consumed or requested in time interval i t = time of initialization, m = the number of time intervals into the future for which a forecast is made, and α, β, and γ are parameters of the forecast method whose values are determined by doing a grid search over the domain of possible values of these parameters in an attempt to minimize the mean-squared-error of the forecast method, each of α, β, and γ falling between 0 and 1.

Figure 9:
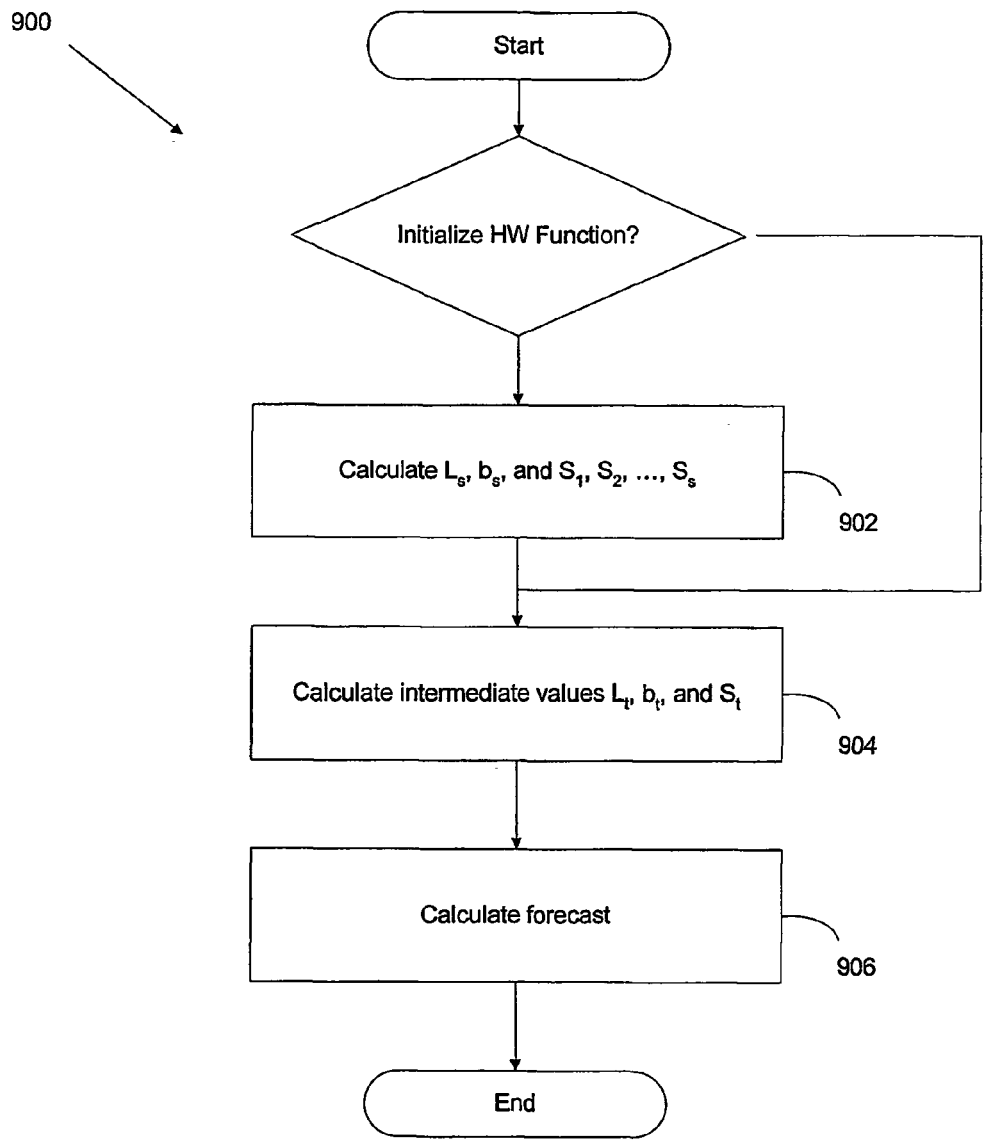
FIG. 9 illustrates a flowchart of the steps of generating a forecasted bandwidth for a user in accordance with the HW Function of the preferred routine of FIG. 7.

The steps in generating a forecast in accordance with the HW Function are set forth in FIG. 9, and include the initialization of the HW Function by determining $L_s$, $b_s$, and $S_1$, $S_2 \ldots, S_s$ in Step 902, if appropriate; the determination of the intermediate values of $L_t$, $b_t$, and $S_t$ in Step 904; and the determination of the forecast in Step 906, all in accordance with the above formulas.

The Second Routine performed by the Bandwidth Allocator 92 comprises the prioritizing of user classes, and of users within each class, to determine respective orders of allocations. Prioritization is performed in accordance with one or more of various possible prioritization policies for users and for user classes. With regard to users within each class, the prioritization policies may depend upon, for example, (i) each user's SLA, (ii) each user's forecasted bandwidth, (iii) fairness considerations, or (iv) any combination thereof.

User SLAs that at least partially affect prioritization policies include those that specify, for example: (i) a guaranteed minimum level of bandwidth; (ii) a time-of-day (TOD) minimum level of bandwidth; or (iii) a guaranteed minimum level of bandwidth up to a maximum burstable level of bandwidth with target probability. Equivalently, such provisions also may be found in a CSLA for a class of which the user is a member.

Under a SLA or CSLA providing for a guaranteed minimum level of bandwidth for a user, a user will have a guaranteed minimum level of bandwidth for use at all times. Accordingly, if the available bandwidth to such a user otherwise would fall below the minimum guaranteed level, then such a user is given priority over all other users whose guaranteed minimum levels of bandwidth (if applicable) have been satisfied.

Similarly, under a SLA or CSLA providing for a TOD minimum level of bandwidth for a user, a user will have a guaranteed minimum level of bandwidth for a particular TOD. If the available bandwidth to such a user otherwise would fall below the minimum guaranteed level during the particular TOD, then such user is given priority over all other users whose guaranteed minimum levels of bandwidth (if applicable) have been satisfied.

Finally, under a SLA or CSLA providing for a guaranteed minimum level of bandwidth up to a maximum burstable level of bandwidth with target probability for a user, a user will have a guaranteed minimum level of bandwidth at all times and, in addition thereto, probably will have additional bandwidth up to a maximum level at any given time in accordance with the target probability. Accordingly, if the bandwidth available to such user otherwise would fall below the minimum guaranteed level, then the user is given priority over all other users whose guaranteed minimum levels of bandwidth (if applicable) have been satisfied. The user also is given priority over such other users in allocating additional bandwidth as needed up to the maximum level in accordance with the target probability.

Other SLA or CSLA provisions not relating to guaranteed levels of bandwidth also may affect a prioritization policy for users. Thus, for example, a SLA or CSLA may specify a fee (in dollars per unit time per unit bandwidth) that is paid based upon bandwidth consumption by a user for a particular amount of time, and the fee may be different as between users. Under these circumstances, prioritization may be determined so as to maximize fee revenues that are paid.

Similarly, a SLA or CSLA may specify a credit (in dollars per unit time per unit bandwidth) that is applied by the Carrier to an account based upon a bandwidth shortfall to a user for a particular amount of time when a guaranteed level of bandwidth for the user is not met. Moreover, the credit may be different as between users. Under these circumstances, prioritization may be determined so as to minimize the collective credits that a Carrier must apply.

An example of prioritization based upon the forecasted bandwidth of each user includes giving priority to a first user over all other users, each of whom have a forecasted bandwidth that is greater than that of the first user.

Prioritization may also be performed based on unilateral fairness considerations, especially when SLAs or CSLAs do not guarantee minimum levels of bandwidth for individual users, or when users otherwise would share equally in priority. Thus, users may be prioritized based on, for example: (i) the throughput of each of the users for a given time interval, with priority going to the user with the lesser throughput; (ii) data packets dropped over a given time interval, with priority going to the user with the greater data loss; and (iii) throughput experienced during a particular time of day or day of the week with priority going to the user with the lesser throughput for the particular time of day or day of the week.

Figure 10:
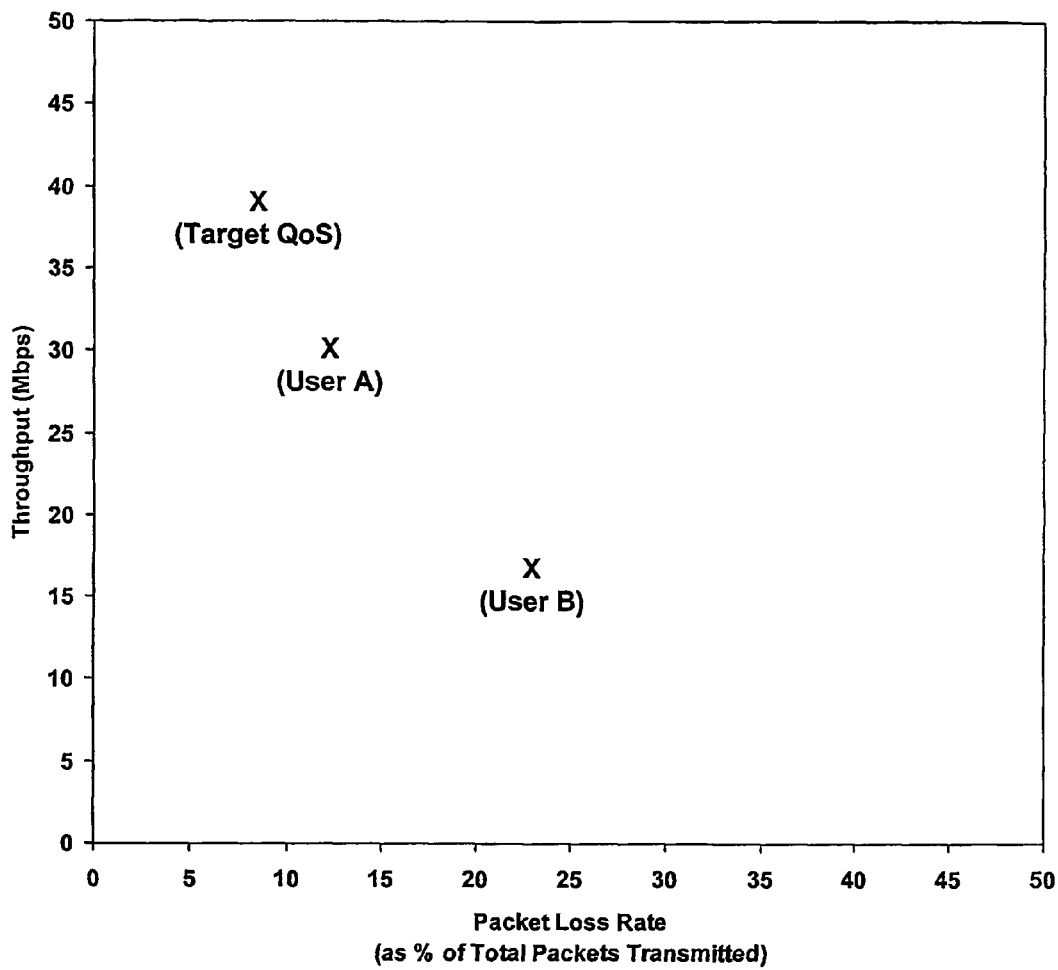
FIG. 10 illustrates a graph of user throughput rates versus user data loss rates for two users relative to a target minimum QoS standard.

An example of fairness considerations that may be utilized in determining priority is illustrated in FIG. 10, wherein user throughput for a time interval is graphed against user data packets dropped in the time interval for Users A and B. A target QoS standard for minimum throughput and maximum packet loss rates are established by the Carrier, whereby in the illustrated example each user is prioritized based on the user's absolute distance from the target QoS standard. Thus, under this policy, User A experiencing higher throughput rate and a lower packet loss rate, and thus having a shorter distance from the standard, is prioritized lower than User B having a lower throughput rate and higher data loss rate.

With regard to user classes, prioritization policies are similar to those of the users and include, for example, (i) each CSLA, (ii) each class' collective forecasted bandwidth, (iii) fairness considerations, or (iv) any combination thereof.

CSLAs that at least partially affect prioritization policies for user classes include those that specify, for example: (i) a guaranteed minimum level of collective bandwidth for the user class; (ii) a time-of-day (TOD) minimum level of collective bandwidth for the user class; or (iii) a guaranteed minimum level of collective bandwidth up to a maximum burstable level of collective bandwidth with target probability for the user class.

Other CSLA provisions not relating to guaranteed levels of collective bandwidth also may affect a prioritization policy. Thus, for example, each CSLA may specify a fee (in dollars per unit time per unit bandwidth) that is paid based upon collective bandwidth consumption by the users of a class for a particular amount of time, and the fee may be different as between different classes of users. Under these circumstances, prioritization may be determined so as to maximize fee revenues that are paid to a Carrier.

Similarly, each CSLA may specify a credit (in dollars per unit time per unit bandwidth) that is applied by the Carrier based upon a collective bandwidth shortfall to the users of the class for a particular amount of time when a guaranteed level of collective bandwidth is not met. Moreover, the credit may be different as between user classes. Under these circumstances, prioritization may be determined so as to minimize the total credits that a Carrier may have to apply.

An example of prioritization based upon the collective forecasted bandwidth of each user class includes giving priority to a first user class over all other user classes, each of which has a respective collective forecasted bandwidth that is greater than that of the first user class.

Prioritization may also be performed based on unilateral fairness considerations, especially when CSLAs do not guarantee minimum levels of collective bandwidth, or when classes otherwise would share equally in priority. Thus, user classes may be prioritized based on, for example: (i) the collective throughput of the users of a class for a given time interval, with priority going to the class with the lesser collective throughput; (ii) the collective data packets of a user class that are dropped over a given time interval, with priority going to the user class with the greater collective data loss; and (iii) the collective throughput of the users of a class experienced during a particular time of day or day of the week, with priority going to the user class with the lesser collective throughput for the particular time of day or day of the week.

The Third Routine performed by the Bandwidth Allocator 92 is the allocation of bandwidth to the user classes, and then to the users within each class, in accordance with one or more allocation policies as desired. Examples of allocation policies for users include: (i) the equal distribution of all available bandwidth to all users; (ii) the distribution of all available bandwidth to all users proportional to each user's respective forecasted bandwidth; (iii) the distribution of bandwidth to each user equal to the user's respective forecasted bandwidth, with any surplus bandwidth being distributed to the users either equally or proportionally based upon the user's respective forecasted bandwidth; and (iv) the initial distribution of bandwidth to each user based upon the minimum of the user's guaranteed bandwidth or the forecasted bandwidth and, thereafter, incremental allocations of remaining bandwidth to all of the users.

Likewise, examples of allocation policies for user classes include: (i) the distribution of all available bandwidth by the Bandwidth Allocator 92 to all user classes proportional to the number of active users in each class; (ii) the distribution of all available bandwidth to all user classes proportional to each class' respective collective forecasted bandwidth; (iii) the distribution of bandwidth to each user class equal to the class' respective collective forecasted bandwidth, with any surplus bandwidth being distributed to the user classes either equally or proportionally based upon the class' respective collective forecasted bandwidth; and (iv) the initial distribution of bandwidth to each user class based upon the minimum of the class' guaranteed collective bandwidth or the collective forecasted bandwidth and, thereafter, incremental allocations of remaining bandwidth to all of the users classes.

Examples of alternate preferred methods of prioritizing user classes, and then allocating bandwidth to the classes, will now be described in detail, each of which utilizes one or more of the aforementioned user class prioritization and allocation policies. Alternative preferred methods of prioritizing users within each class, and then allocating bandwidth to the users in each class, are set forth thereafter. In either case, the preferred methods of prioritizing and allocating are initiated pursuant to the scheduling module 102 of the Bandwidth Allocator 92, which operates independently of the scheduling module 100 of the Data Collector 88.

Figure 11:
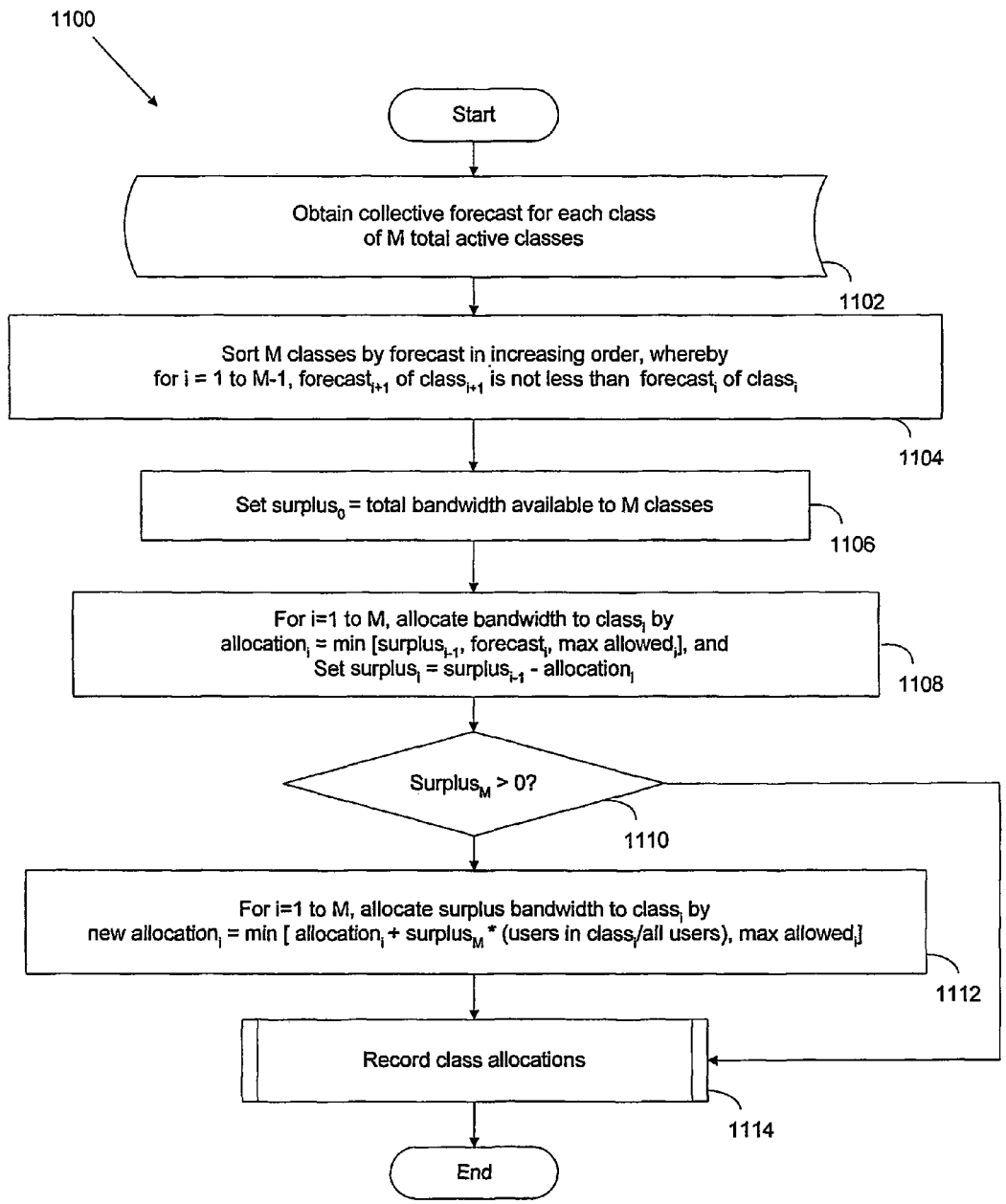
FIG. 11 illustrates a flowchart of a first preferred method of prioritizing classes and allocating collective bandwidth to each class.

With regard to prioritization of and allocation to user classes, a first preferred method 1100 is illustrated in FIG. 11 and begins with the retrieval (Step 1102) of the collective forecasted bandwidth from the Database Manager 90 for all active user classes. Whether a user class is active is determined by past collective bandwidth consumption of the class (or, alternatively, collective requested bandwidth for the users of the class), as revealed by the user stats maintained by the Database Manager 90. All user classes are then prioritized (Step 1104) based on each class' collective forecast in increasing order, whereby a class having a lesser collective forecasted bandwidth will be prioritized over a class having larger collective forecasted bandwidth. A "surplus" is then set (Step 1106) to the total bandwidth available for allocation to the classes in the particular direction of communication over the shared communications medium at issue, and the total bandwidth available is then allocated (Step 1108) to each user class in an amount equaling the collective forecasted bandwidth subject to a respective maximum collective bandwidth value of the user class. Preferably the maximum collective bandwidth value is determined either in the appropriate CSLA or by the Carrier, Administrator 106, or other entity.

Allocation of bandwidth to a user class additionally is subject to the actual availability of bandwidth following previous allocations thereof to user classes with equal or higher priority.

Following allocations to all user classes, any bandwidth determined (Step 1110) to be remaining is then allocated (Step 1112) to the classes in amount proportional to the number of active users in each class, subject of course to the respective maximum collective bandwidth value of the class. The resulting class allocations are then recorded in the Database Manager 90 (Step 1114) as the bandwidth allowances for the classes.

Figure 12:
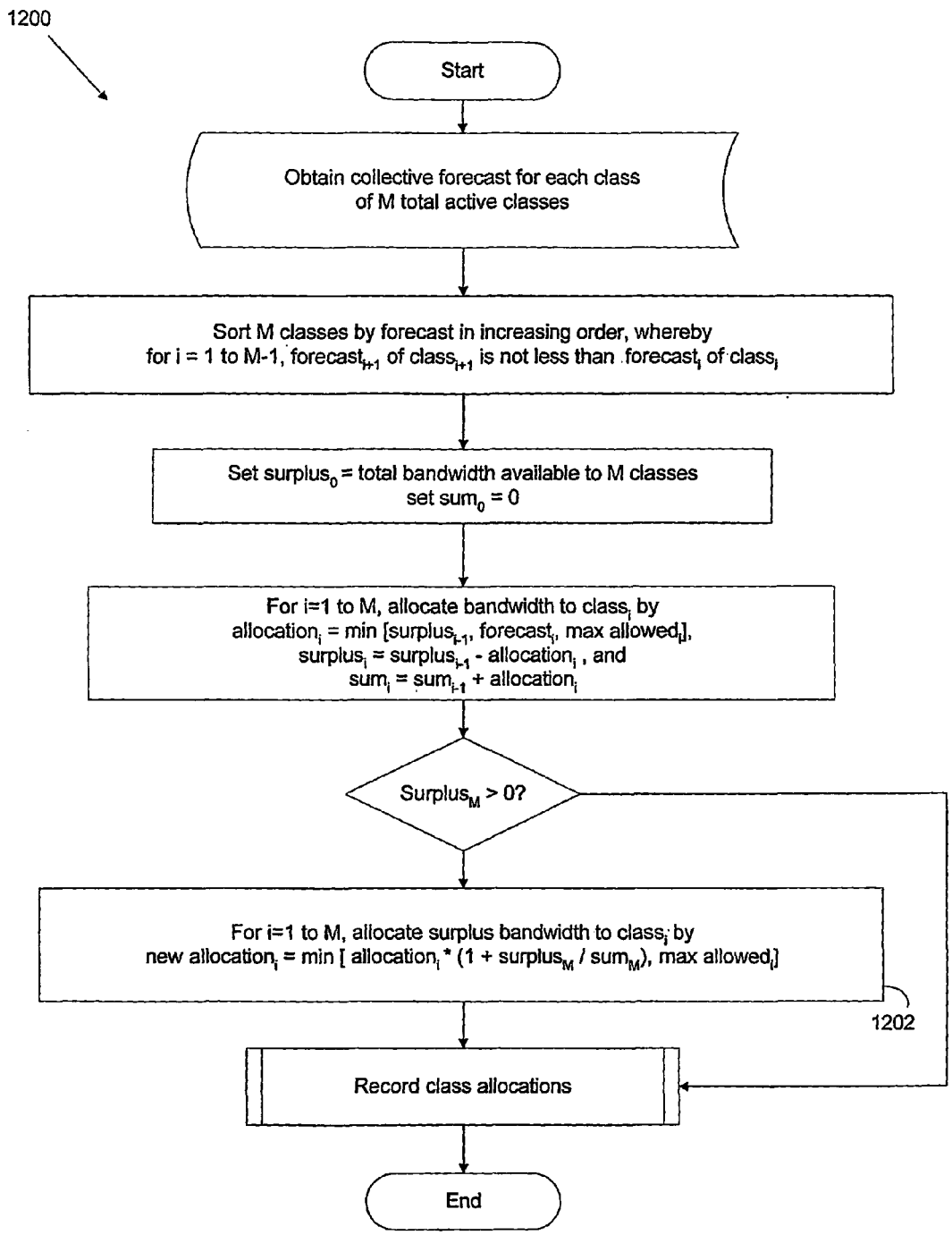
FIG. 12 illustrates a flowchart of a second preferred method of prioritizing classes and allocating collective bandwidth to each class.

The method 1200 illustrated in FIG. 12 is the same as that of FIG. 11, except that surplus bandwidth, if any, is allocated (Step 1102) proportional to the collective forecasted bandwidths of the user classes, again subject to the respective maximum collective bandwidth value of each user class.

Figure 13:
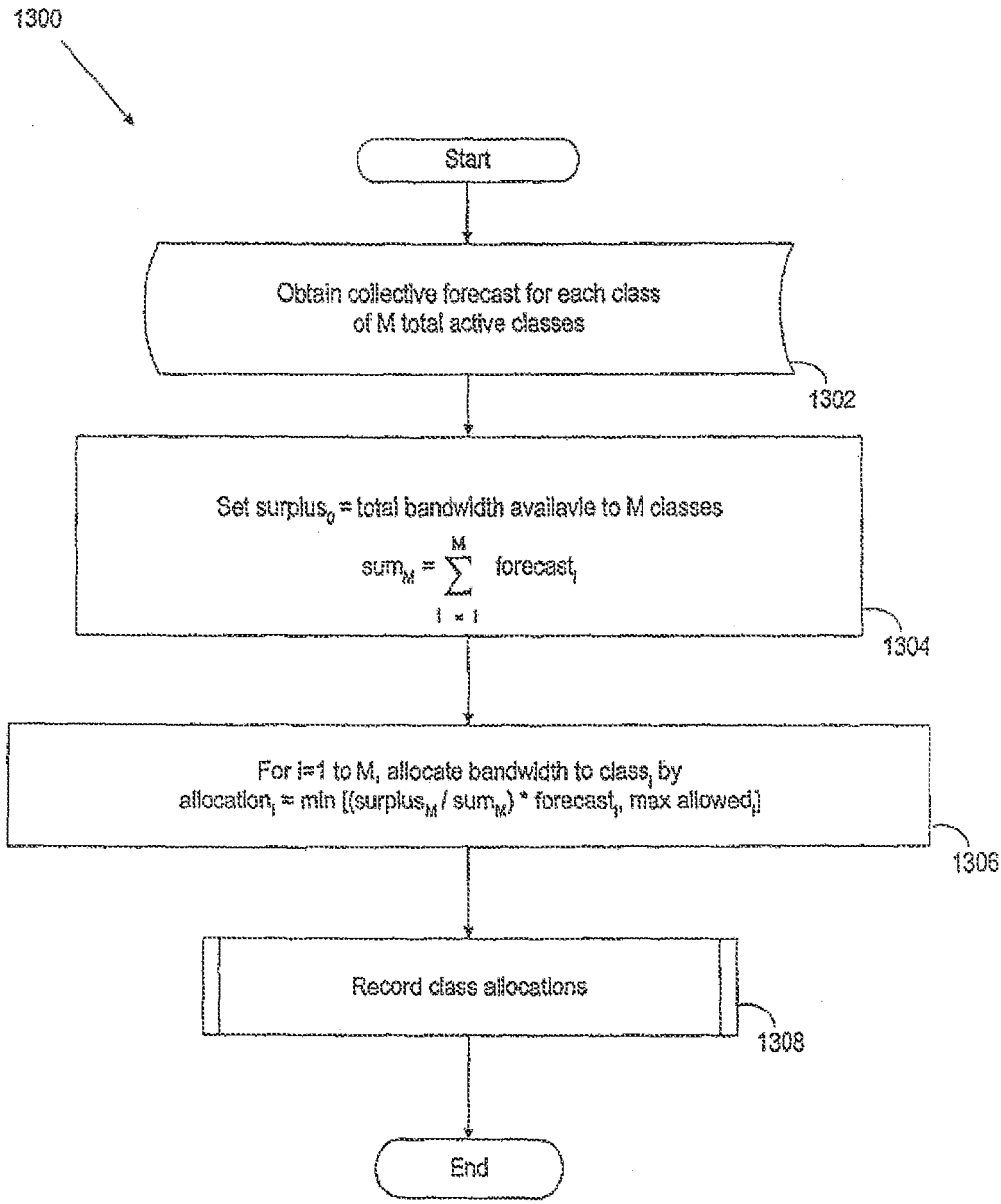
FIG. 13 illustrates a flowchart of a third preferred method of prioritizing classes and allocating collective bandwidth to each class.

The preferred method 1300 illustrated in FIG. 13 does not prioritize the user classes for purposes of allocation but, instead, treats all classes equally. The method 1300 begins with the retrieval (Step 1302) of the collective forecasted bandwidth of each user class from the Database Manager 90. The surplus is then set to the total bandwidth available in the particular direction of communication, and the sum of all the collective forecasts is calculated (Step 1304). The available bandwidth then is allocated (Step 1306) to all classes proportional to the class' collective forecasted bandwidth, again subject to the respective maximum collective bandwidth value for each class. The resulting class allocations then are recorded in the Database Manage 90 (Step 1308) as the bandwidth allowances for the classes.

Figure 14:
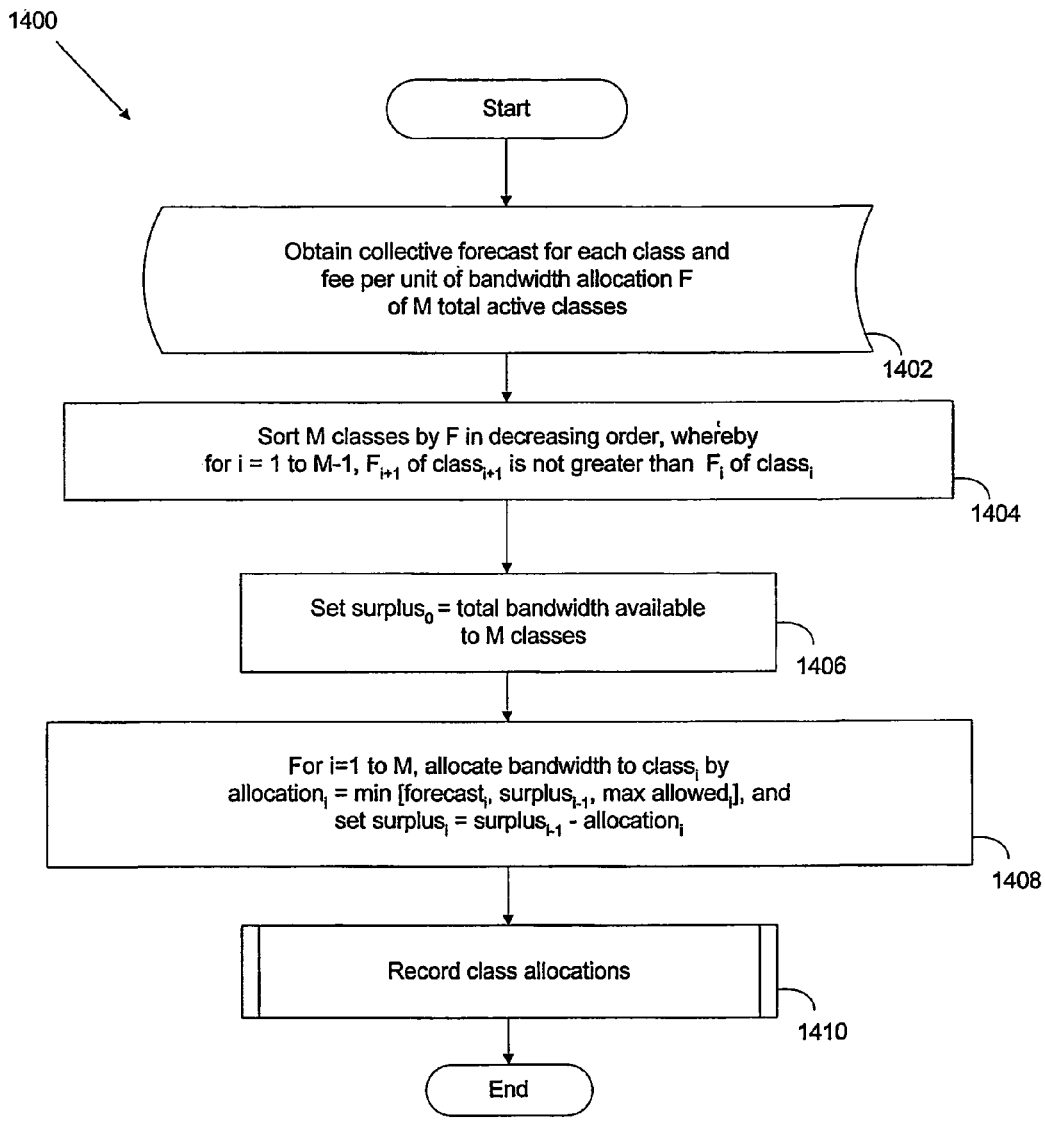
FIG. 14 illustrates a flowchart of a fourth preferred method of prioritizing classes and allocating collective bandwidth to each class.

The preferred method 1400 illustrated in FIG. 14 seeks to maximize revenues from fees (F) that are paid for class bandwidth consumption. The method 1400 begins with the retrieval (Step 1402) of the collective forecast for each user class as well as a fee that is paid for the collective bandwidth of the class. The classes are then sorted (Step 1404) based on these fees in decreasing order, with the class with the highest fee receiving the highest priority. Next the surplus is set (Step 1406) to the total bandwidth available for allocation to the classes in the particular direction of communication. Bandwidth then is allocated (Step 1408) to the classes as available from highest to lowest priority in an amount equal to the class' collective forecasted bandwidth, subject to the respective maximum collective bandwidth value for the class.

Figure 15A:
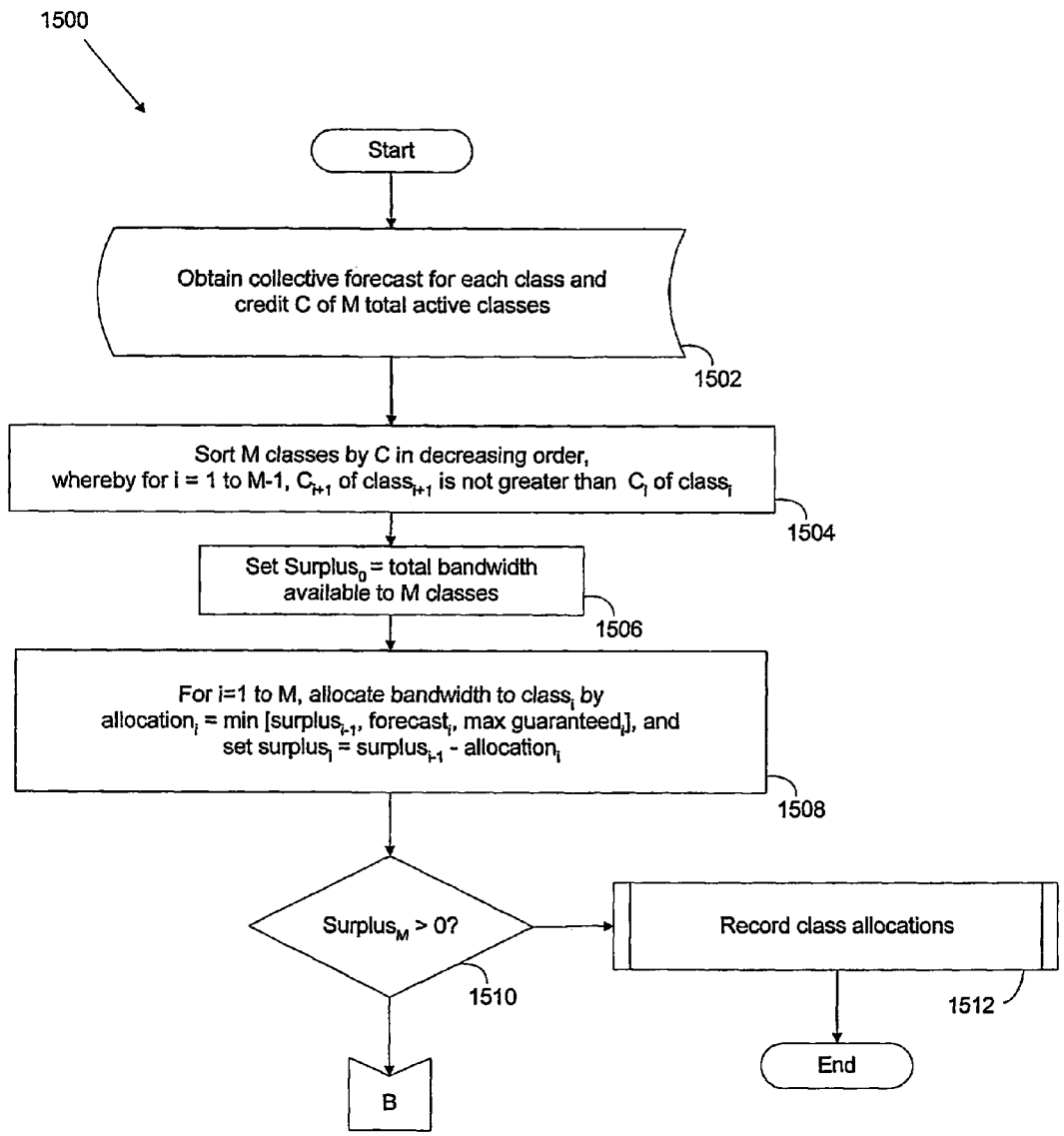
FIGS. 15a and 15b illustrate a flowchart of a fifth preferred method of prioritizing classes and allocating collective bandwidth to each class.
Figure 15B:
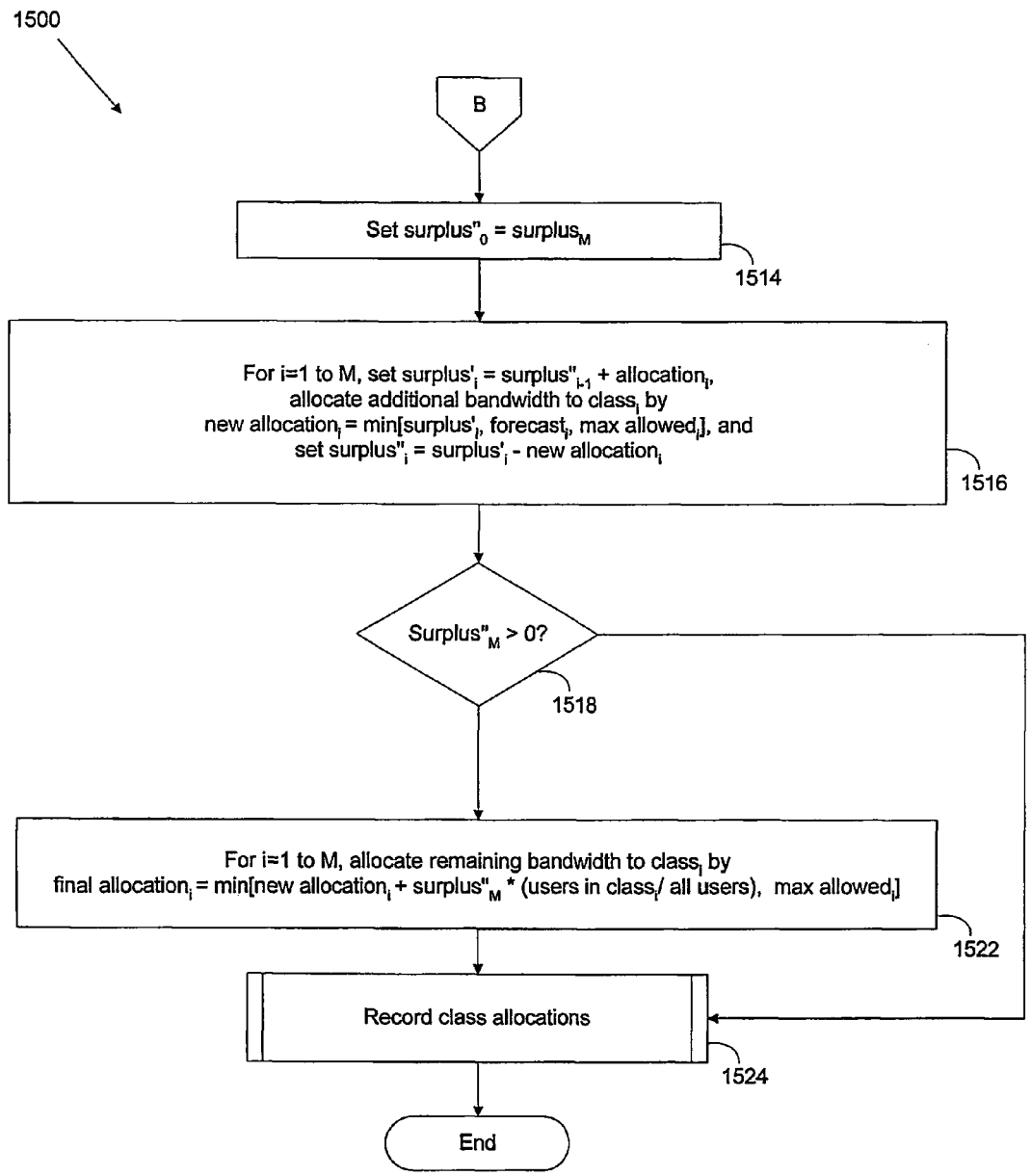
Figure 16A:
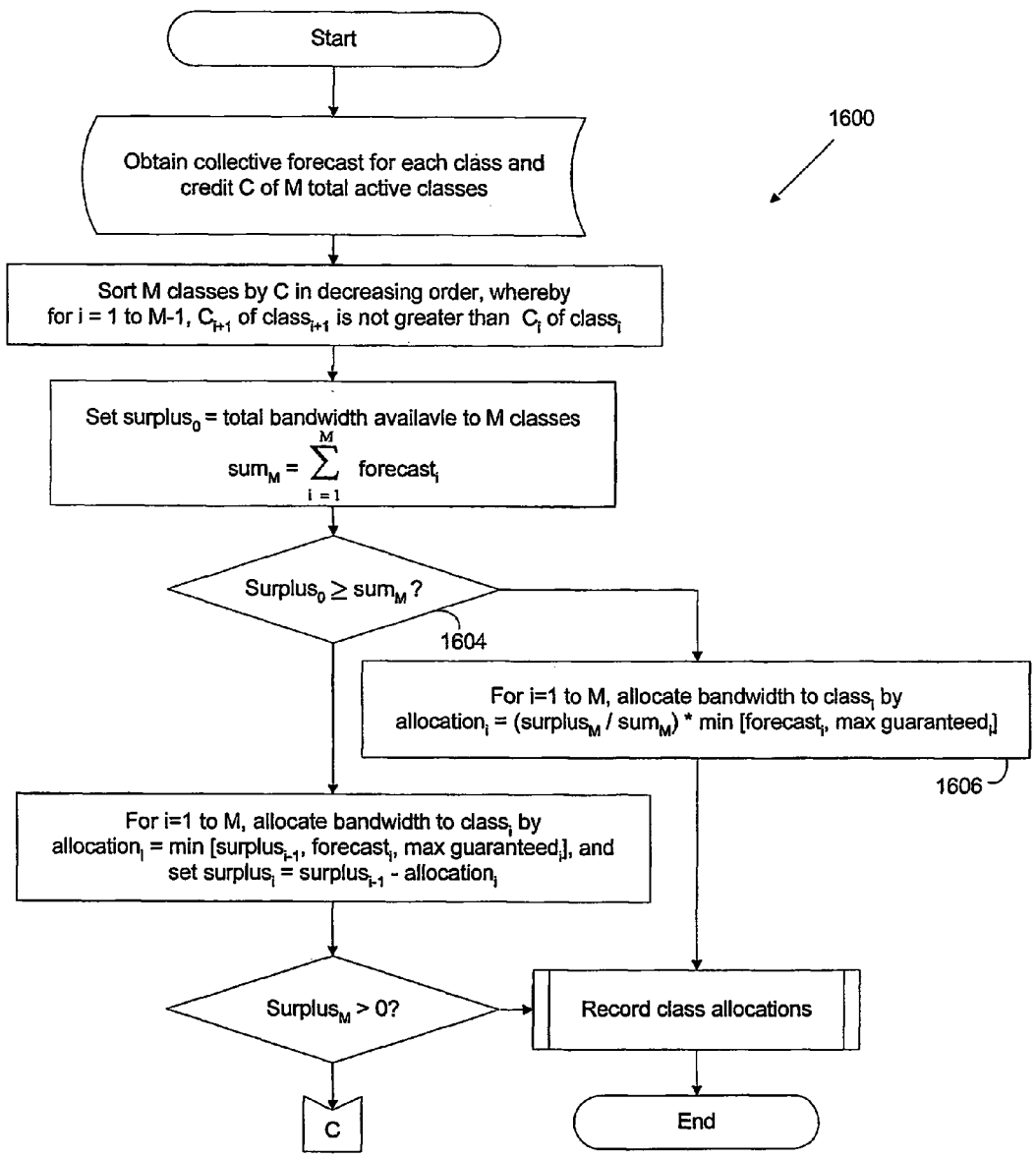
FIGS. 16a and 16b illustrate a flowchart of a sixth preferred method of prioritizing classes and allocating collective bandwidth to each class.
Figure 16B:
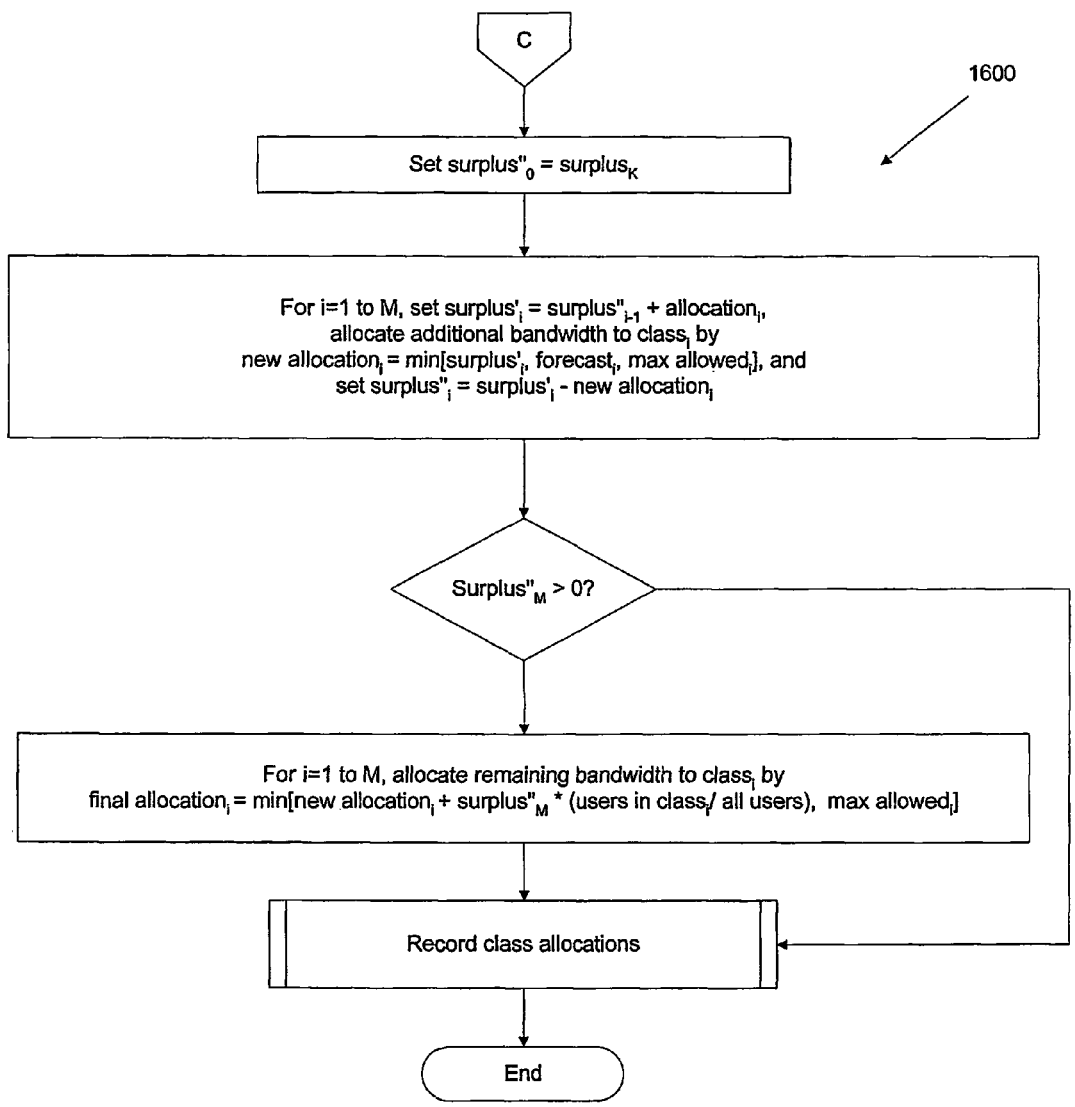

Both preferred method 1500 of FIGS. 15a and 15b, and preferred method 1600 of FIGS. 16a and 16b differ from the other methods 1100,1200,1300,1400 in that these two methods allocate bandwidth to the user classes in multiple allocation rounds. Method 1500 begins in FIG. 15a with the retrieval (Step 1502) of the collective forecasted bandwidths of the classes as well as a credit (C) that applies if a respective class does not receive up to a guaranteed maximum level of collective bandwidth. The classes are then prioritized (Step 1504) based on each class' respective credit in decreasing order, with those classes having higher credits being given priority over classes with lesser credits. Next, the surplus is set (Step 1506) to the total bandwidth available to the classes in the particular direction of communication. Bandwidth then is allocated (Step 1508) as available in a first round to the classes from highest to lowest priority. The allocation for each class in the first round is equal to the minimum of the collective forecasted bandwidth or the maximum collective bandwidth that is guaranteed, subject to the respective maximum collective bandwidth value for the class.

If any additional bandwidth is determined (Step 1510) to remain after the first allocation round, then the surplus is set to the additional bandwidth (Step 1514). Bandwidth then is allocated (Step 1516) as available to each class in the same class order. Assuming sufficient bandwidth remains available, the allocation in the second round brings each class' allocation up to the class' collective forecasted bandwidth subject to the class' respective maximum collective bandwidth value. Following the second allocation round, a determination is made (Step 1518) whether any remaining bandwidth exists and, if so, then the remaining bandwidth is allocated (Step 1522) to the classes proportional to each class' collective forecasted bandwidth, and subject to each class' respective maximum collective bandwidth value. The resulting class allocations are then recorded (Step 1524) in the Database Manager 90 as the bandwidth allowances of the classes. If it is determined that no bandwidth remains available in either of Step 1510 or Step 1518, then the class allocations are completed and are recorded in the Database Manager 90 in Steps 1512,1524, respectively.

Method 1600 of FIGS. 16a and 16b differs from that of FIGS. 15a and 15b only in that the sum of the collective forecasted bandwidths for all classes is calculated (Step 1602) and a determination is made (Step 1604) whether the sum exceeds the total bandwidth available for allocation to the classes. If the sum exceeds the total available bandwidth, then bandwidth is allocated (Step 1606) to each class in an amount equal to the collective forecasted bandwidth of the class, subject to the class' maximum guaranteed collective bandwidth, and less an amount thereof proportional to the total bandwidth shortfall. Thus, for example, if the sum of all collective forecasted bandwidths exceeds the total available bandwidth for allocation in an amount equal to 20% of all collective forecasted bandwidths, then each class is allocated bandwidth in an amount equal to the class' collective forecasted bandwidth (subject to the class' maximum guaranteed collective bandwidth), then less 20% thereof.

The information including fees, credits, guaranteed collective bandwidths, and respective maximum collective bandwidth values in the aforementioned preferred methods, is obtained from each CSLA and/or is predetermined by the Administrator 106, Carrier, or other entity. Moreover, this information is retrieved by the Bandwidth Allocator 92 from the Database Manager 90, which includes and maintains a CSLA table for each class as well as information regarding users associated therewith, as updated from time-to-time by the Administrator 106. Specifically, the information is configured and maintained through GUIs provided as part of the GUI & Report Generating Engine 94, and is preferably accessed by the Administrator 106 either directly or indirectly through the Internet 60. Alternatively, information is retrieved by the Bandwidth Allocator 92 from an external database maintained by the Administrator, Carrier, or other entity through an application program interface (API) incorporated into the external system interface layer 98 of the Bandwidth Allocator 92. The use of an external database is preferred, as it eliminates any duplicative maintenance of information otherwise maintained by the Database Manager 90 which must be synchronized with the external database, including periodic updating of class and user records in a timely fashion.

Regardless of the particular method or policies utilized by the Bandwidth Allocator 92, once class allocations have been determined, the Database Manager 90 is updated with the new class allocations. Then, for each class, allocations of bandwidth are made to the users in the class. Furthermore, allocations within each class may be made by different methods.

Figure 17:
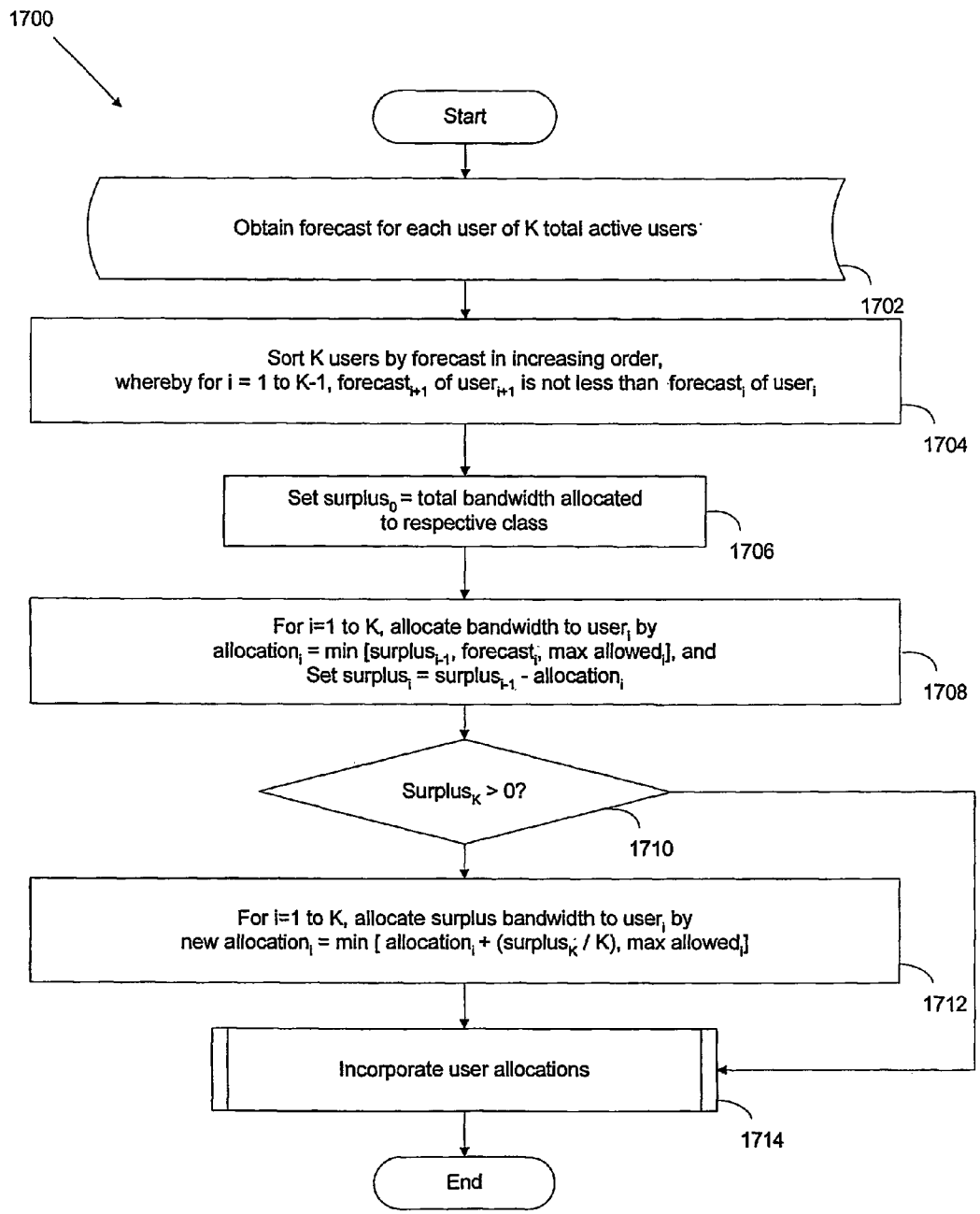
FIG. 17 illustrates a flowchart of a first preferred method of prioritizing users and allocating bandwidth to each user within a class.

A first preferred method 1700 of prioritizing users and allocating bandwidth (whether upstream or downstream) by the Bandwidth Allocator 92 is illustrated in FIG. 17 and begins with the retrieval (Step 1702) of the forecasted bandwidth from the Database Manager 90 for all active users. Whether a user is active is determined by past bandwidth consumption of the user (or, alternatively, requested bandwidth for the user), as revealed by the user stats maintained by the Database Manager 90. All users are then prioritized (Step 1704) based on each user's forecast in increasing order, whereby users having lesser forecasted bandwidths will be prioritized over users having larger forecasted bandwidths. The "surplus" is then set (Step 1706) to the total allocated bandwidth of the class (i.e., the class' collective bandwidth allowance) in the particular direction of communication, and the entire bandwidth allowance of the class is then allocated (Step 1708) to each user in an amount equaling the forecasted bandwidth of the user subject to a respective maximum bandwidth value of the user. Preferably the respective maximum bandwidth value is determined either in the user's SLA, the respective CSLA of the class, or by the Carrier, Administrator 106, or other entity. Allocation of bandwidth to a user additionally is subject to the actual availability of bandwidth following previous allocations thereof to users with equal or higher priority.

Following allocations to all users, any bandwidth determined (Step 1710) to be remaining out of the total class allowance is then allocated equally (Step 1712) to the users subject to the respective maximum bandwidth value for each user. The new user allocations are then incorporated (Step 1714) into the DOC Network as the bandwidth allowances of the users.

Figure 18:
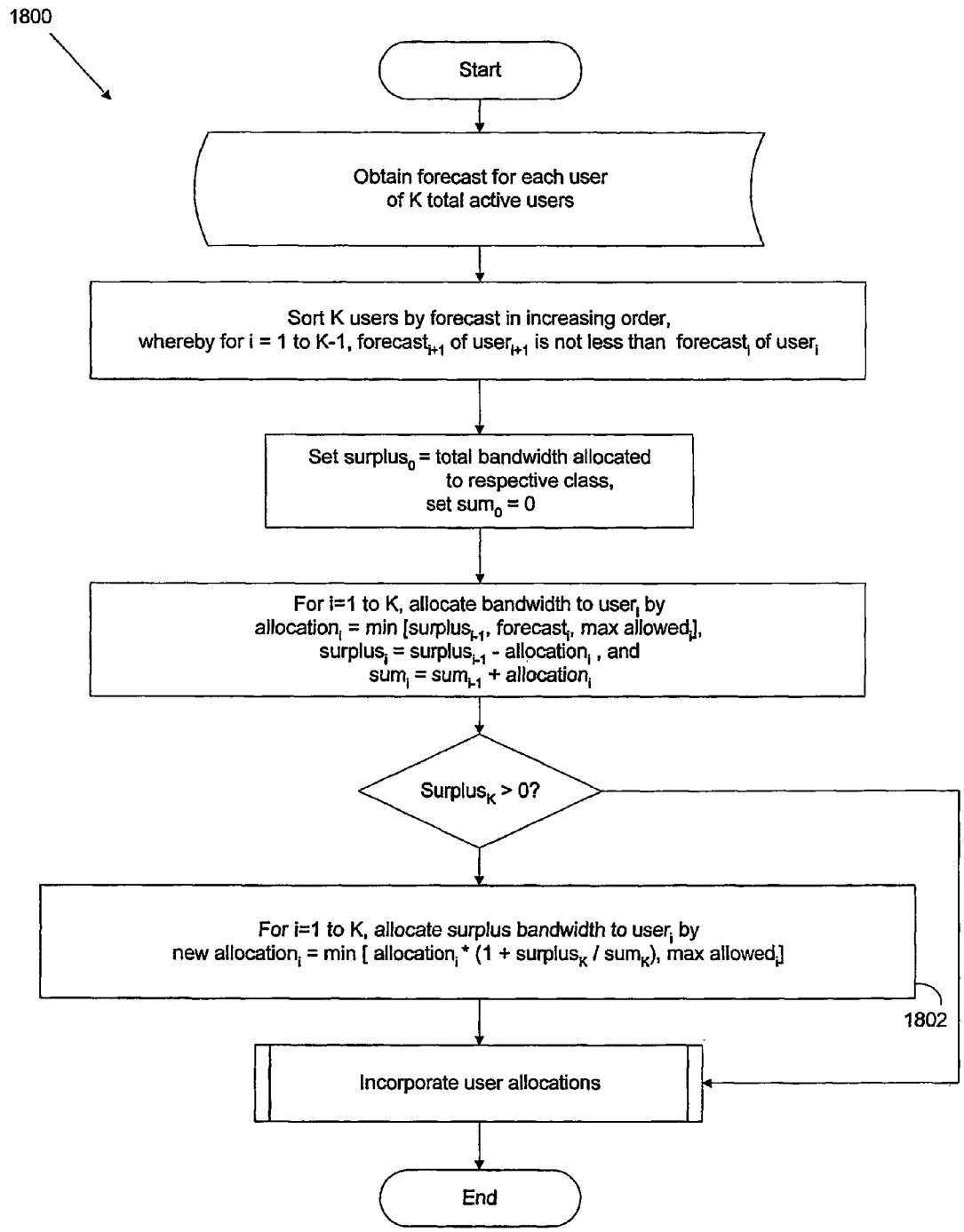
FIG. 18 illustrates a flowchart of a second preferred method of prioritizing users and allocating bandwidth within a class.

The method 1800 illustrated in FIG. 18 is the same as that of FIG. 17, except that surplus bandwidth in the class, if any, is allocated (Step 1802) proportional to the forecasted bandwidths of the users in the class, again subject to each user's respective maximum bandwidth value.

Figure 19:
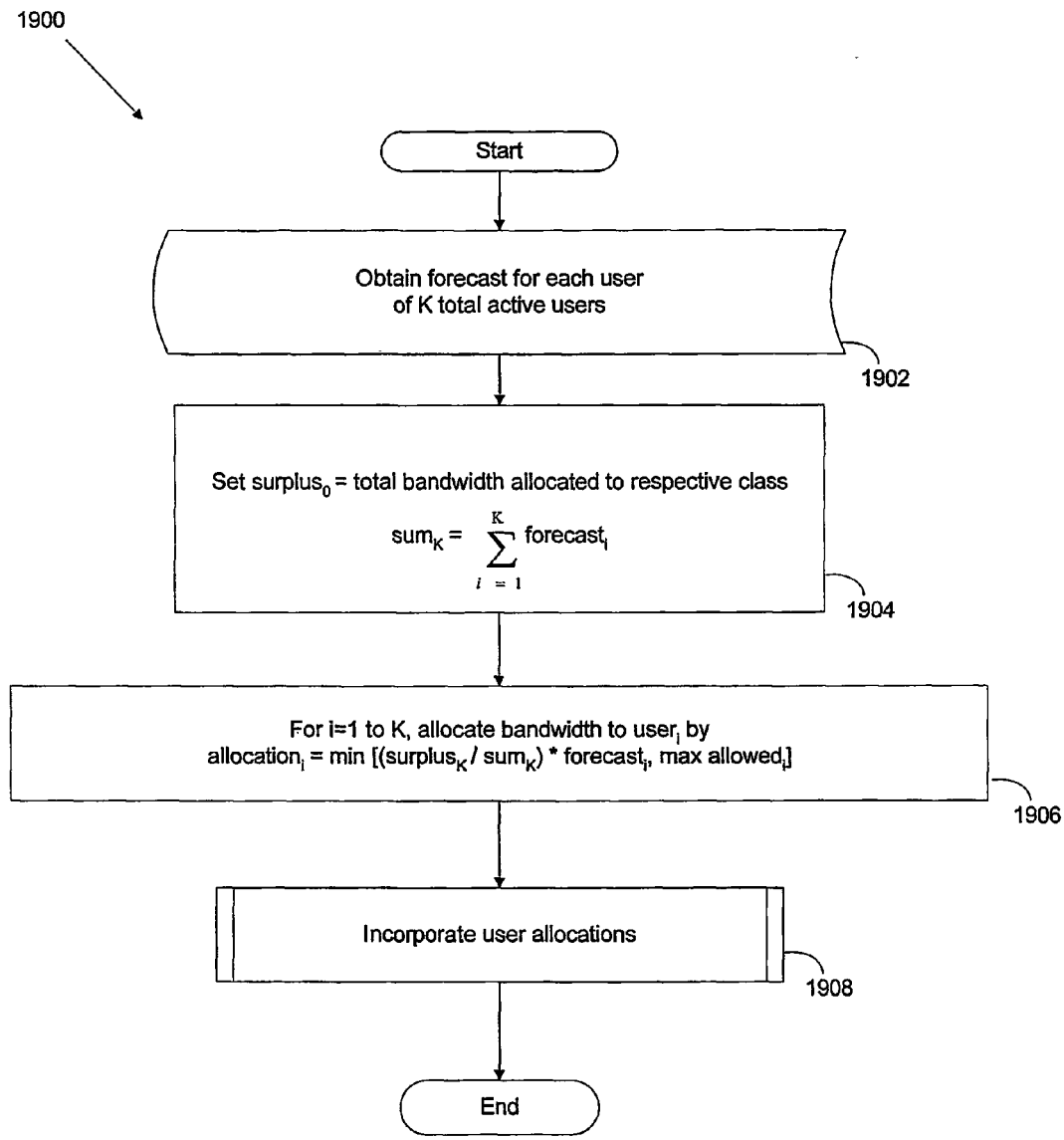
FIG. 19 illustrates a flowchart of a third preferred method of prioritizing users and allocating bandwidth within a class.

The preferred method 1900 illustrated in FIG. 19 does not prioritize the users for purposes of allocation but, instead, treats all users equally. The method 1900 begins with the retrieval (Step 1902) of the forecasted bandwidth for each user in the class from the Database Manager 90. The surplus is then set to the total allocated bandwidth of the class in the particular direction of communication, and the sum of all forecasts of the users in the class is calculated (Step 1904). The total allocated bandwidth of the class then is allocated (Step 1906) to all users in the class proportional to the user's forecasted bandwidth, again subject to each user's respective maximum bandwidth value. The user allocations then are incorporated into the DOC Network (Step 1908) as the bandwidth allowances of the users.

Figure 20:
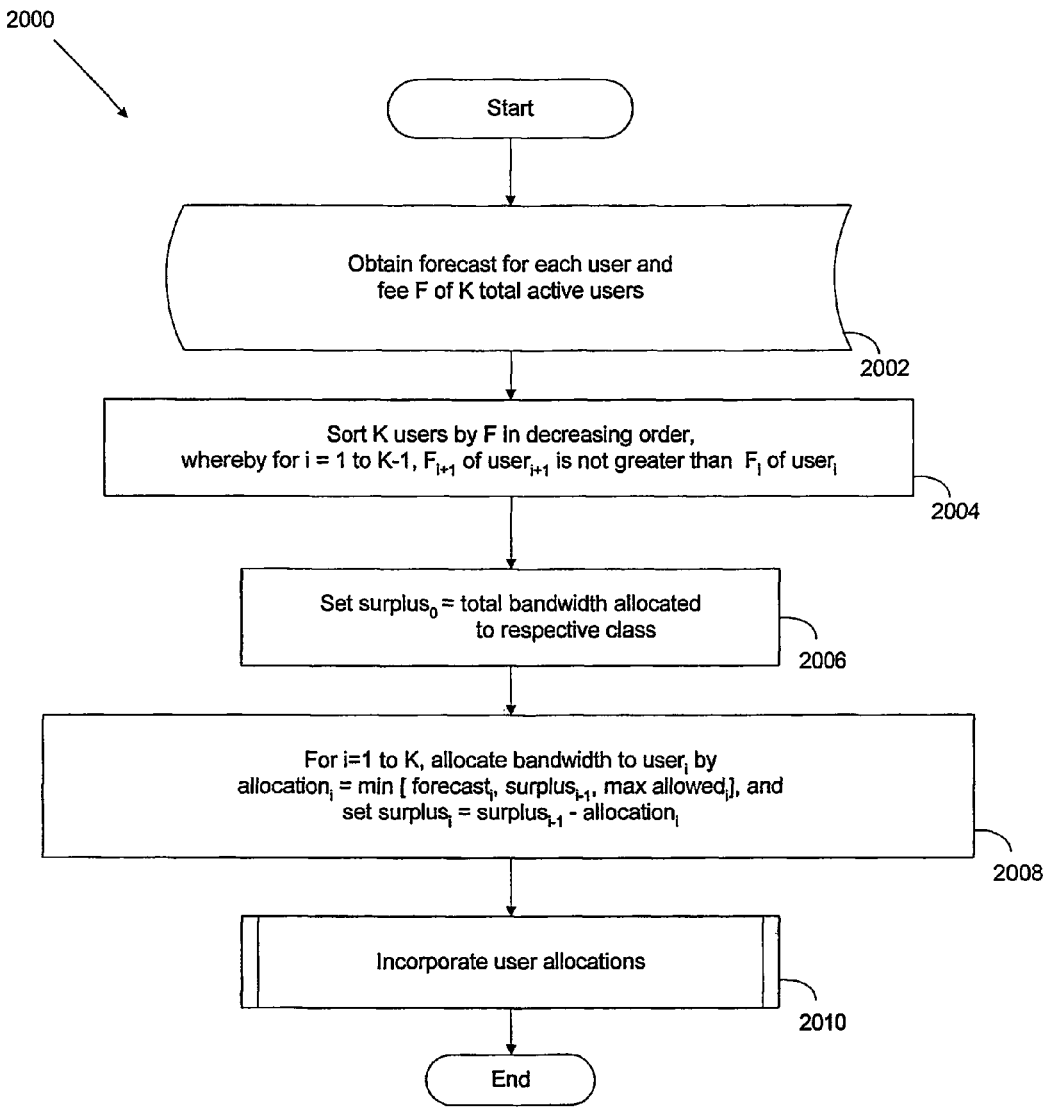
FIG. 20 illustrates a flowchart of a fourth preferred method of prioritizing users and allocating bandwidth within a class.

The preferred method 2000 illustrated in FIG. 20 seeks to maximize revenues from fees (F) that are paid for bandwidth consumption by the users. The method 2000 begins with the retrieval (Step 2002) of the forecast for each user as well as a fee that is paid for bandwidth by each user. The users are then sorted (Step 2004) based on user fees in decreasing order, with the user paying the most for bandwidth receiving the highest priority. Next, the surplus is set (Step 2006) to the total allocated bandwidth of the class in the particular direction of communication. Bandwidth then is allocated (Step 2008) to the users in the class as available from highest to lowest priority in an amount equal to each user's forecasted bandwidth, and subject to the user's respective maximum bandwidth value.

Figure 21A:
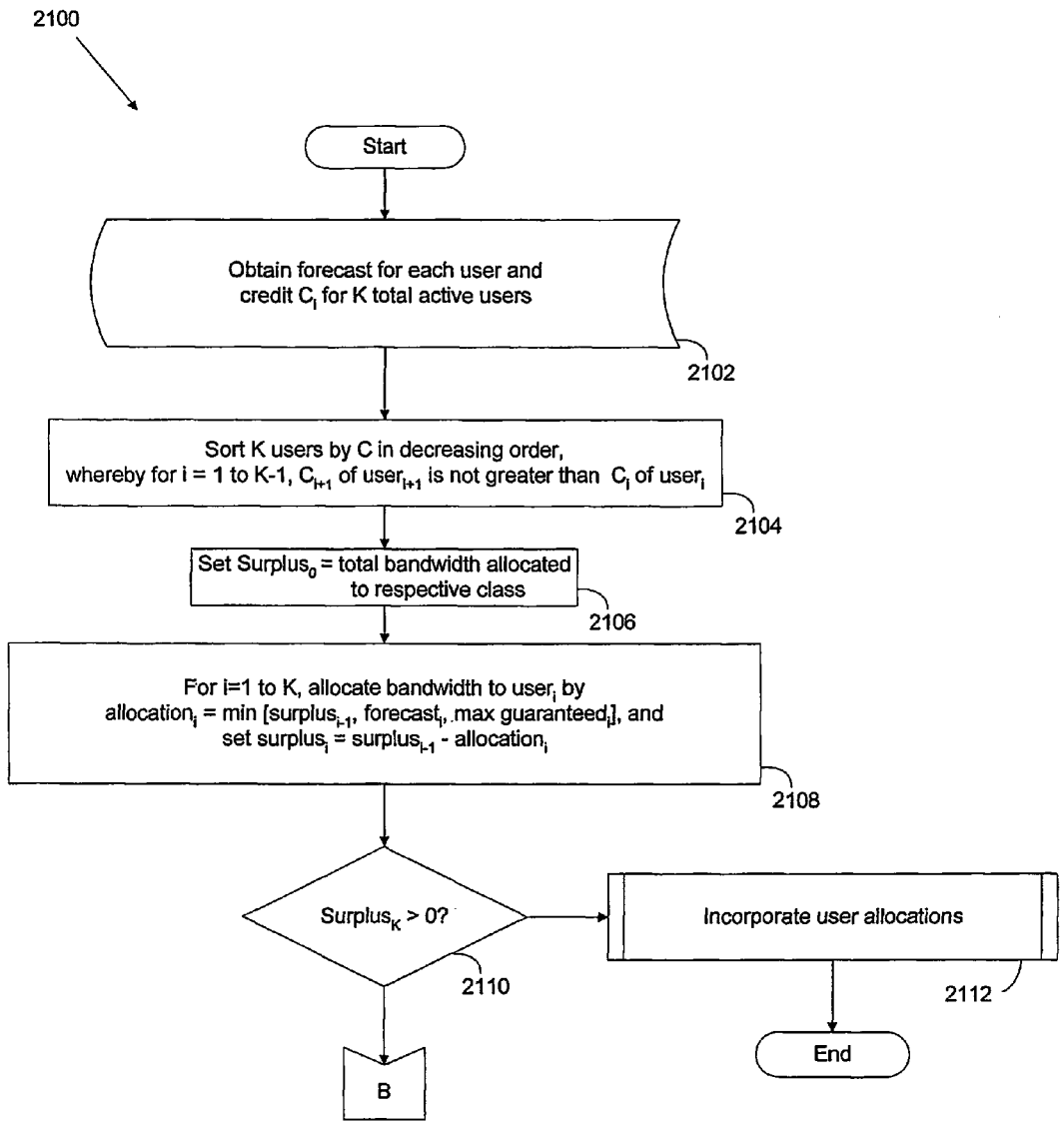
FIGS. 21a and 21b illustrate a flowchart of a fifth preferred method of prioritizing users and allocating bandwidth within a class.
Figure 21B:
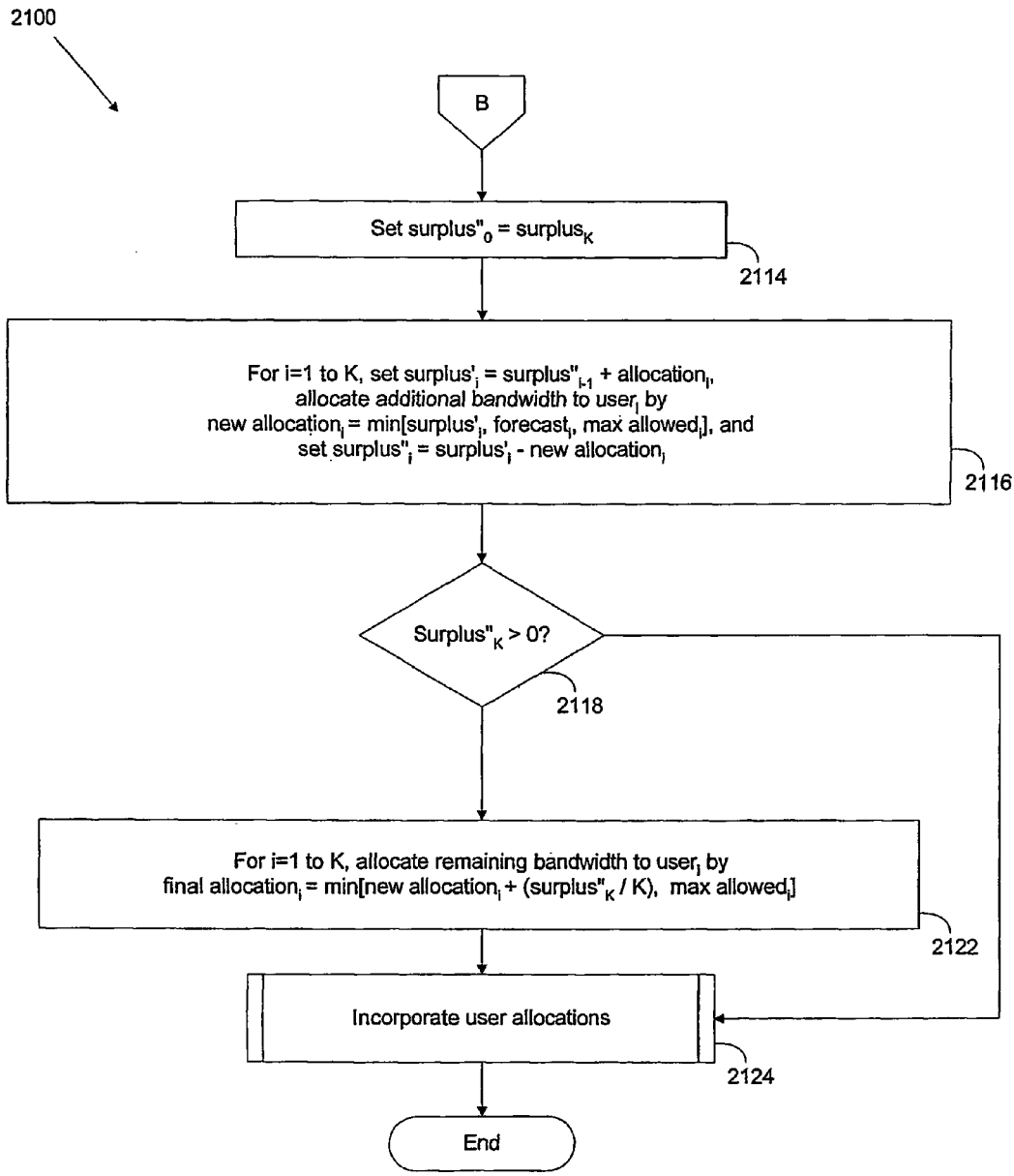
Figure 22A:
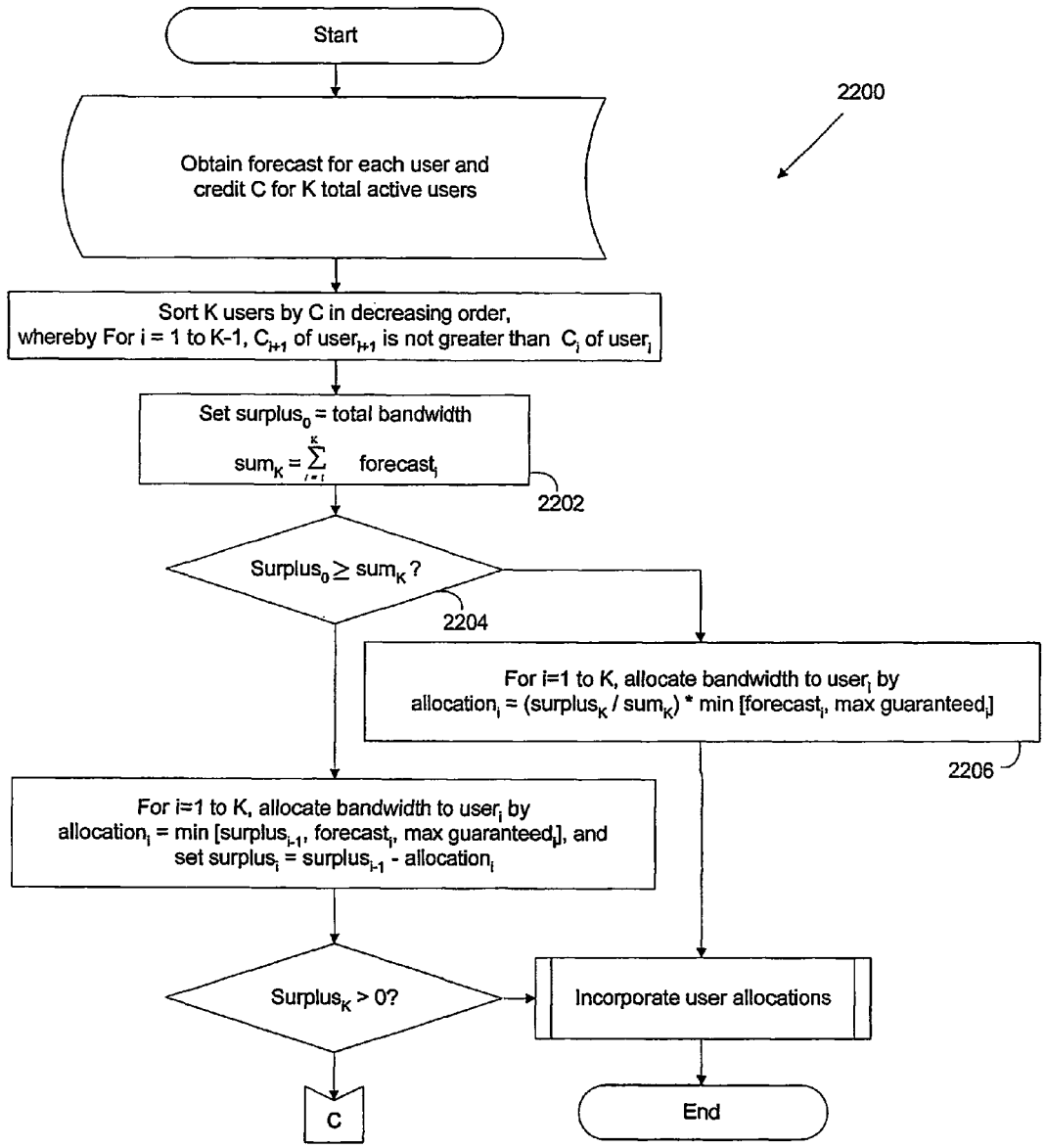
FIGS. 22a and 22b illustrate a flowchart of a sixth preferred method of prioritizing users and allocating bandwidth within a class.
Figure 22B:
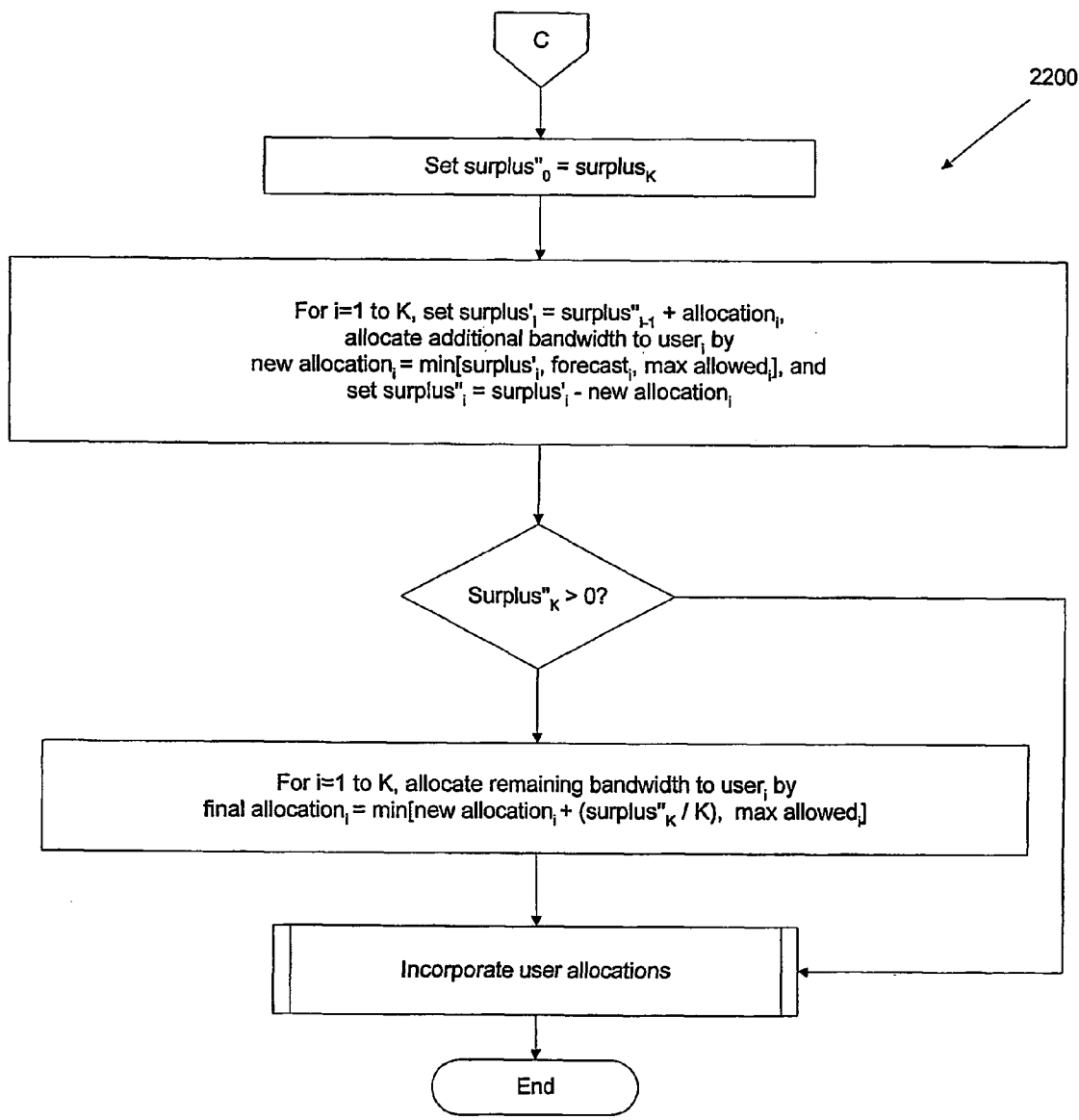

Both preferred method 2100 of FIGS. 21*a* and 21*b*, and preferred method 2200 of FIGS. 22*a* and 22*b* differ from the other methods 1700,1800,1900,2000 in that these two methods allocate bandwidth to the users in multiple allocation rounds. Method 2100 begins in FIG. 21*a* with the retrieval (Step 2102) of the forecasted bandwidths of the users as well as a credit (C) that applies if a respective user does not receive up to a guaranteed maximum level of bandwidth. The users are then prioritized (Step 2104) based on each user's respective credit in decreasing order, with those users having higher credits being given priority over users with lesser credits. Next, the surplus is set (Step 2106) to the total allocated bandwidth of the class in the particular direction of communication. Bandwidth then is allocated (Step 2108) as available in a first round to the users from highest to lowest priority. The allocation in the first round for each user is equal to the minimum of the forecasted bandwidth or the maximum bandwidth that is guaranteed, subject to the user's respective maximum bandwidth value.

If any additional bandwidth is determined (Step 2110) to remain after the first allocation round, then the surplus is set to the additional bandwidth (Step 2114). Bandwidth then is allocated (Step 2116) as available to each user in the same user order. Assuming sufficient bandwidth remains available, the allocation in the second round brings the user's allocation up to the user's forecasted bandwidth subject to the user's respective maximum bandwidth value. Following the second allocation round, a determination is made (Step 2118) whether any remaining bandwidth exists and, if so, then the remaining bandwidth is allocated (Step 2122) equally to the users, subject to each user's respective maximum bandwidth value. The user allocations are then incorporated (Step 2124) into the DOC Network as the users' bandwidth allowances. If it is determined that no bandwidth remains available in either of Step 2110 or Step 2118, then the user allocations are completed and are incorporated into DOC Network in Steps 2112,2124, respectively, as the users' bandwidth allowances.

Method 2200 of FIGS. 22*a* and 22*b* differs from that of FIGS. 21*a* and 21*b* only in that the sum of the forecasted bandwidths for all users is calculated (Step 2202) and a determination is made (Step 2204) whether the sum exceeds the total allocated bandwidth of the class. If the sum exceeds the total allocated bandwidth of the class, then the bandwidth is allocated (Step 2206) to each user in an amount equal to the forecasted bandwidth, subject to the user's maximum guaranteed bandwidth, and less an amount thereof proportional to the total bandwidth shortfall. Thus, for example, if the sum of all forecasted bandwidths exceeds the total allocated bandwidth of the class in an amount equal to 20% of the sum of all the forecasted bandwidths, then each user is allocated bandwidth in an amount equal to the user's forecasted bandwidth (subject to the user's maximum guaranteed bandwidth), then less 20% thereof.

The applicable class bandwidth allowances used in the aforementioned methods are obtained from the Database Manager 90. The information, including fees, credits, guaranteed user bandwidths, and maximum bandwidth values in the aforementioned methods, is obtained from each user's SLA or from any applicable CSLA, and/or is predetermined by the Administrator 106, Carrier, or other entity. Moreover, this information is retrieved by the Bandwidth Allocator 92 from the Database Manager 90, which includes and maintains a user SLA table as well as a user billing table, as updated from time-to-time by the Administrator 106. Specifically, the information is configured and maintained through GUIs provided as part of the GUI & Report Generating Engine 94, and is preferably accessed by the Administrator 106 either directly or indirectly through the Internet 60. Alternatively, information is retrieved by the Bandwidth Allocator 92 from an external database maintained by the Administrator, Carrier, or other entity through an application program interface (API) incorporated into the external system interface layer 98 of the Bandwidth Allocator 92. The use of an external database is preferred not only for the CSLAs, but also for the SLAs and user billing tables, as it eliminates any duplicative maintenance of information otherwise maintained by the Database Manager 90 which must be synchronized with the external database, including periodic updating of user records in a timely fashion.

Regardless of the particular method or policies utilized by the Bandwidth Allocator 92, once user allocations have been determined under the aforementioned allocation policies, the respective DOC Network is updated with the resulting user allocations as the bandwidth allowances for the users for a particular time interval. Each user is then allocated bandwidth during the particular time interval in an amount that is less than, or equal to, that user's bandwidth allowance. Similarly, the collective bandwidth consumptions of a class by users therein is limited by that class' bandwidth allowance. Preferably, the DOC Network is updated at periodic intervals of between one to fifteen minutes and, preferably every five minutes. Furthermore, the periodic interval preferably corresponds to the scheduling of the Bandwidth Allocator 92 with regard to upstream transmissions.

Figure 23:
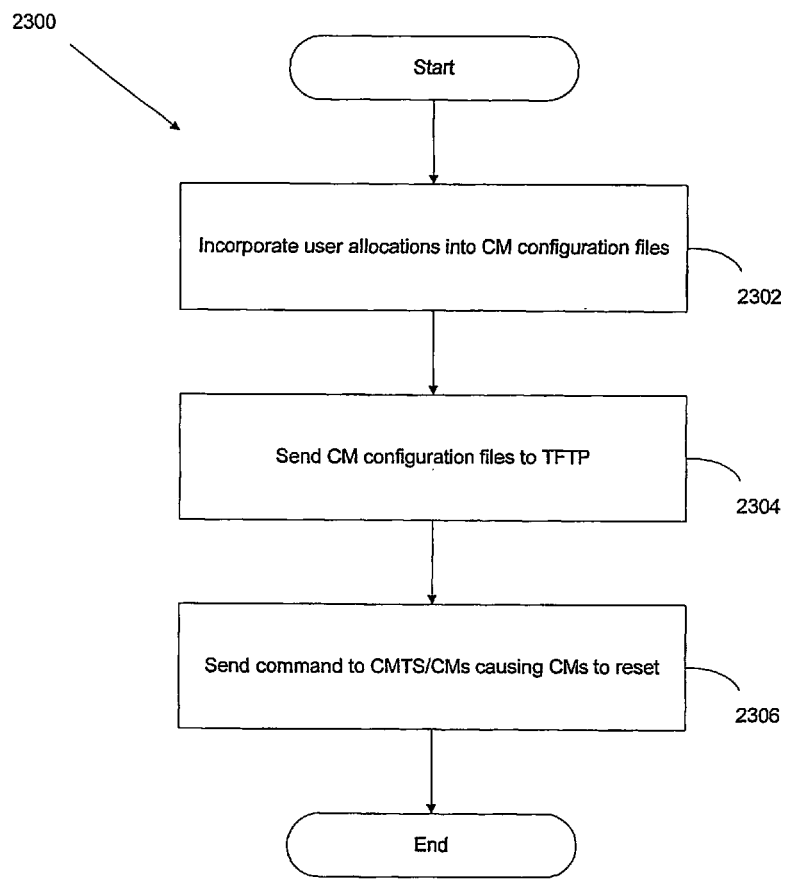
FIG. 23 illustrates a flowchart of a preferred method of updating a DOC Network for a DOCSIS 1.0 compliant Cable Network.

With particular reference to FIG. 23, a preferred method 2300 of updating a DOC Network for a DOCSIS 1.0 compliant Cable Network with the user allowances is illustrated. The DOC Network is updated by incorporating (Step 2302) the user allocations as bandwidth allowances (i.e., bandwidth limits) into CM configuration files (MD-5 files) for the CMs of the respective users. As set forth above, each CM configuration file contains instructions for a respective CM that limits the actual bandwidth consumed by the CM in the upstream direction and in the downstream direction. The CM configuration files are then sent (Step 2304) by the Bandwidth Allocator 92 to a Trivial File Transfer Protocol (TFTP) Server of the DOC Network, which maintains CM configuration files for the CMs of the Cable Network. A command is also sent (Step 2306) to either of the CMs or the CMTS of the respective Cable Network causing the CMs to acquire and implement the CM configuration files maintained on the TFTP Server.

In addition to maintaining information regarding CSLAs, class allocations, SLAs, and user billing data in the Database Manager 90, the GUI & Report Generating Engine 94 further enables the Administrator 106 to analyze the user stats updated by the Data Collector 88, including the generation of reports and graphs regarding, for example, network access usage of the users over time as well as user throughput rates vs. data loss rates similar to that shown in FIG. 10.

It additionally should be noted that a user may or may not be permitted to be grouped in one or more classes in accordance with the present invention. If it is desired that classes be mutually exclusive, then some policy should be established for determining which class with which a user is associated as between competing classes. If it is desired that classes not be mutually exclusive, then users falling within two or more classes will be allocated bandwidth within each class to the extent that no conflict arises as between the classes, and subject to any maximum allowed aggregated user bandwidth for all classes that may be established.

As now will readily be seen, the preferred methods and preferred networks of the present invention described in detail herein enable a Carrier to accommodate bandwidth concerns of service providers competing for the business of users of a shared communications medium in a Shared Access Carrier Network. In particular, CSLAs now can be constructed in accordance with the present invention whereby a service provider is guaranteed some collective level of network access for the users of the shared communications medium that are customers of the service provider. Furthermore, the provision of bandwidth to users who are customers of competing service providers can now be based on fairness considerations, even if one of the service providers is related to the Carrier.

In addition thereto, the differing demands for instantaneous throughput by users competing for access across the shared communications medium now can be accommodated in accordance with the present invention. Indeed, a Carrier now is able to continuously vary bandwidth consumption limits for each user on an individual basis and for small time intervals, either in accordance with fairness considerations, forecasted network access usage of the users, or under contractual provisions governing network access.

It also will now be evident that the present invention gives rise to new business models that may be implemented by service providers for providing network access to users thereof and, in particular, to new ways of selling network access, which is also considered part of the present invention.

For example, in accordance with the present invention, network access now can be "wholesaled" to service providers by considering the users of the service provider a class and allocating bulk network access to such class pursuant to a CSLA between the Carrier and the service provider. Through a CSLA, a Carrier can offer to the service provider a guaranteed minimum level of network access for the class that is constant throughout the day or week, or a guaranteed minimum level of network access that varies depending upon considerations such as the time of day or the day of week. A Carrier also now can offer a guaranteed minimum level of network access to the class with a guaranteed maximum level of network access provided as needed in accordance with a target probability. The service providers, in turn, then can offer different SLAs to the users that are its customers, essentially selling network access at the retail level.

Accordingly, service providers can be assured of levels of network access for the users that are their customers, and users can be assured of appropriate levels of network access to meet their individual demands. Moreover, Carriers and/or service providers now can differentiate between users in charging for network access, thereby allowing Carriers and/or service providers to differentiate revenue streams for maximization of revenues.

Figure 26:
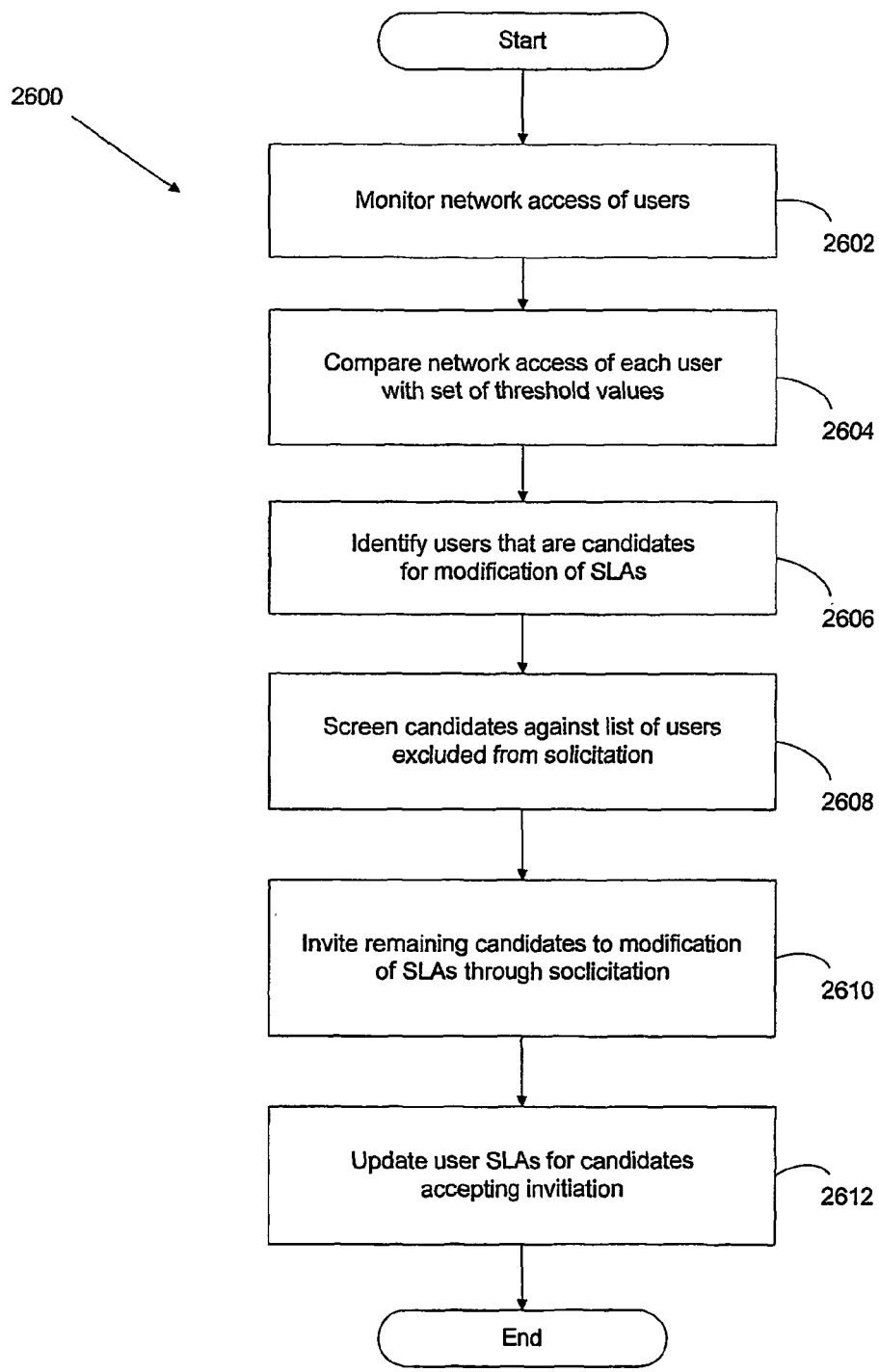
FIG. 26 illustrates a flowchart of a preferred method of soliciting a user to modify the user's SLA based on monitored network access usage of the user.

The present invention also enables Carriers and/or service providers to offer "dynamic SLAs" to users. The term "dynamic SLA" refers to a SLA that can be modified by a user as the user's demand for network access significantly changes, whether such modification is permanent or temporary. In this regard, and in accordance with a preferred method 2600 of the present invention as illustrated in FIG. 26, the "network access retailer" (the entity selling the network access to the user) monitors (Step 2602) network access usage by users of a Shared Access Carrier Network and determines (Step 2604), for each user based on network access usage, whether a SLA provision other than those found in the user's current SLA would better meet the user's needs. This determination is made by comparing the user's throughput, bandwidth consumption, and/or bandwidth requested for a predetermined period of time against a set of threshold values, including any guaranteed level of network access provided for in the user's SLA as well as any minimum QoS standard that are deemed necessary for user satisfaction by the network access retailer or other appropriate entity. Thus, if the user's level of throughput, bandwidth consumption, and/or bandwidth requested for the predetermined time interval differs by a predetermined tolerance from a minimum threshold value, then the user is identified (Step 2606) as a "candidate" for modifying the SLA. A similar process alternatively is used, wherein the user's forecasted bandwidth is compared to the threshold values and, if the difference exceeds a predetermined tolerance, then the user is deemed a candidate for modifying the user's SLA.

Once users have been identified as candidates, the candidates are filtered by screening (Step 2608) the candidates against a list of users for which solicitations are not to be made. Those candidates passing the screening are then invited (Step 2610) to modify their respective SLAs. The solicitation of the user preferably is performed via email, instant messaging, redirection of the user's web browser to a solicitation web page, generation and mailing of solicitation literature via U.S. mail, telemarketing, or other means of communication. The solicitation includes an invitation for the user to modify the user's SLA by increasing for a fee the minimum level of network access guaranteed to the user. The solicitation preferably also includes an invitation to make the modification permanent, or to make the modification only temporary and for a specific period of time.

Thus, for example, if a user is identified as having a high usage pattern at recurrent periods of time (such as every Saturday night when a particular webcast is viewed, or when an Internet game is played), then the user automatically is solicited with an invitation via instant messaging on the following Saturday night to increase the user's guaranteed network access for that night, for a predetermined number of following Saturday nights, and/or for every Saturday night.

Acceptance of the invitation by each user results in the modification (Step 2612) of the user's SLA for the appropriate period of time by increasing the level of network access the user is guaranteed (and/or the user's respective maximum bandwidth value, depending upon the policies used). The solicited modification to the user's SLA is updated in the SLA database, which is then used during user prioritization and allocation of bandwidth by the Bandwidth Allocator 92. The resulting higher bandwidth allowance should enhance the user's experience and overall satisfaction with the Carrier Network. In particular, the higher bandwidth (greater network access) should enhance the viewing of the webcast or the playing of the Internet game.

On the other hand, SLAs for which users decline solicitations are not modified. Furthermore, if deemed appropriate, users declining a solicitation are recorded in the list against which candidates are screened.

Preferably, the Bandwidth Allocator 92 analyzes the user stats maintained by the Database Manager 90, identifies those users that are candidates for SLA modification, and initiates the solicitation of such candidates. Information for each user's SLA for comparison with the user's stats automatically is obtained either from the Database Manager 90, or from an external database maintained by the network access retailer or other appropriate entity. Furthermore, the Bandwidth Allocator 92 preferably performs this analysis for solicitation on a regularly scheduled basis.

In addition to such solicitations, a user of course may request a change in the level of network access guaranteed without having to receive first a solicitation. Furthermore, the user may request that the change be for a temporary period of time such that, for example, the change is reversed after only a few hours, which would cover a viewing of a particular webcast or the playing of a particular Internet game beginning at the time of the request.

In view of the foregoing detailed description of the preferred embodiments and methods of the present invention, it readily will be understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure only is illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Thus, for example, it will be apparent that, while preferred embodiments of the present invention have been described in the context of DOC Networks (including either a network of all coaxial cable, or a HFC network), the present invention nevertheless relates to any other network (whether wireline or wireless) wherein competing users share access across a shared communications medium including, for example, home networks and small networks in mass transit vehicles.

What is claimed is:

1. A method of providing network access across a shared communications medium between competing users, the method comprising:

monitoring network access usage by each user during a time interval;

forecasting network access usage by each user during a future time interval based on said monitored network access usage by each user, wherein said forecasting comprises predicting future network access usage each user based upon monitored past network access usage patterns of each user, wherein the usage patterns of each user are analyzed to determine an appropriate algorithm to apply for forecasting network access usage; and based on said forecasted network access usage, allocating network access to each user for the future time interval, wherein allocating network access comprises prioritizing each user, and wherein prioritizing each user comprises:

comparing said monitored network access usages for each user with a specified respective minimum levels of network access for each user, and awarding priority to qualified users when said respective monitored network access usage for the qualified users falls below the qualified users' specified respective minimum level of network access.

2. The method of claim 1, wherein allocating network access comprises allocating network access to the users proportionally based on each user's forecasted network access usage.

3. The method of claim 1, wherein said prioritizing is based on each user's forecasted network access usage.

4. The method of claim 1, wherein users are prioritized based on an established minimum quality of service (QoS) standard.

5. The method of claim 1, wherein prioritizing is based on service level agreements (SLAs) of the users regarding the provision of network access.

6. The method of claim 5, wherein SLAs specify the respective minimum levels of network access for each user.

7. The method of claim 1, wherein each network access allocation represents a bandwidth allowance of a respective user during the future time interval.

8. The method of claim 1, wherein each network access allocation represents bandwidth to be utilized by each user during the future time interval.

9. A method of providing network access across a shared communications medium between competing users pursuant to service level agreements (SLAs) of the users, the method comprising:
- monitoring network access usage by each user during a time interval;
- comparing said monitored network access usage by each user with a predetermined threshold value;
    - determining if each user has a first assigned forecasting function;
- assigning the first forecasting function to each user determined to not have a previously assigned forecasting function;
    - determining a usage pattern of each user having had assigned the first forecasting function;
    - assigning a second forecasting function to each user determined to have had assigned the first forecasting function and a qualified usage pattern;
    - forecasting future bandwidth of each user over a future time interval based on the monitored network access usage;
    - prioritizing each user for access to the forecasted future bandwidth, wherein prioritizing each user comprises:
        - comparing said monitored network access usages for each user with a specified respective minimum level of network access for each user, and
        - awarding priority to qualified users when said respective monitored network access usage for the qualified users falls below the qualified users' specified respective minimum level of network access; and
- soliciting a user to modify the user's SLA if the user's monitored network access usage and the user's forecasted future usage varies from the predetermined value by a predetermined tolerance.

10. The method of claim 9, wherein soliciting the user comprises contacting the user via email.

11. The method of claim 9, wherein soliciting the user comprises contacting the user via redirection of a web browser of the user to a solicitation web page.

12. The method of claim 9, wherein network access comprises bandwidth across the shared communications medium for consumption by each user in conveying data of the user.

13. The method of claim 9, further comprising, based on said monitored network access usage, allocating network access to each user for the future time interval.

14. A computerized method of allocating among a plurality of users bandwidth for conveying information across a shared communications medium, the method comprising:
- receiving data representative of past bandwidth of each user during a time interval;
- determining if each user has a first assigned forecasting function;
- assigning the first forecasting function to each user determined to not have a previously assigned forecasting function;
- determining if each user having had assigned the first forecasting function is associated with a seasonal pattern;
- assigning a second forecasting function to each user determined to have had assigned the first forecasting function and a qualified seasonal pattern;
- forecasting future bandwidth of each user over a future time interval based on the data representative of the past bandwidth;
- prioritizing users, wherein prioritizing the users comprises:
    - comparing said monitored network access usages for each user with a specified respective minimum level of network access for each user, and
    - awarding priority to qualified users when said respective monitored network access usage for the qualified users falls below the qualified users' specified respective minimum level of network access; and
- allocating bandwidth to each user sequentially in decreasing order of user priority.

15. The computerized method of claim 14, wherein the bandwidth data is the bandwidth requested for each user.

16. The computerized method of claim 14, wherein the bandwidth data is the bandwidth consumption of each user.

17. The computerized method of claim 16, wherein the bandwidth that is forecasted is based on the bandwidth consumption of each user.

* * * * *

UNITED STATES PATENT AND TRADEMARK OFFICE
CERTIFICATE OF CORRECTION

PATENT NO. : 7,856,497 B2
APPLICATION NO. : 10/276654
DATED : December 21, 2010
INVENTOR(S) : Martin W. McKinnon, III et al.

It is certified that error appears in the above-identified patent and that said Letters Patent is hereby corrected as shown below:

Column 1, line 9, after "PCT/US01/07209, insert --filed on March 7, 2001, which claims benefit of U.S. Provisional Application No. 60/205,963 filed May 19, 2000, which--;

Column 1, line 10, delete "currently pending";

Column 1, line 13, delete "filed";

Column 1, line 13, after ");", insert --, which issued on June 10, 2003 as U.S. Patent No. 6,576,000--;

Column 1, line 15, after "Medium")", insert --, which issued on November 20, 2007 as U.S. Patent No. 7,299,284--;

Column 1, line 17, after "Medium")", insert --, which issued on January 18, 2005 as U.S. Patent No. 6,845,106--;

Column 1, line 19, after "Medium")", insert --, which issued on September 25, 2007 as U.S. Patent No. 7,274,667--;

Column 1, line 21, after "Medium")", insert --, which issued on March 7, 2006 as U.S. Patent No. 7,009,992--;

Column 1, line 24, after "Network")", insert --, which issued on July 12, 2005 as U.S. Patent No. 6,917,628--;

Column 1, line 26, after "Network")" insert --, which issued on July 12, 2005 as U.S. Patent No. 6,917,622--;

Signed and Sealed this
Fifth Day of June, 2012

David J. Kappos
*Director of the United States Patent and Trademark Office*

CERTIFICATE OF CORRECTION (continued)
U.S. Pat. No. 7,856,497 B2

Column 1, line 29, after "Classes")", insert --, which issued on November 23, 2004 as U.S. Patent No. 6,823,385--; and Column 1, line 34, change "Aug. 23, 20014" to --Aug. 23, 2001, which issued on February 27, 2007 as U.S. Patent No. 7,184,398,--.